(12) United States Patent
Motwani et al.

(10) Patent No.: US 11,474,729 B2
(45) Date of Patent: Oct. 18, 2022

(54) UPDATING THE CONFIGURATION OF STORAGE UNITS OF A STORAGE NETWORK

(71) Applicant: Pure Storage, Inc., Mountain View, CA (US)

(72) Inventors: Manish Motwani, Chicago, IL (US); Joseph M. Kaczmarek, Chicago, IL (US); Michael C. Storm, Palo Alto, CA (US); Ilya Volvovski, Chicago, IL (US); Greg R. Dhuse, Chicago, IL (US); Anthony J. Baldocchi, Glen Ellyn, IL (US); Jason K. Resch, Chicago, IL (US); Thomas D. Cocagne, Elk Grove Village, IL (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 17/444,106

(22) Filed: Jul. 30, 2021

(65) Prior Publication Data
US 2021/0357143 A1    Nov. 18, 2021

Related U.S. Application Data

(63) Continuation of application No. 16/592,268, filed on Oct. 3, 2019, now Pat. No. 11,099,763, which is a (Continued)

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0644* (2013.01)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Tracy C Chan
(74) *Attorney, Agent, or Firm* — Garlick & Markison; Timothy W. Markison; Harry S. Tyson, Jr.

(57) ABSTRACT

A method for updating software of storage units of a set of storage units in a storage network. In an embodiment, each storage unit of the set of storage units determines a data slice storage status for data slices stored in the storage unit (e.g., by monitoring rebuilding messages relating to the data slices). A processing module of the storage network obtains the data slice storage status of the storage units of the set of storage units and determines whether to perform a software update to software of the storage units of the set of storage units. Determining whether to perform the software update includes determining, based on the data slice storage status of the storage units, whether a threshold number of storage units are associated with a favorable data slice storage status. In response to determining that a threshold number of storage units are associated with a favorable data slice storage status, the processing module indicates to perform the software update.

20 Claims, 62 Drawing Sheets

Related U.S. Application Data continuation-in-part of application No. 16/036,999, filed on Jul. 17, 2018, now Pat. No. 10,440,105, which is a continuation-in-part of application No. 14/707,999, filed on May 8, 2015, now Pat. No. 10,042,564.

(60) Provisional application No. 62/019,126, filed on Jun. 30, 2014.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers |
| 5,802,364 | A | 9/1998 | Senator |
| 5,809,285 | A | 9/1998 | Hilland |
| 5,890,156 | A | 3/1999 | Rekieta |
| 5,987,622 | A | 11/1999 | Lo Verso |
| 5,991,414 | A | 11/1999 | Garay |
| 6,012,159 | A | 1/2000 | Fischer |
| 6,058,454 | A | 5/2000 | Gerlach |
| 6,128,277 | A | 10/2000 | Bruck |
| 6,175,571 | B1 | 1/2001 | Haddock |
| 6,192,472 | B1 | 2/2001 | Garay |
| 6,256,688 | B1 | 7/2001 | Suetaka |
| 6,272,658 | B1 | 8/2001 | Steele |
| 6,301,604 | B1 | 10/2001 | Nojima |
| 6,356,949 | B1 | 3/2002 | Katsandres |
| 6,366,995 | B1 | 4/2002 | Vilkov |
| 6,374,336 | B1 | 4/2002 | Peters |
| 6,415,373 | B1 | 7/2002 | Peters |
| 6,418,539 | B1 | 7/2002 | Walker |
| 6,449,688 | B1 | 9/2002 | Peters |
| 6,567,948 | B2 | 5/2003 | Steele |
| 6,571,282 | B1 | 5/2003 | Bowman-Amuah |
| 6,609,223 | B1 | 8/2003 | Wolfgang |
| 6,718,361 | B1 | 4/2004 | Basani |
| 6,760,808 | B2 | 7/2004 | Peters |
| 6,785,768 | B2 | 8/2004 | Peters |
| 6,785,783 | B2 | 8/2004 | Buckland |
| 6,826,711 | B2 | 11/2004 | Moulton |
| 6,879,596 | B1 | 4/2005 | Dooply |
| 7,003,688 | B1 | 2/2006 | Pittelkow |
| 7,024,451 | B2 | 4/2006 | Jorgenson |
| 7,024,609 | B2 | 4/2006 | Wolfgang |
| 7,080,101 | B1 | 7/2006 | Watson |
| 7,103,824 | B2 | 9/2006 | Halford |
| 7,103,915 | B2 | 9/2006 | Redlich |
| 7,111,115 | B2 | 9/2006 | Peters |
| 7,140,044 | B2 | 11/2006 | Redlich |
| 7,146,644 | B2 | 12/2006 | Redlich |
| 7,171,493 | B2 | 1/2007 | Shu |
| 7,222,133 | B1 | 5/2007 | Raipurkar |
| 7,240,236 | B2 | 7/2007 | Cutts |
| 7,272,613 | B2 | 9/2007 | Sim |
| 7,636,724 | B2 | 12/2009 | de la Torre |
| 8,751,864 | B2 | 6/2014 | Swanson |
| 9,185,188 | B1 | 11/2015 | Li |
| 2002/0062422 | A1 | 5/2002 | Butterworth |
| 2002/0166079 | A1 | 11/2002 | Ulrich |
| 2003/0018927 | A1 | 1/2003 | Gadir |
| 2003/0037261 | A1 | 2/2003 | Meffert |
| 2003/0065617 | A1 | 4/2003 | Watkins |
| 2003/0084020 | A1 | 5/2003 | Shu |
| 2004/0024963 | A1 | 2/2004 | Talagala |
| 2004/0122917 | A1 | 6/2004 | Menon |
| 2004/0215998 | A1 | 10/2004 | Buxton |
| 2004/0228493 | A1 | 11/2004 | Ma |
| 2005/0083862 | A1 | 4/2005 | Kongalath |
| 2005/0100022 | A1 | 5/2005 | Ramprashad |
| 2005/0114594 | A1 | 5/2005 | Corbett |
| 2005/0125593 | A1 | 6/2005 | Karpoff |
| 2005/0131993 | A1 | 6/2005 | Fatula, Jr. |
| 2005/0132070 | A1 | 6/2005 | Redlich |
| 2005/0144382 | A1 | 6/2005 | Schmisseur |
| 2005/0229069 | A1 | 10/2005 | Hassner |
| 2006/0047907 | A1 | 3/2006 | Shiga |
| 2006/0136448 | A1 | 6/2006 | Cialini |
| 2006/0156059 | A1 | 7/2006 | Kitamura |
| 2006/0224603 | A1 | 10/2006 | Correll, Jr. |
| 2007/0079081 | A1 | 4/2007 | Gladwin |
| 2007/0079082 | A1 | 4/2007 | Gladwin |
| 2007/0079083 | A1 | 4/2007 | Gladwin |
| 2007/0088970 | A1 | 4/2007 | Buxton |
| 2007/0174192 | A1 | 7/2007 | Gladwin |
| 2007/0214285 | A1 | 9/2007 | Au |
| 2007/0234110 | A1 | 10/2007 | Soran |
| 2007/0260840 | A1 | 11/2007 | Watanabe |
| 2007/0283167 | A1 | 12/2007 | Venters, III |
| 2009/0094251 | A1 | 4/2009 | Gladwin |
| 2009/0094318 | A1 | 4/2009 | Gladwin |
| 2010/0023524 | A1 | 1/2010 | Gladwin |
| 2011/0185141 | A1* | 7/2011 | Dhuse .............. G06F 3/067 |
| | | | 711/E12.002 |
| 2011/0295999 | A1 | 12/2011 | Ferris |
| 2012/0117351 | A1* | 5/2012 | Motwani .......... G06F 3/0605 |
| | | | 711/E12.002 |
| 2012/0311557 | A1* | 12/2012 | Resch .............. G06F 3/0604 |
| | | | 717/171 |
| 2014/0108072 | A1 | 4/2014 | Mcgowan |
| 2015/0121131 | A1 | 4/2015 | Kiselev |
| 2015/0363185 | A1* | 12/2015 | Garratt ............... G06F 8/61 |
| | | | 717/168 |
| 2020/0036802 | A1* | 1/2020 | Bullock ............ G06F 16/29 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

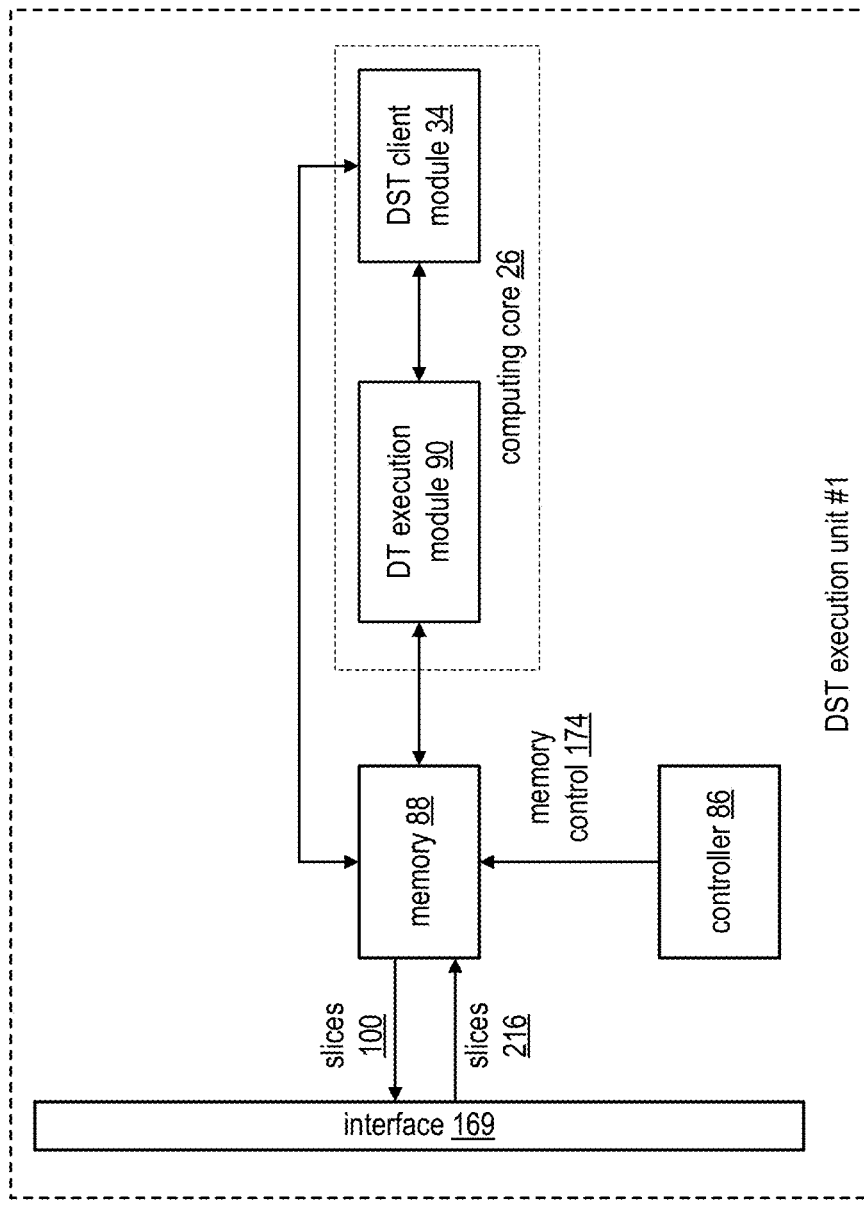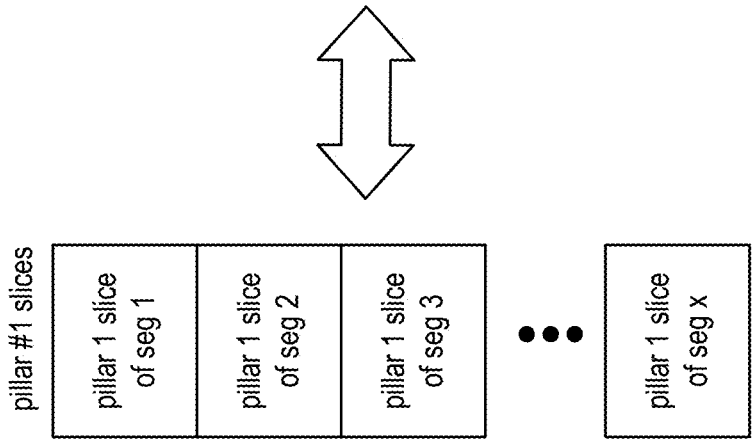
FIG. 24

| DST allocation info 242 | data partition info 320: data ID; No. of partitions; Addr. info for each partition; format conversion indication | | | | | | |
|---|---|---|---|---|---|---|---|
| | task execution info 322 | | | | | intermediate result info 324 | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

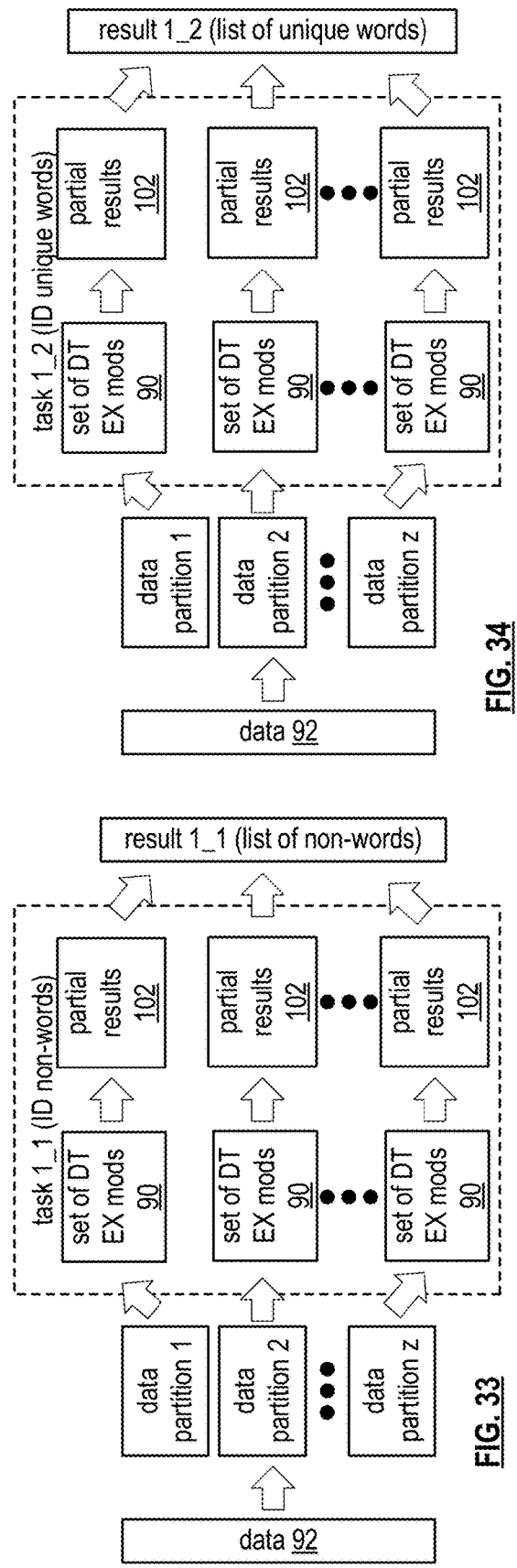
FIG. 33
FIG. 34
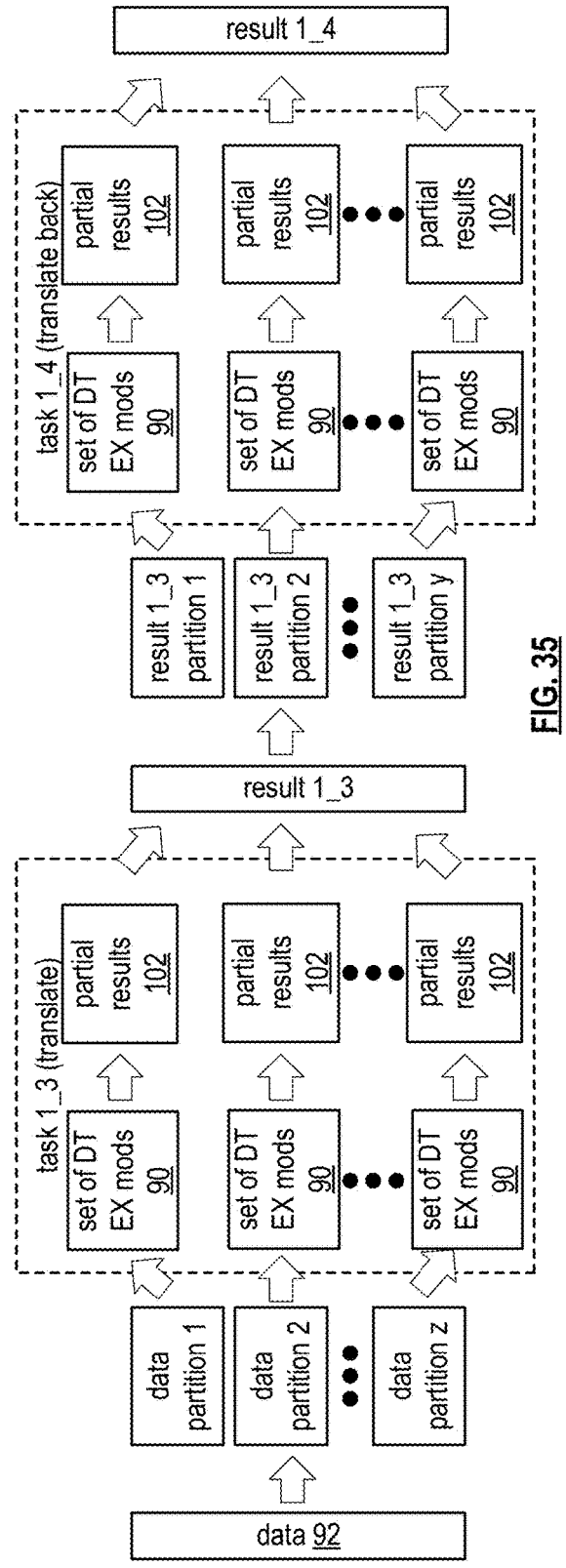
FIG. 35

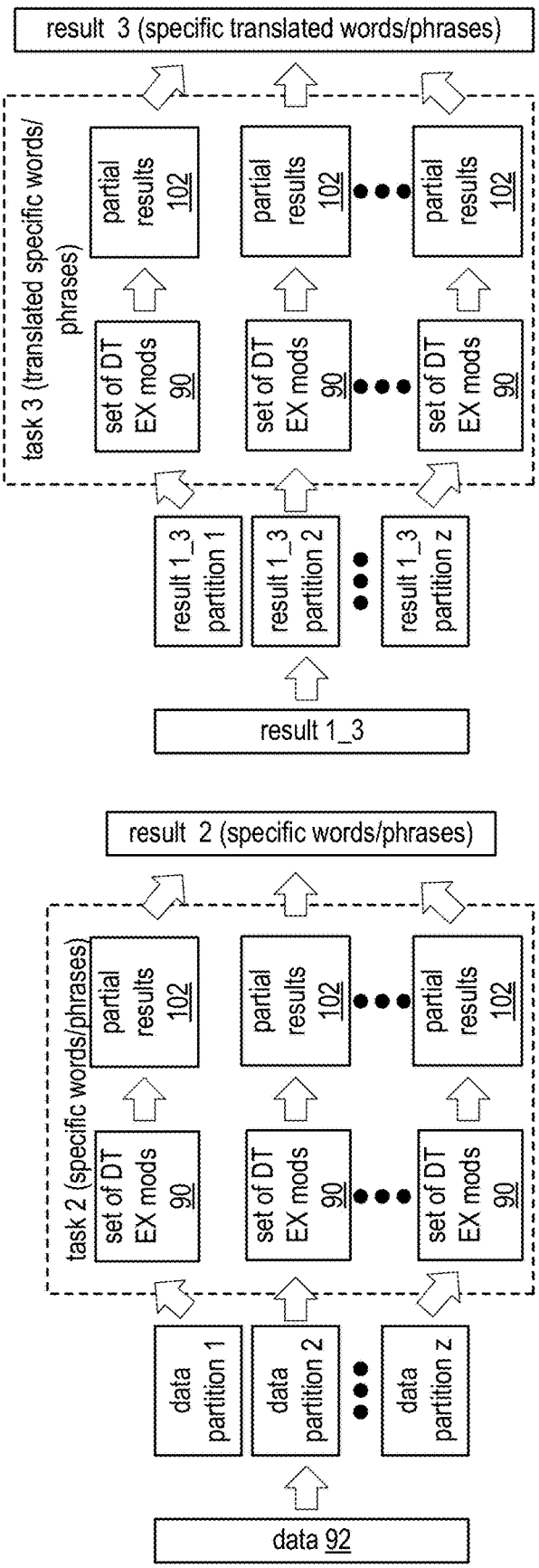
FIG. 38
FIG. 37
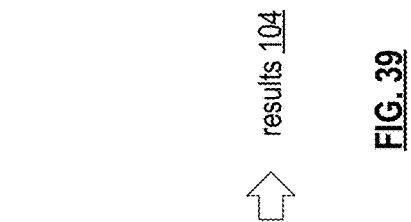
FIG. 39

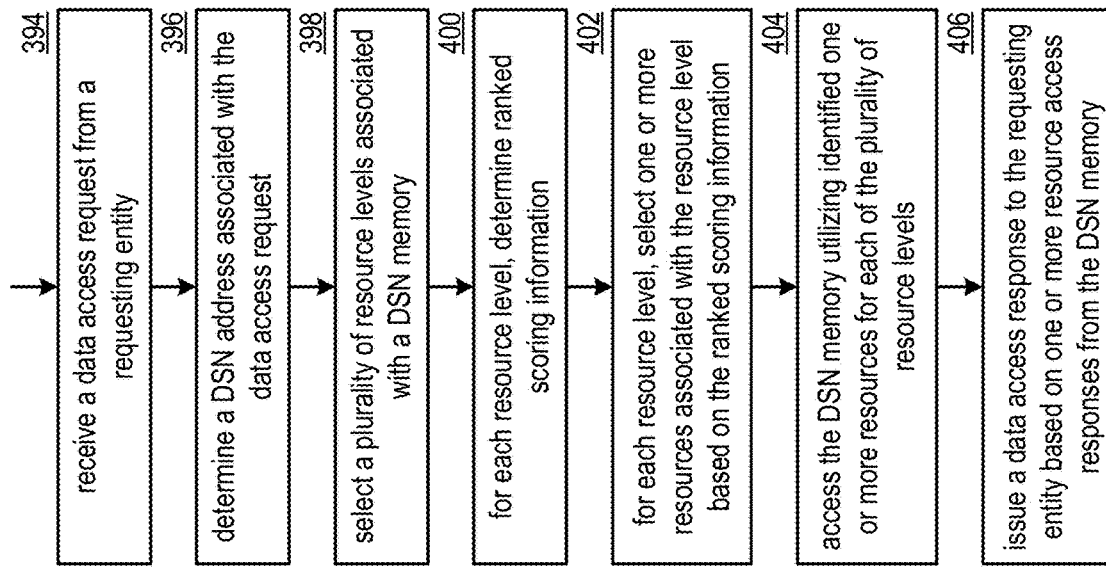

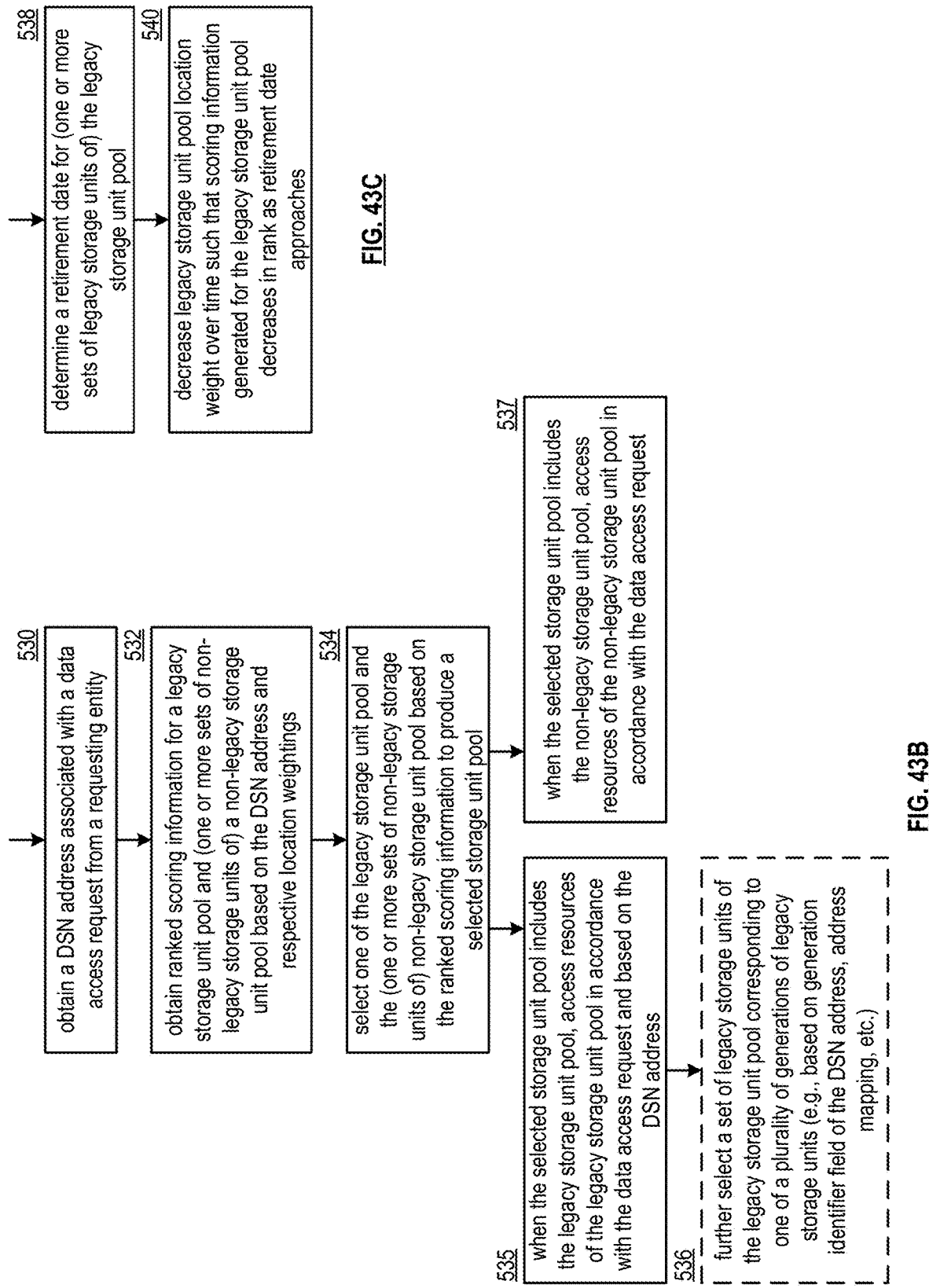

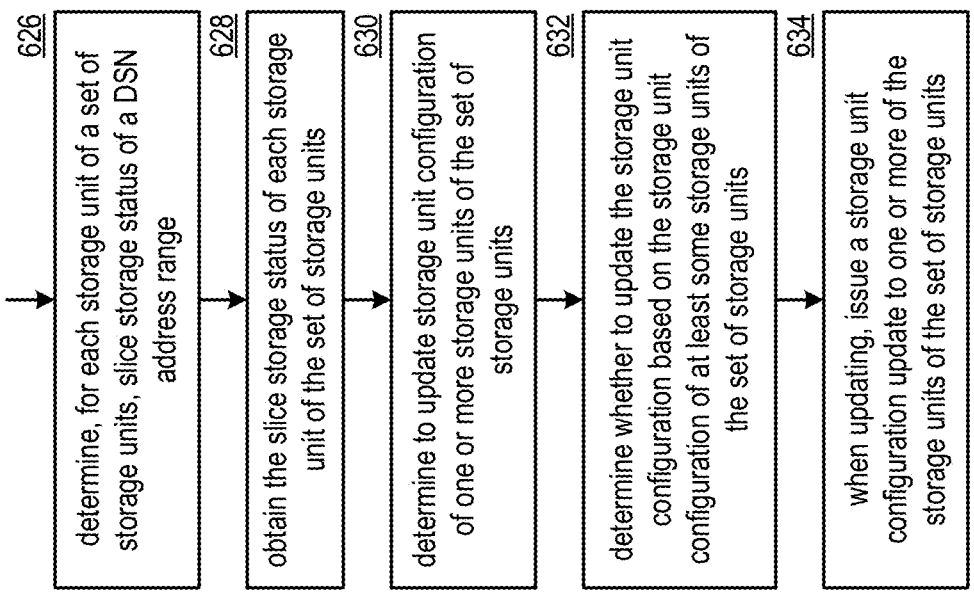

UPDATING THE CONFIGURATION OF STORAGE UNITS OF A STORAGE NETWORK

CROSS REFERENCE TO RELATED PATENTS

The present U.S. Utility patent application claims priority pursuant to 35 U.S.C. § 120 as a continuation of U.S. Utility application Ser. No. 16/592,268, entitled "MIGRATING GENERATIONAL STORAGE TO A DECENTRALIZED AGREEMENT PROTOCOL PARADIGM," filed Oct. 3, 2019, which claims priority pursuant to 35 U.S.C. § 120 as a continuation-in-part of U.S. Utility application Ser. No. 16/036,999, entitled "USING A DECENTRALIZED AGREEMENT PROTOCOL TO RANK STORAGE LOCATIONS FOR TARGET WIDTH," filed Jul. 17, 2018, now U.S. Pat. No. 10,440,105, issued on Oct. 8, 2019, which claims priority pursuant to 35 U.S.C. § 120 as a continuation-in-part of U.S. Utility application Ser. No. 14/707,999, entitled "ACCESSING DATA WHILE MIGRATING STORAGE OF THE DATA," filed May 8, 2015, now U.S. Pat. No. 10,042,564, issued on Aug. 7, 2018, which claims priority pursuant to 35 U.S.C. § 119(e) to U.S. Provisional Application No. 62/019,126, entitled "SELECTING STORAGE RESOURCES OF A DISPERSED STORAGE NETWORK", filed Jun. 30, 2014, each of which is hereby incorporated herein by reference in its entirety and made part of the present U.S. Utility patent application for all purposes.

BACKGROUND

Technical Field of the Invention

This invention relates generally to computer networks and more particularly to migration of data using a decentralized agreement protocol.

Description of Related Art

Computing devices are known to communicate data, process data, and/or store data. Such computing devices range from wireless smart phones, laptops, tablets, personal computers (PC), workstations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

SUMMARY

Various methods for updating the software configuration of storage units of a set of storage units in a storage network are described. In an embodiment, each storage unit of the set of storage units determines a data slice storage status for data slices stored in the storage unit. In an example, a storage unit monitors rebuilding messages relating to data slices stored in the storage unit to determine a data slice storage status. A processing module of the storage network obtains the data slice storage status of the storage units of the set of storage units and determines whether to perform a software update to software of the storage units of the set of storage units. In this example, determining whether to perform the software update includes determining, based on the data slice storage status of the storage units, whether a threshold number of storage units are associated with a favorable data slice storage status. In response to determining that a threshold number of storage units are associated with a favorable data slice storage status, the processing module indicates to perform the software update. In response to determining that a threshold number of storage units are not associated with a favorable data slice storage status, the processing module indicates not to perform the software update.

BRIEF DESCRIPTION OF THE DRAWINGS

FIG. 24 is a schematic block diagram of an example of a storage operation of a DST execution unit in accordance with the present disclosure;

FIG. 32 is a diagram of an example of DST allocation information for the example of FIG. 30 in accordance with the present disclosure;

FIGS. 33-38 are schematic block diagrams of the DSTN module performing the example of FIG. 30 in accordance with the present disclosure;

FIG. 39 is a diagram of an example of combining result information into final results for the example of FIG. 30 in accordance with the present disclosure;

FIG. 40D is a flowchart illustrating an example of accessing a dispersed storage network (DSN) memory in accordance with the present disclosure;

FIG. 43B is a flowchart illustrating another example of selecting storage resources in accordance with the present disclosure;

FIG. 43C is a flowchart illustrating an example of determining a legacy storage unit pool location weight in accordance with the present disclosure;

FIG. 47B is a flowchart illustrating an example of updating storage unit configuration information in accordance with the present disclosure;

DETAILED DESCRIPTION

Figure 1:
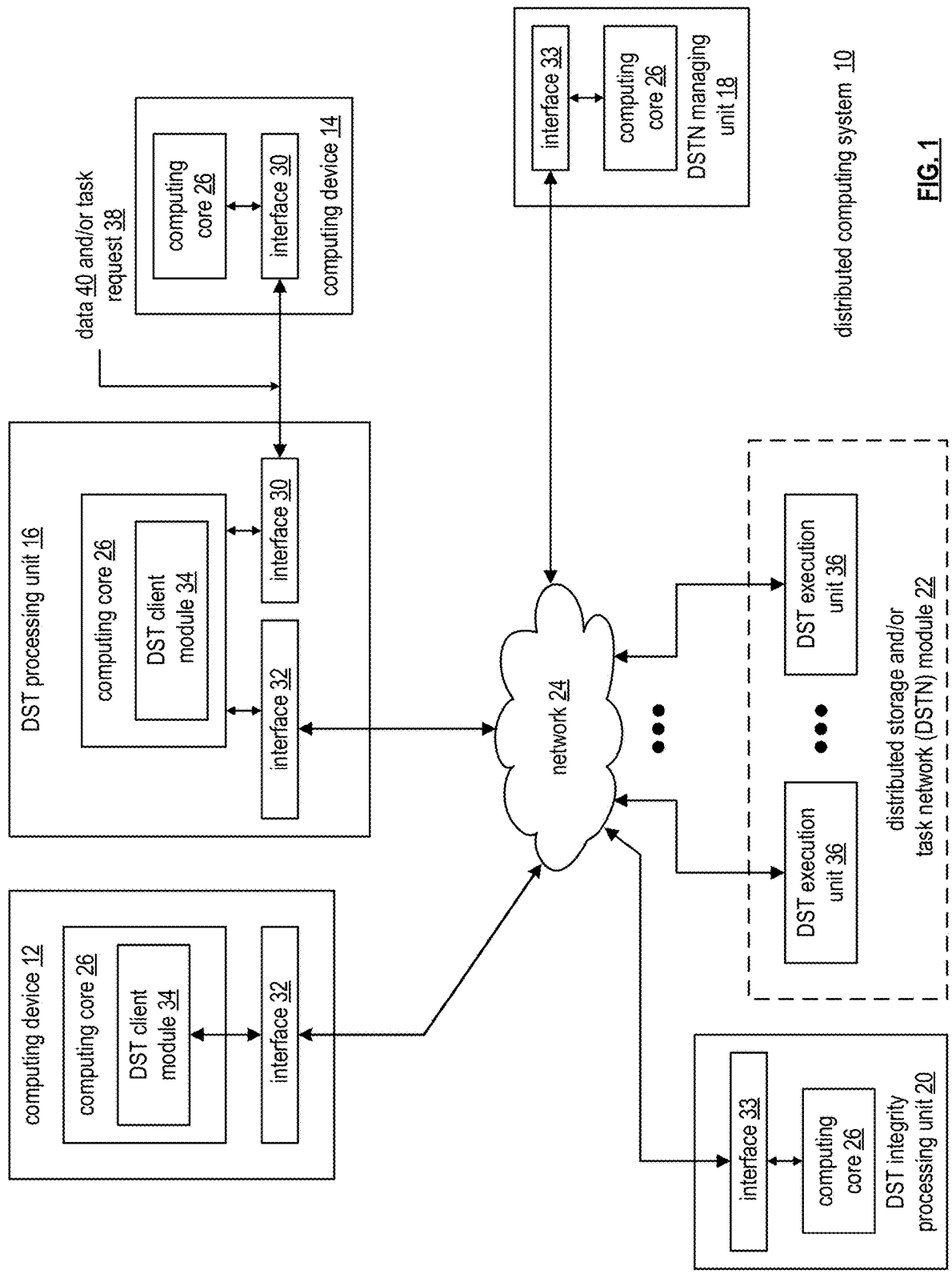
FIG. 1 is a schematic block diagram of an embodiment of a distributed computing system in accordance with the present disclosure.

FIG. 1 is a schematic block diagram of an embodiment of a distributed computing system 10 that includes a computing device 12 and/or a computing device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the computing devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between computing device 14 and the DST processing unit 16. As another example, interface 32 supports communication links (e.g., a wired connection, a wireless connection, a LAN connection, and/or any other type of connection to/from the network 24) between computing device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a computing device 12-14. For instance, if a second type of computing device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a computing device 12-14 individually or as part of a group of computing devices. For example, the DSTN managing unit 18 coordinates creation of a vault (e.g., a virtual memory block) within memory of the DSTN module 22 for a computing device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the computing device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a computing device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for computing devices, adding/deleting components (e.g., computing devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a computing device 12-14 individually or as part of a group of computing devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for computing devices, adding/deleting components (e.g., computing devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of computing device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
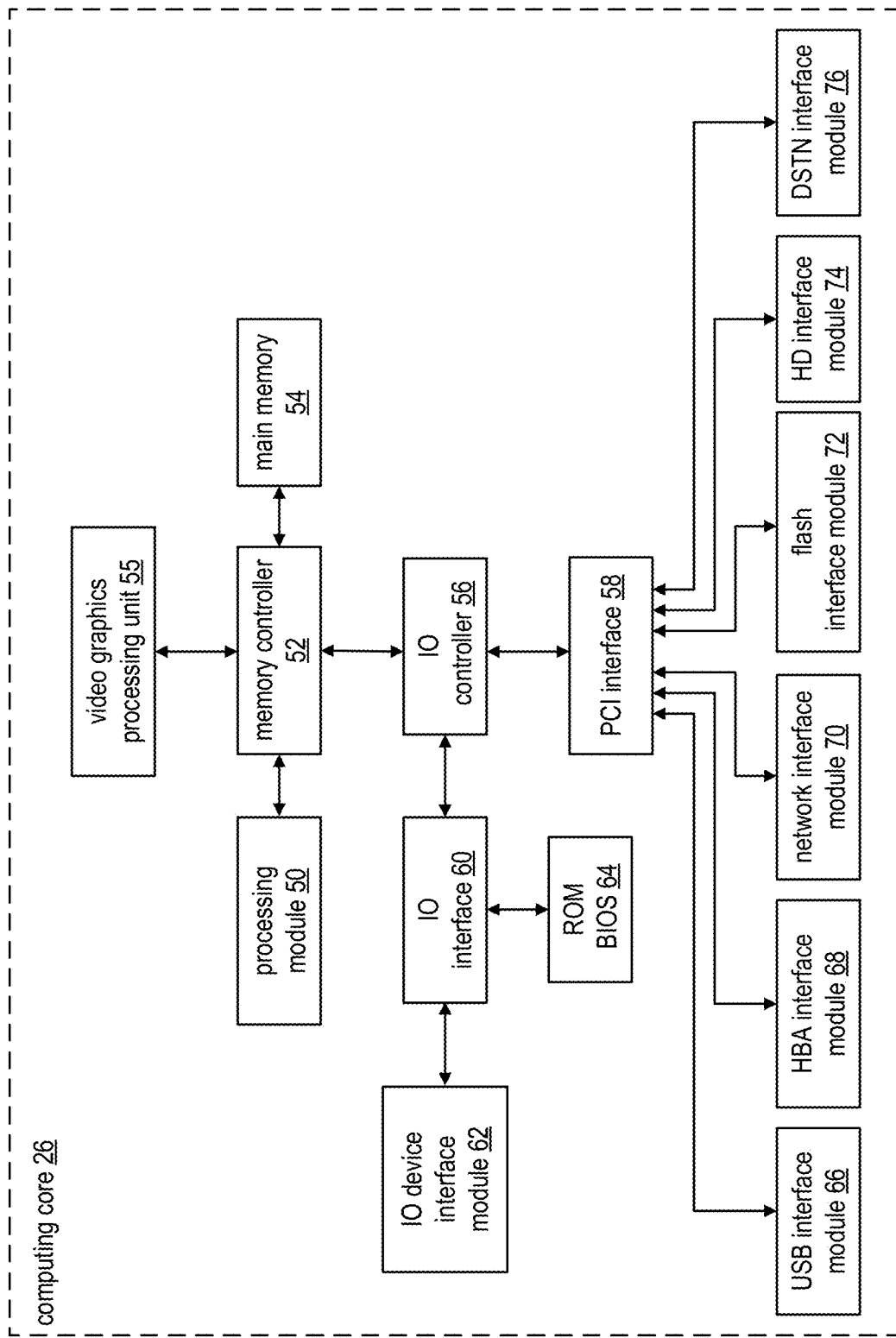
FIG. 2 is a schematic block diagram of an embodiment of a computing core in accordance with the present disclosure.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the computing device 14 of FIG. 1. Further note that the IO device interface module 62 and/or the memory interface modules may be collectively or individually referred to as IO ports.

Figure 3:
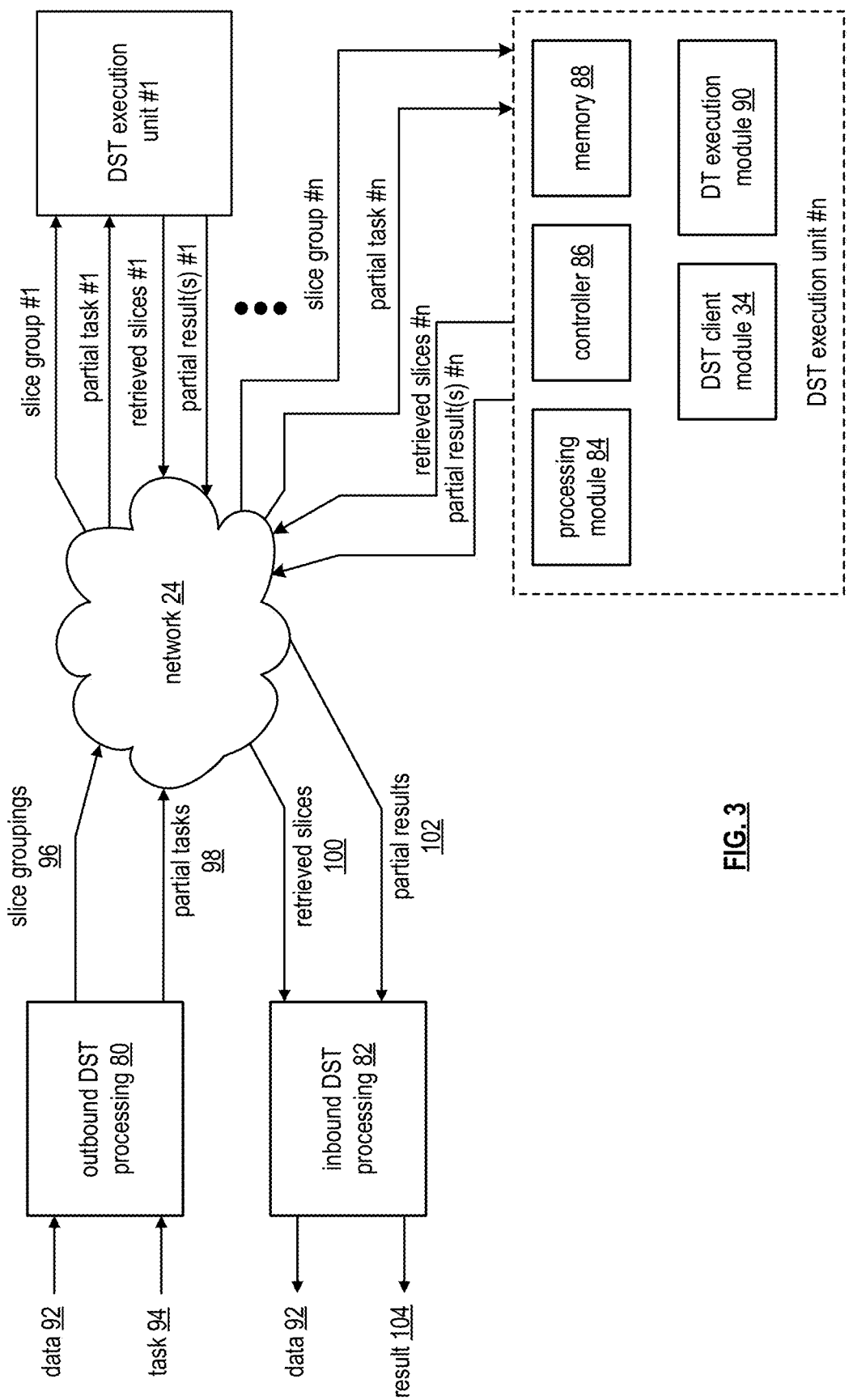
FIG. 3 is a diagram of an example of a distributed storage and task processing in accordance with the present disclosure.

FIG. 3 is a diagram of an example of the distributed computing system performing a distributed storage and task processing operation. The distributed computing system includes a DST (distributed storage and/or task) client module 34 (which may be in computing device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit 190 1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
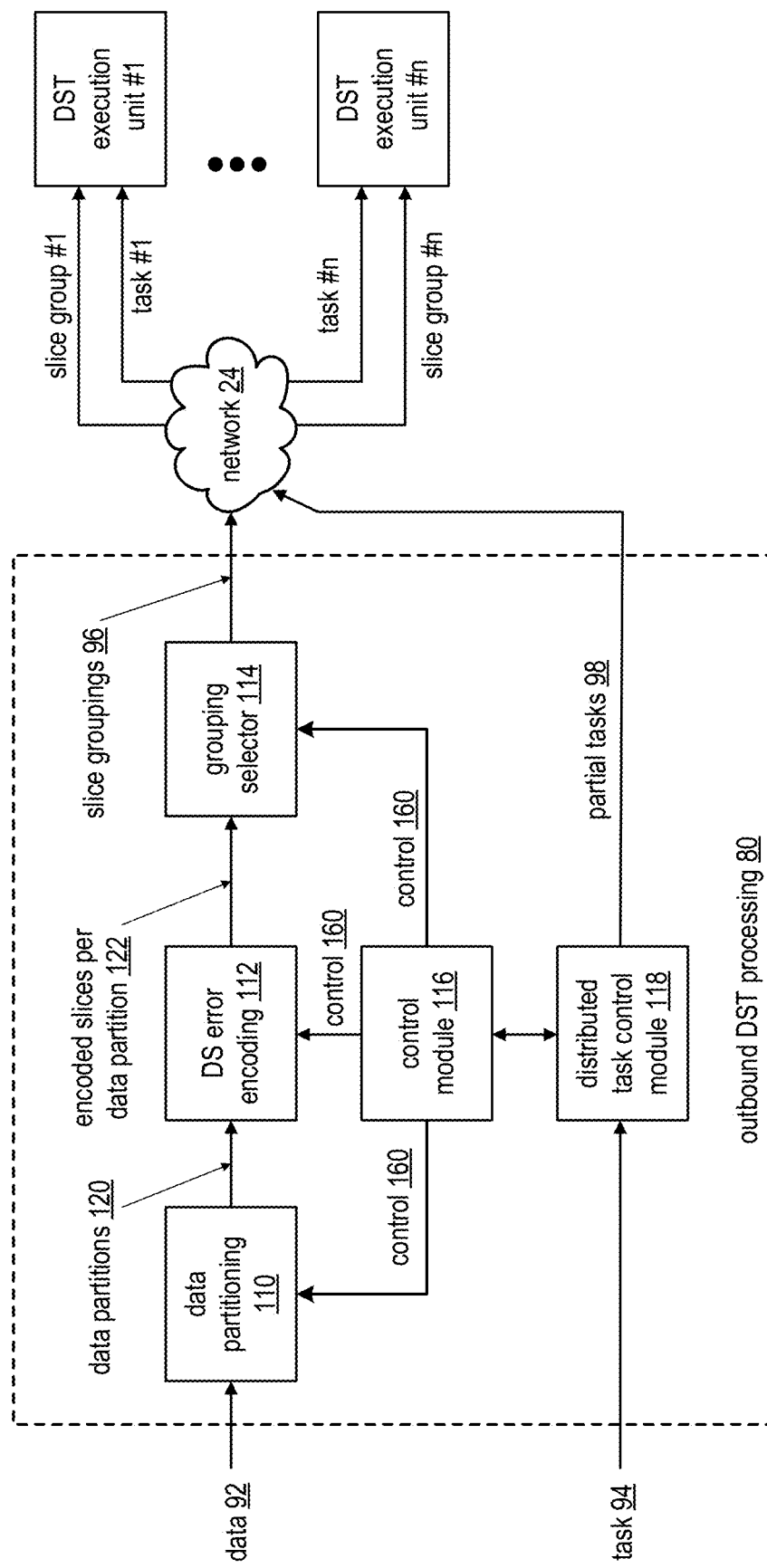
FIG. 4 is a schematic block diagram of an embodiment of an outbound distributed storage and/or task (DST) processing in accordance with the present disclosure.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96.

The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
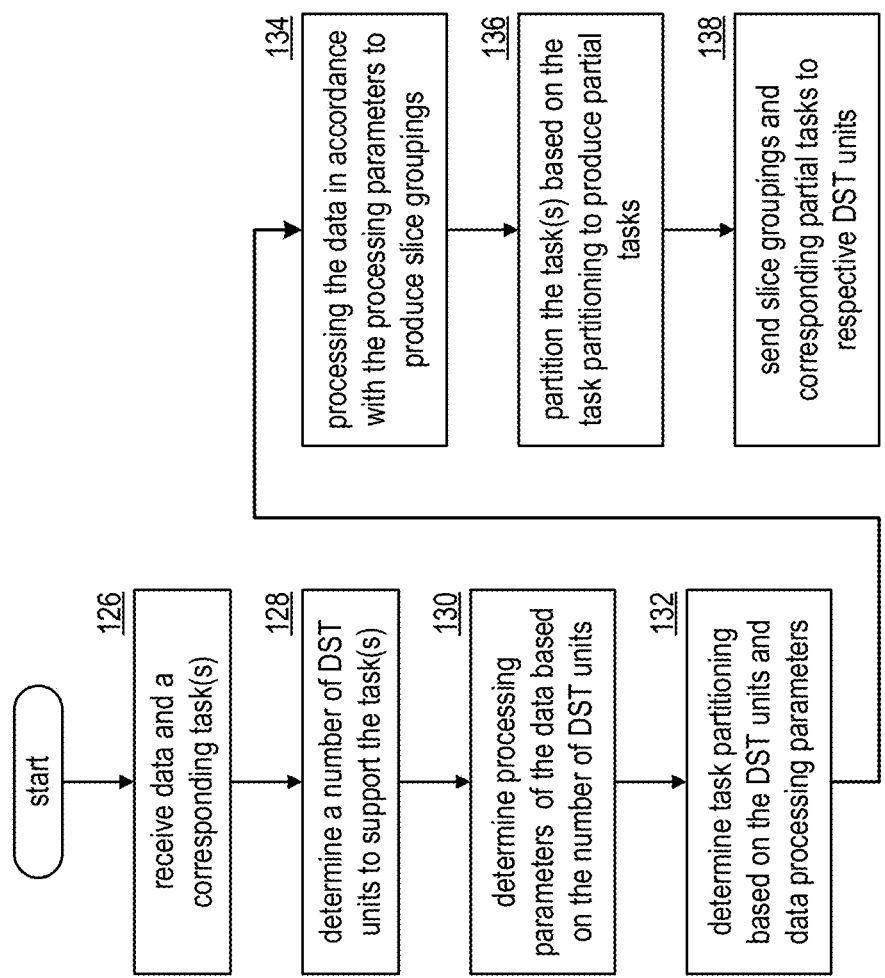
FIG. 5 is a logic diagram of an example of a method for outbound DST processing in accordance with the present disclosure.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
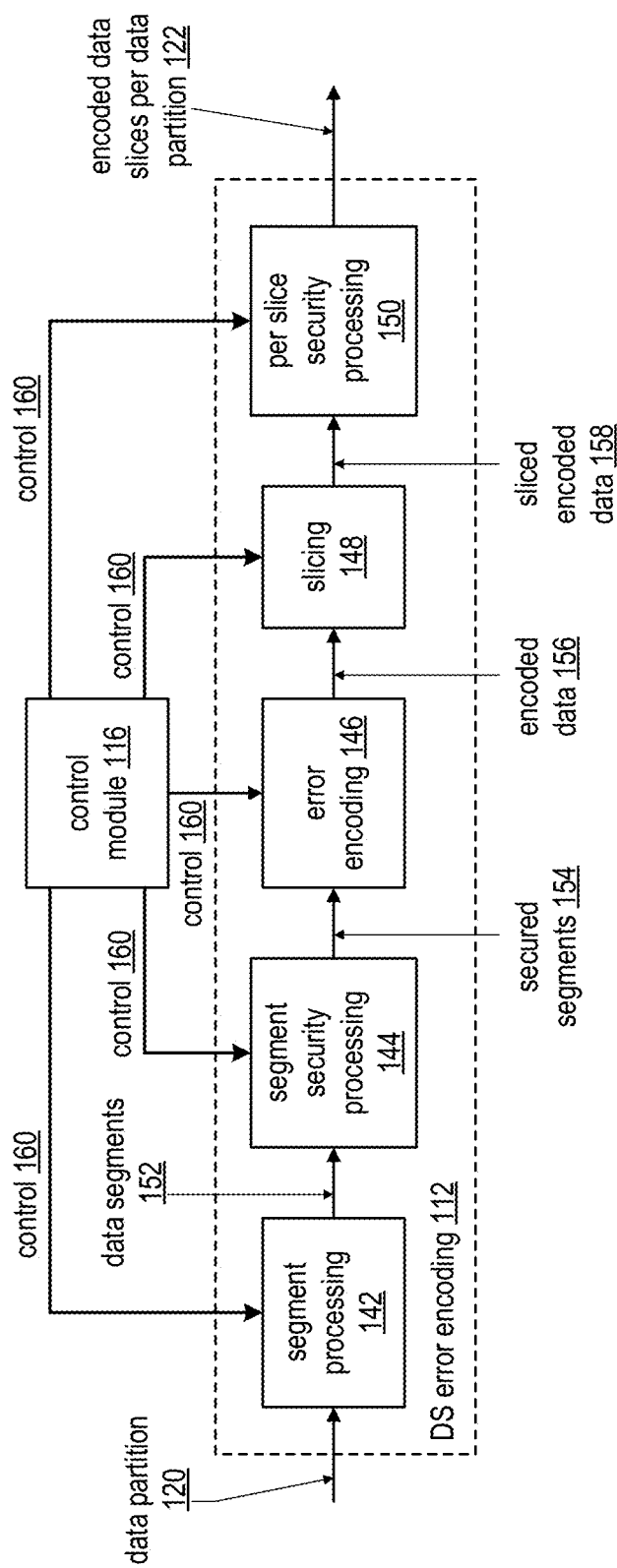
FIG. 6 is a schematic block diagram of an embodiment of a dispersed error encoding in accordance with the present disclosure.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
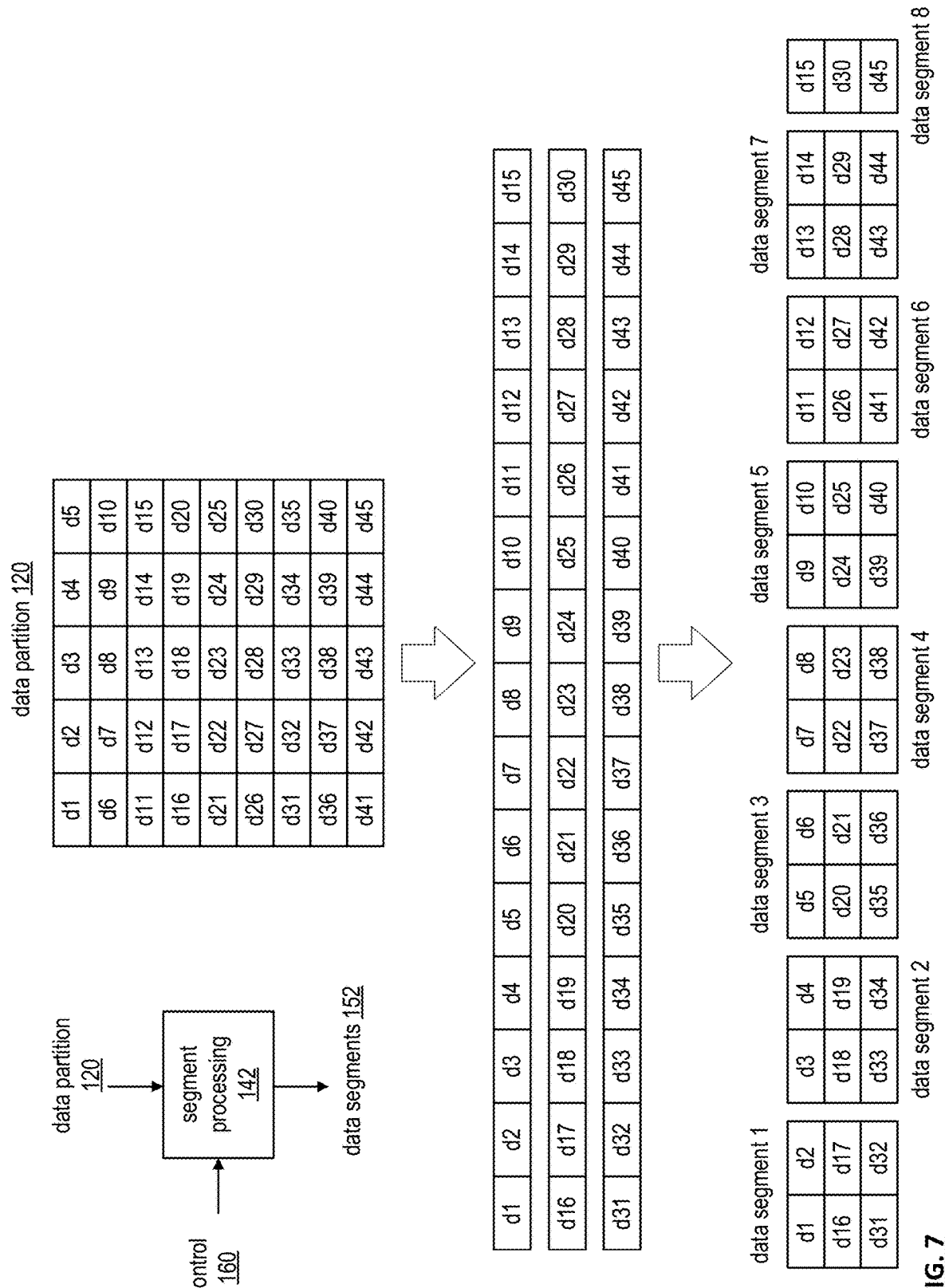
FIG. 7 is a diagram of an example of a segment processing of the dispersed error encoding in accordance with the present disclosure.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
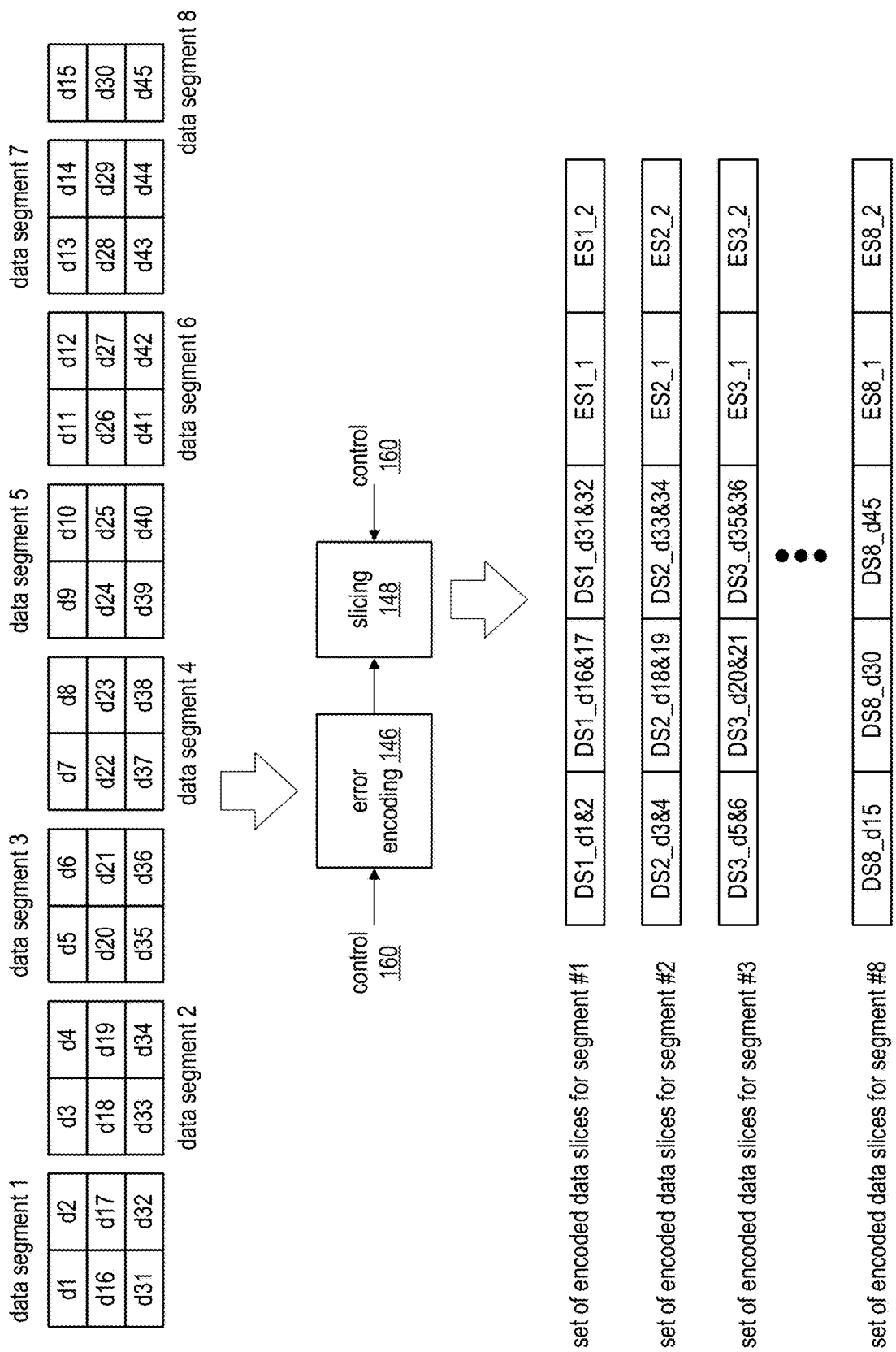
FIG. 8 is a diagram of an example of error encoding and slicing processing of the dispersed error encoding in accordance with the present disclosure.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
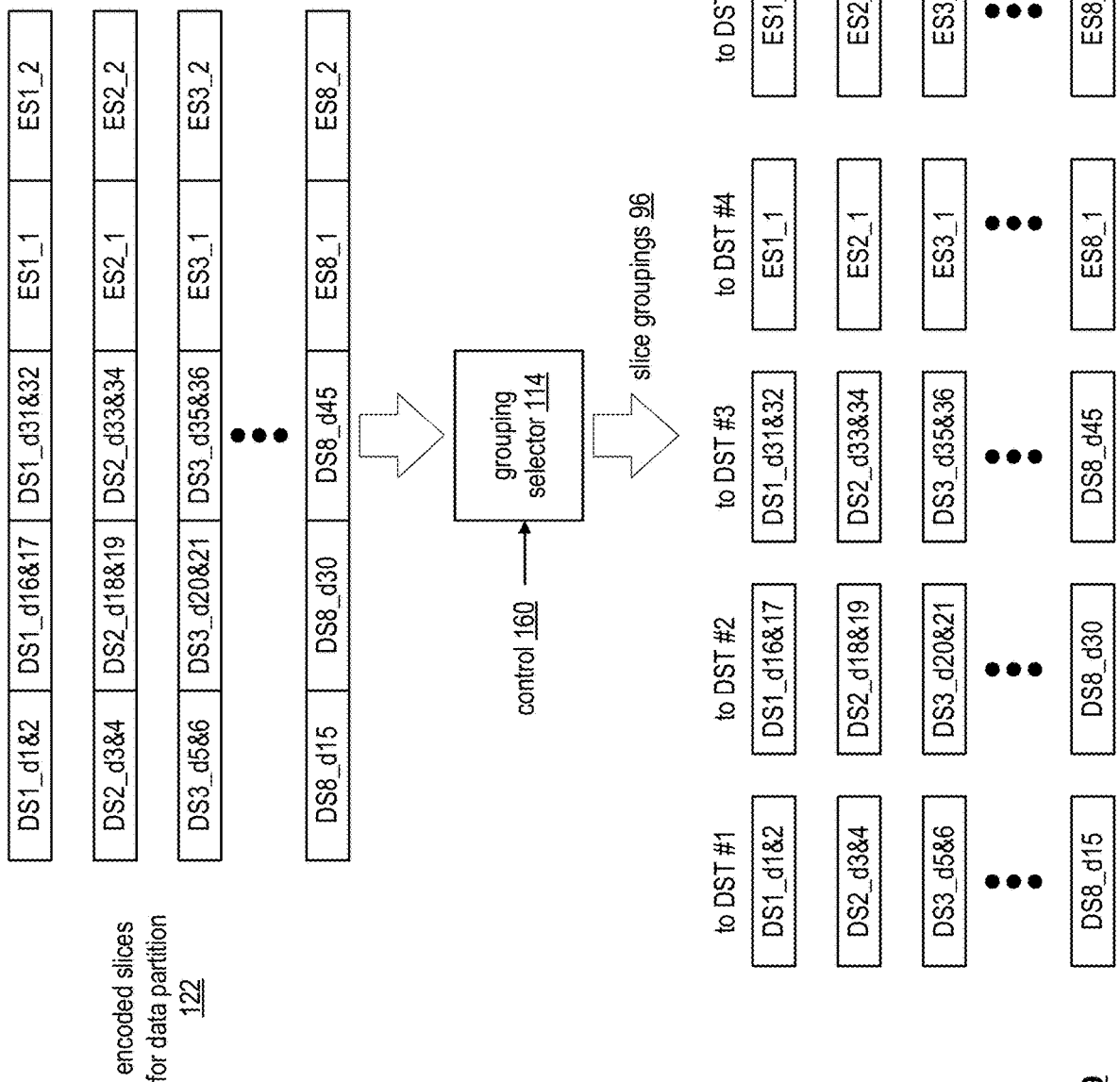
FIG. 9 is a diagram of an example of grouping selection processing of the outbound DST processing in accordance with the present disclosure.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
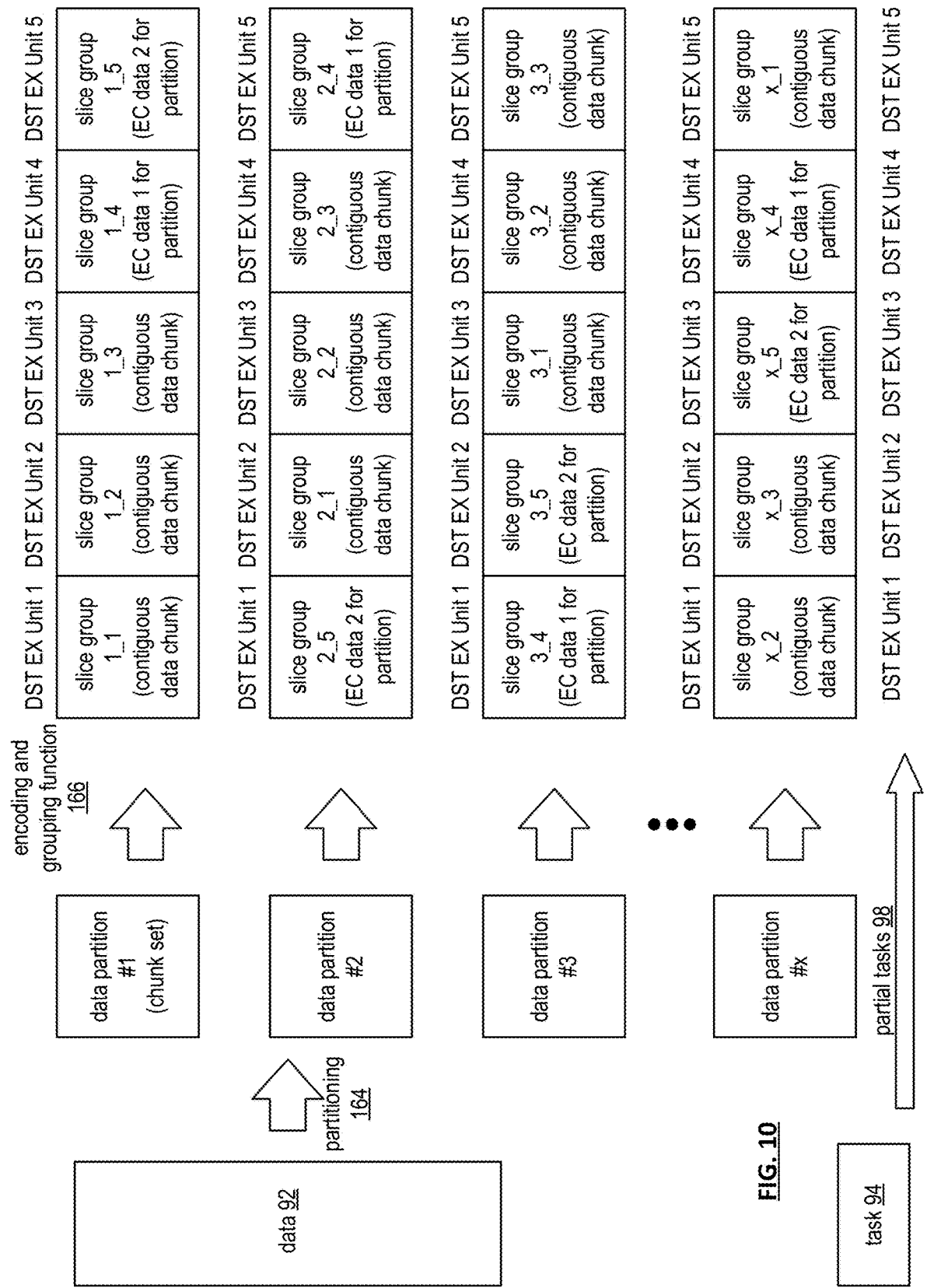
FIG. 10 is a diagram of an example of converting data into slice groups in accordance with the present disclosure.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
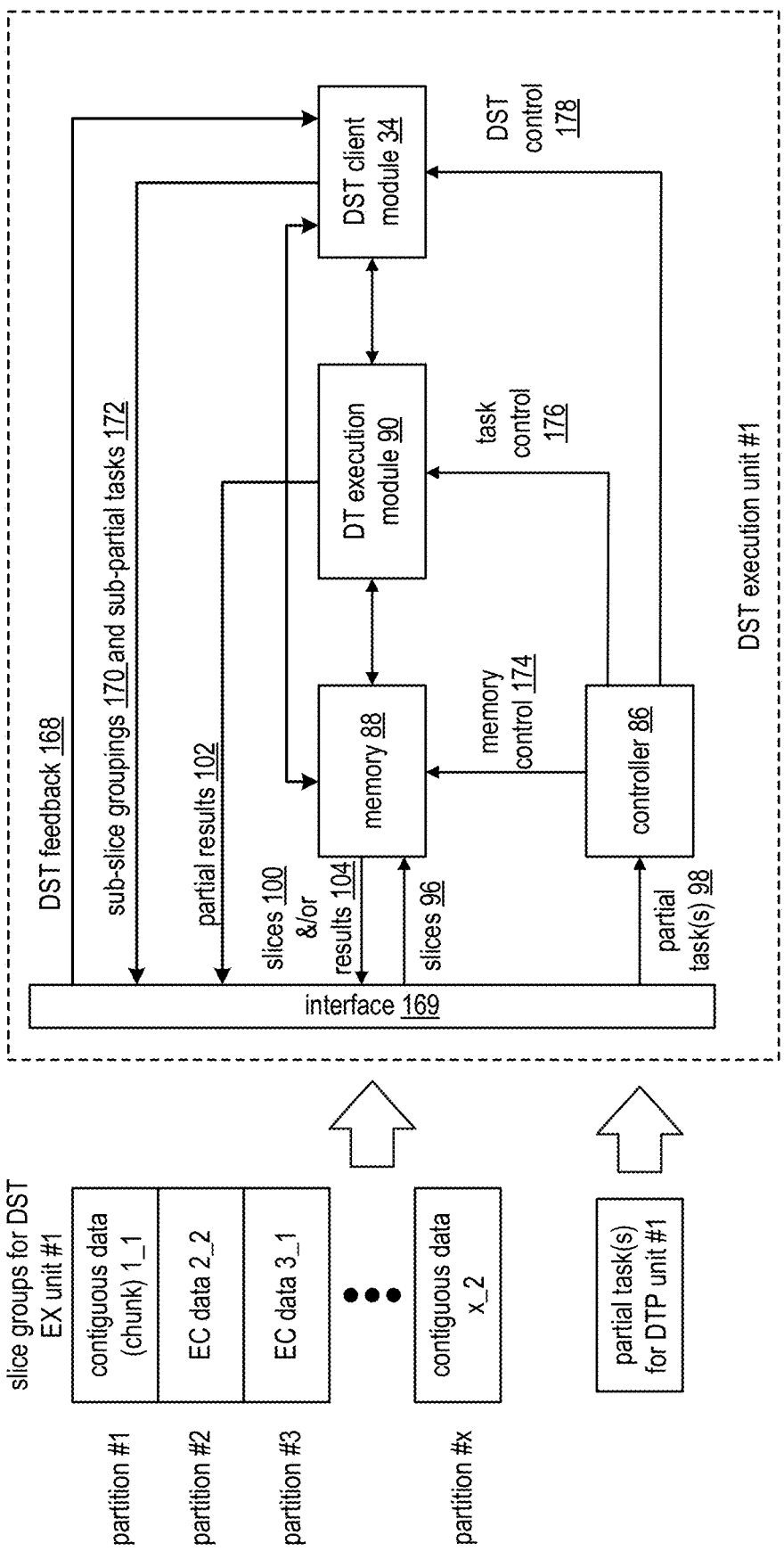
FIG. 11 is a schematic block diagram of an embodiment of a DST execution unit in accordance with the present disclosure.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
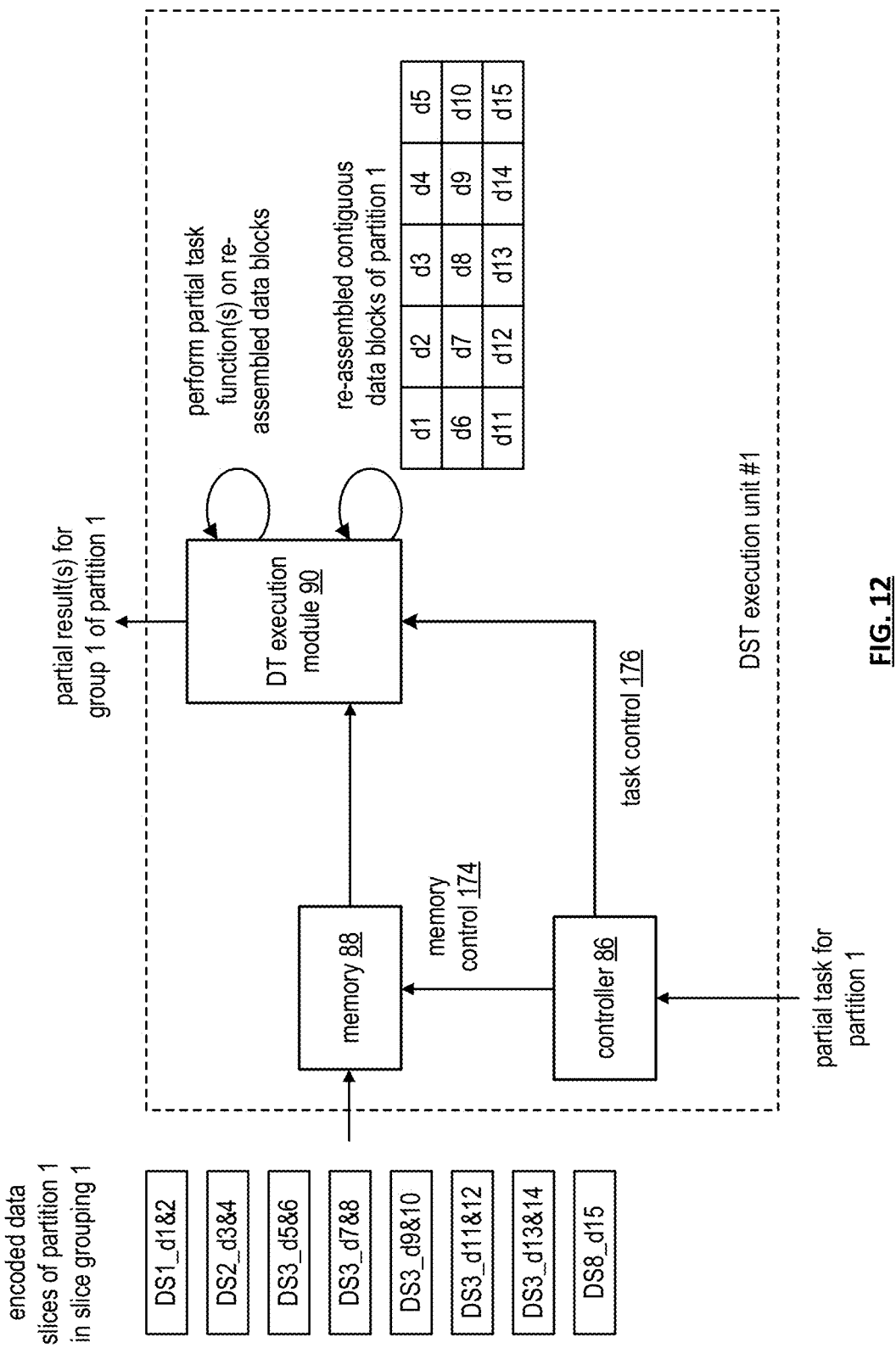
FIG. 12 is a schematic block diagram of an example of operation of a DST execution unit in accordance with the present disclosure.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
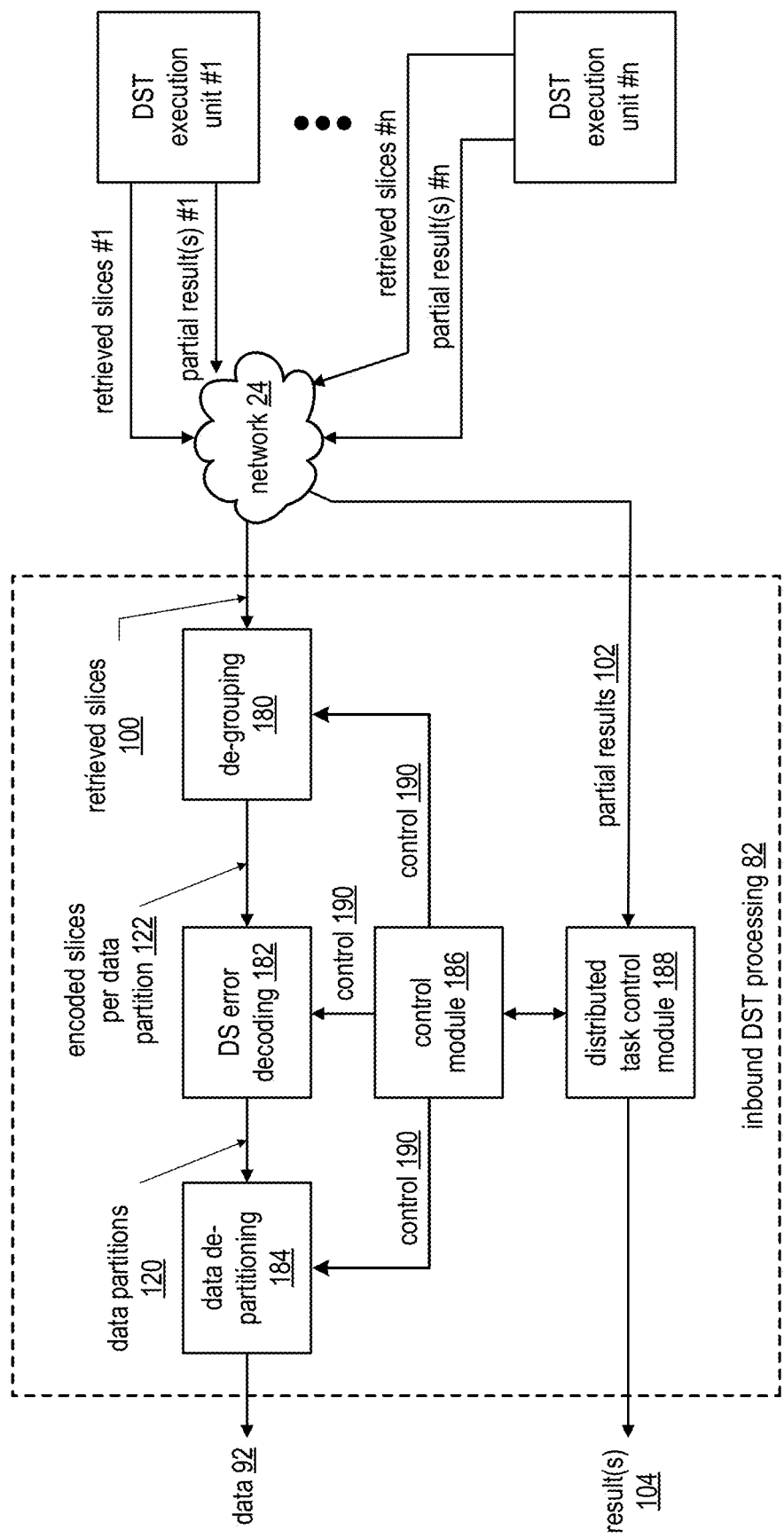
FIG. 13 is a schematic block diagram of an embodiment of an inbound distributed storage and/or task (DST) processing in accordance with the present disclosure.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
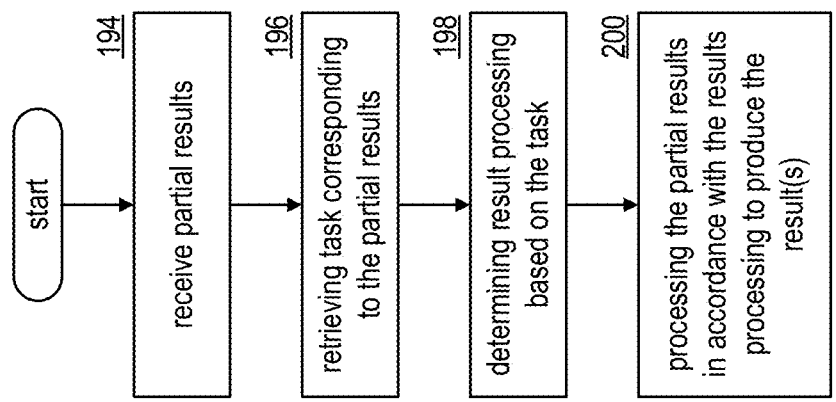
FIG. 14 is a logic diagram of an example of a method for inbound DST processing in accordance with the present disclosure.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
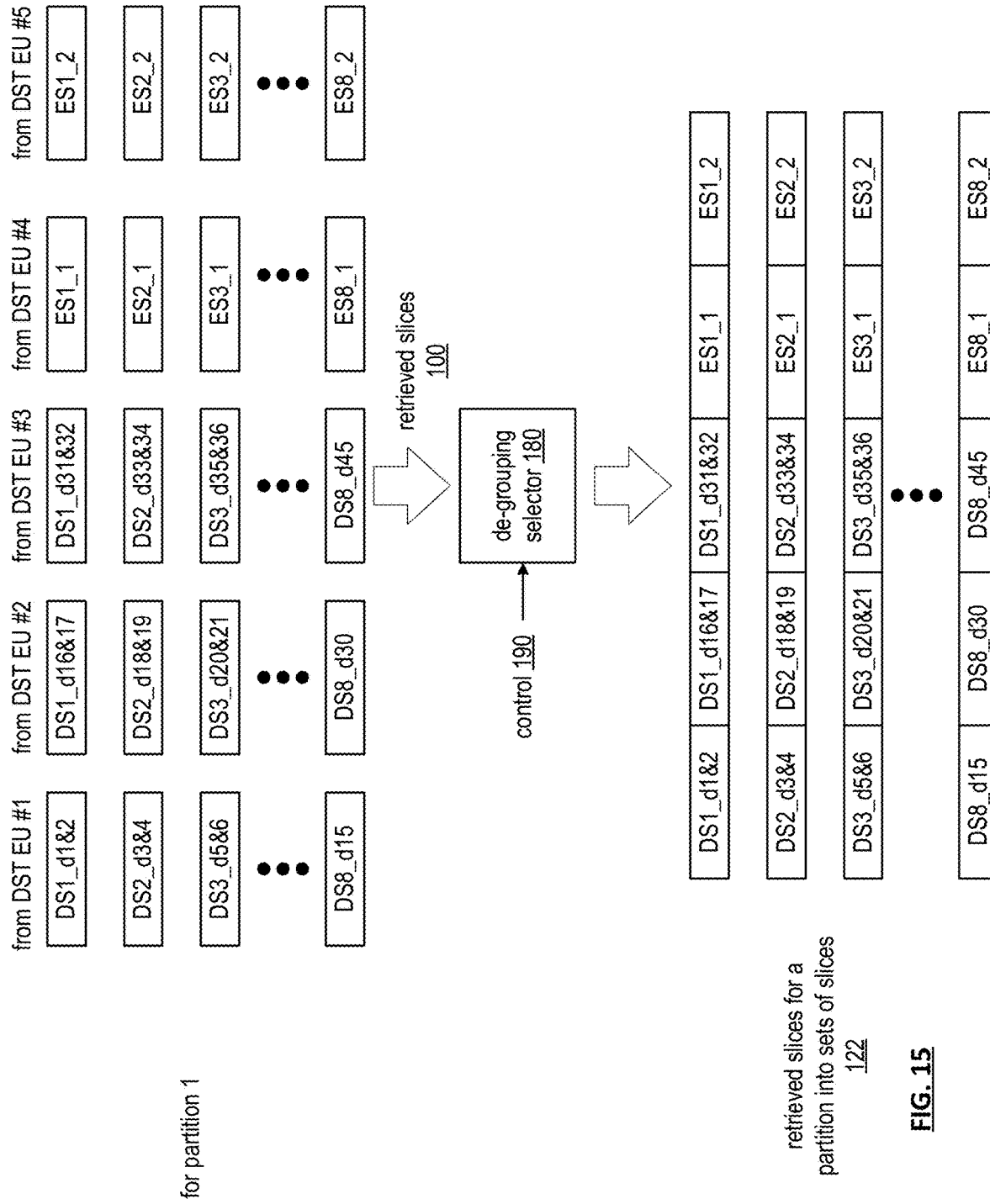
FIG. 15 is a diagram of an example of de-grouping selection processing of the inbound DST processing in accordance with the present disclosure.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
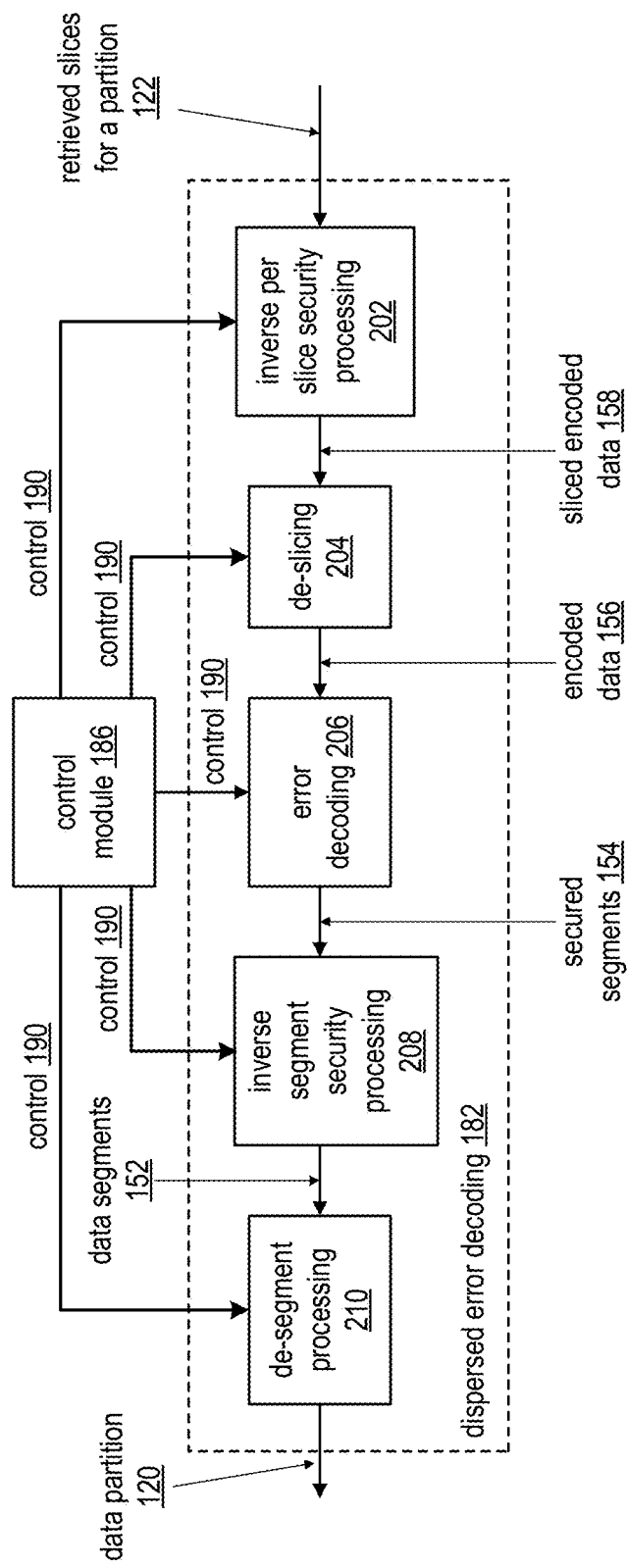
FIG. 16 is a schematic block diagram of an embodiment of a dispersed error decoding in accordance with the present disclosure.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, un-secures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, un-secures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
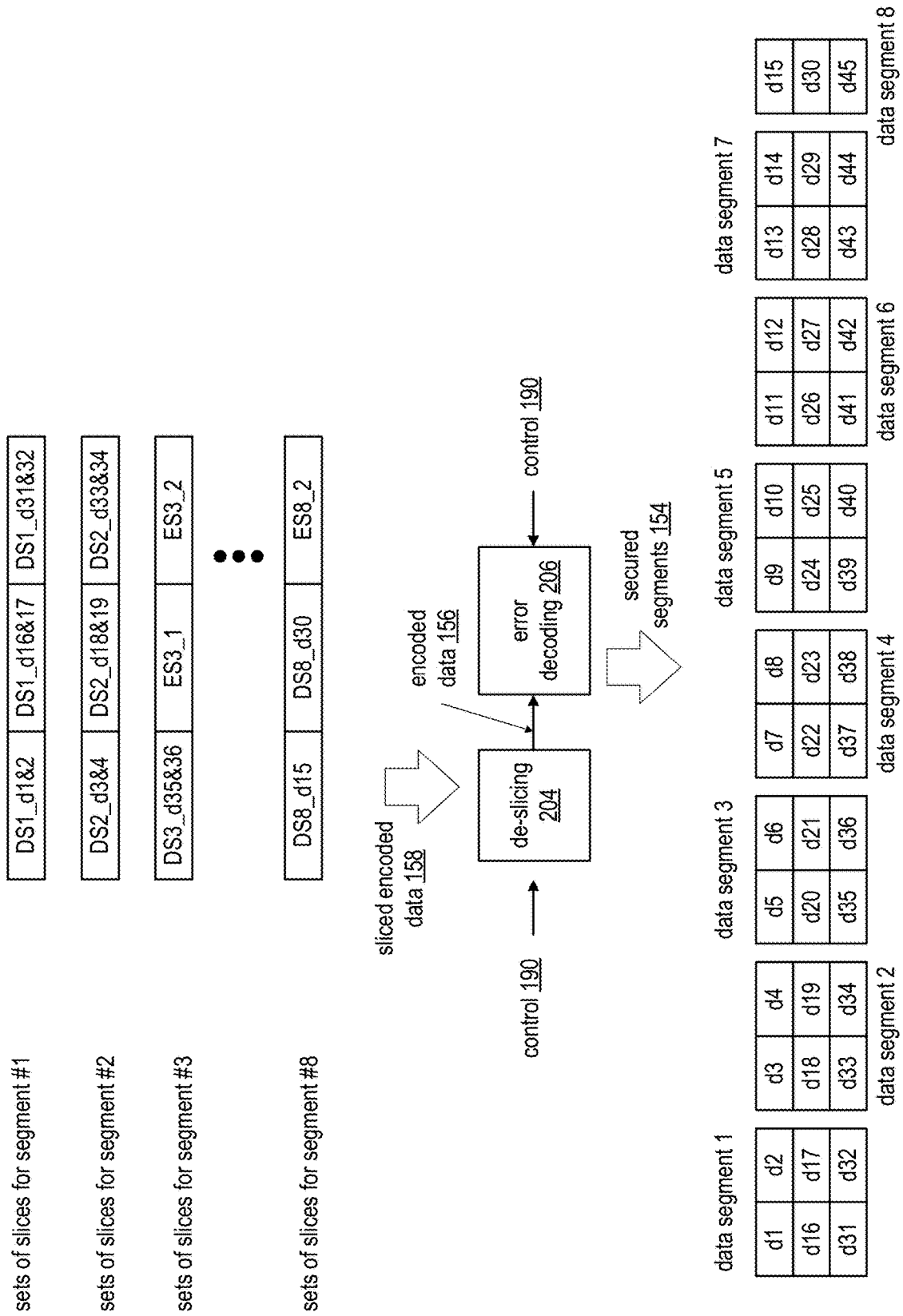
FIG. 17 is a diagram of an example of de-slicing and error decoding processing of the dispersed error decoding in accordance with the present disclosure.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
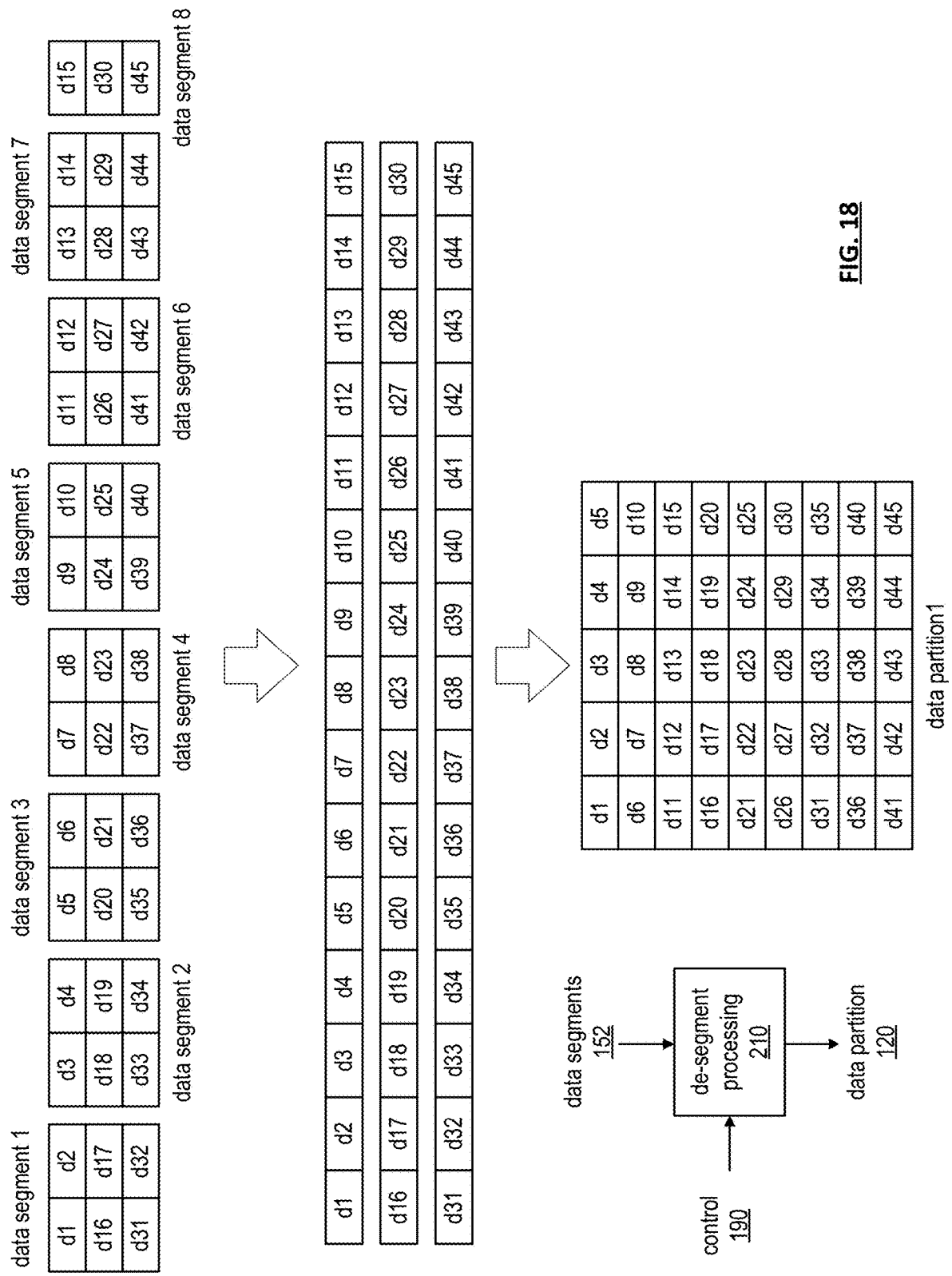
FIG. 18 is a diagram of an example of a de-segment processing of the dispersed error decoding in accordance with the present disclosure.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
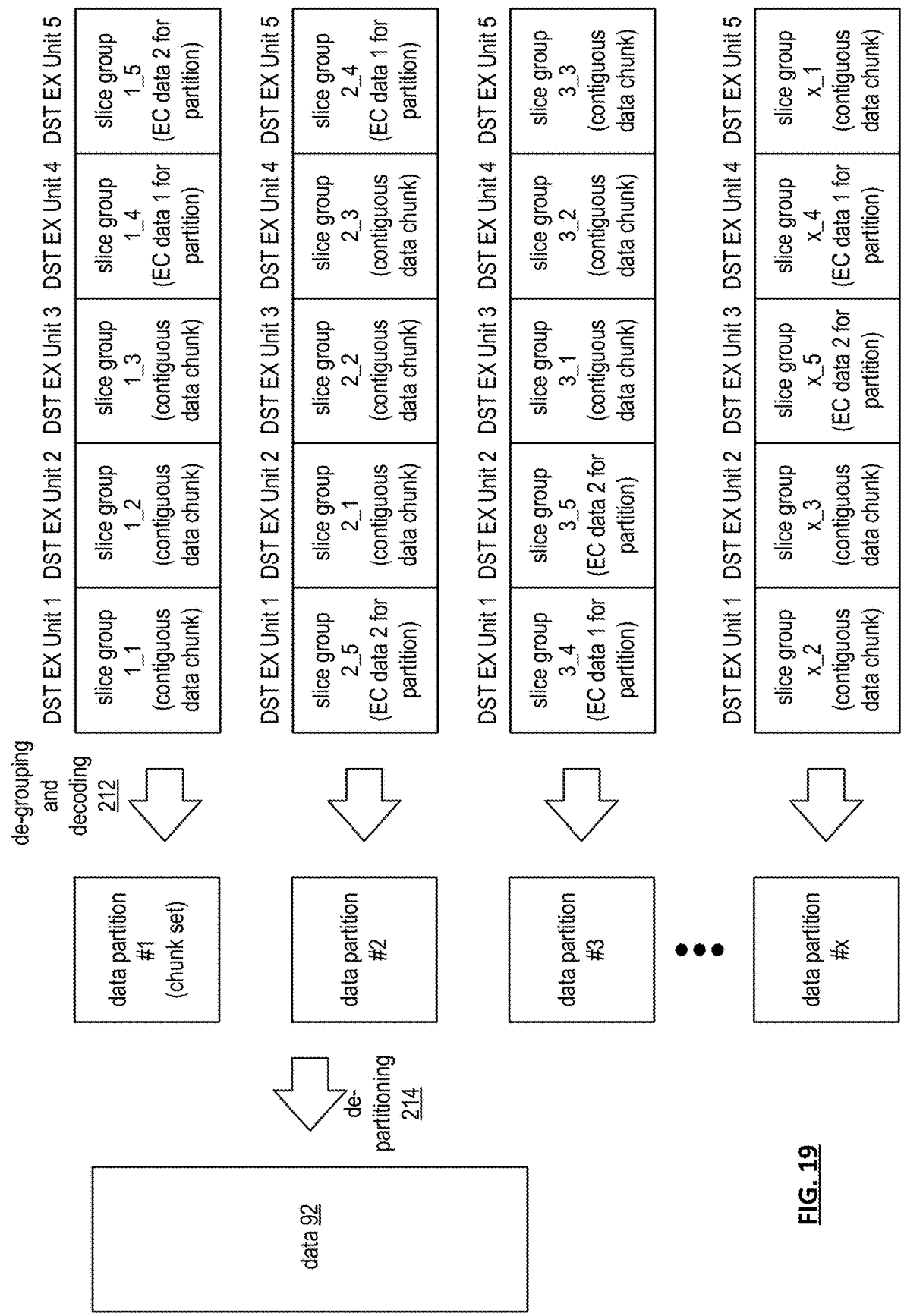
FIG. 19 is a diagram of an example of converting slice groups into data in accordance with the present disclosure.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
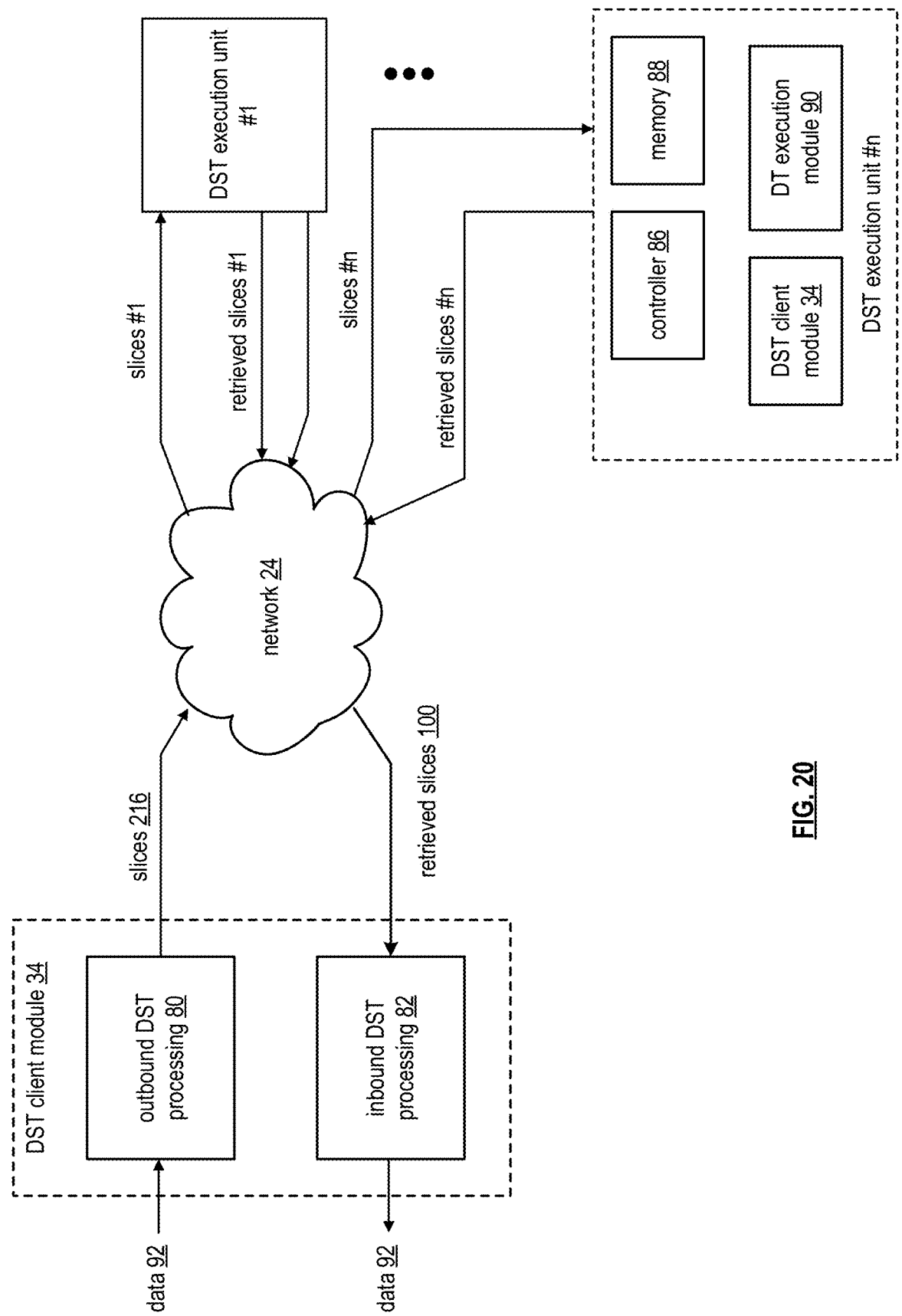
FIG. 20 is a diagram of an example of a distributed storage within the distributed computing system in accordance with the present disclosure.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
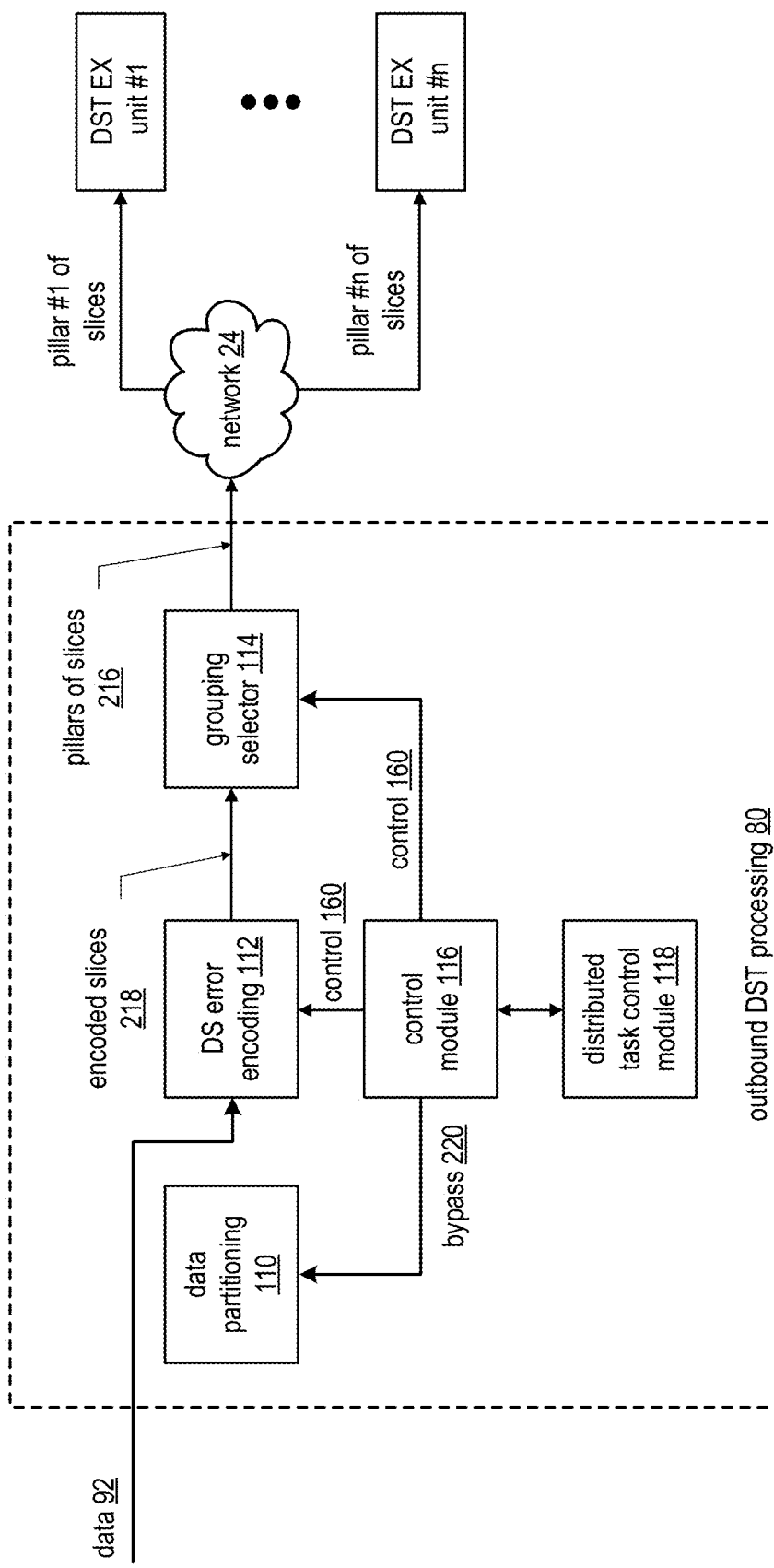
FIG. 21 is a schematic block diagram of an example of operation of outbound distributed storage and/or task (DST) processing for storing data in accordance with the present disclosure.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
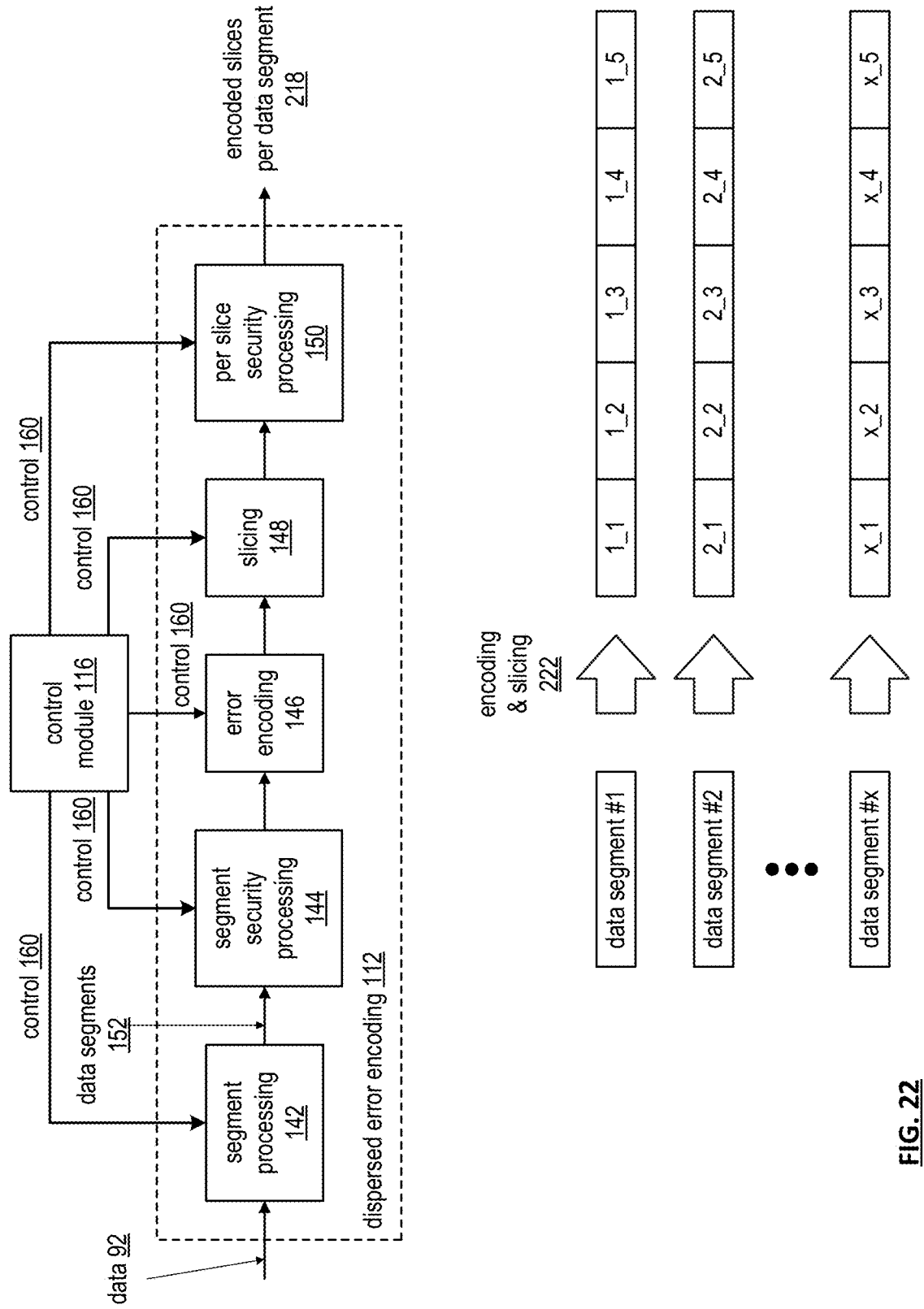
FIG. 22 is a schematic block diagram of an example of a dispersed error encoding for the example of FIG. 21 in accordance with the present disclosure.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
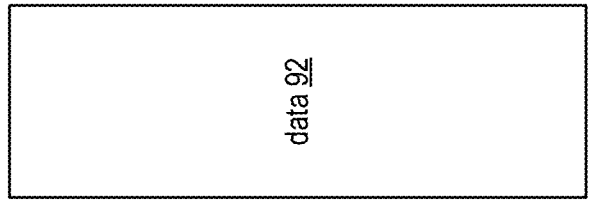
FIG. 23 is a diagram of an example of converting data into pillar slice groups for storage in accordance with the present disclosure.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
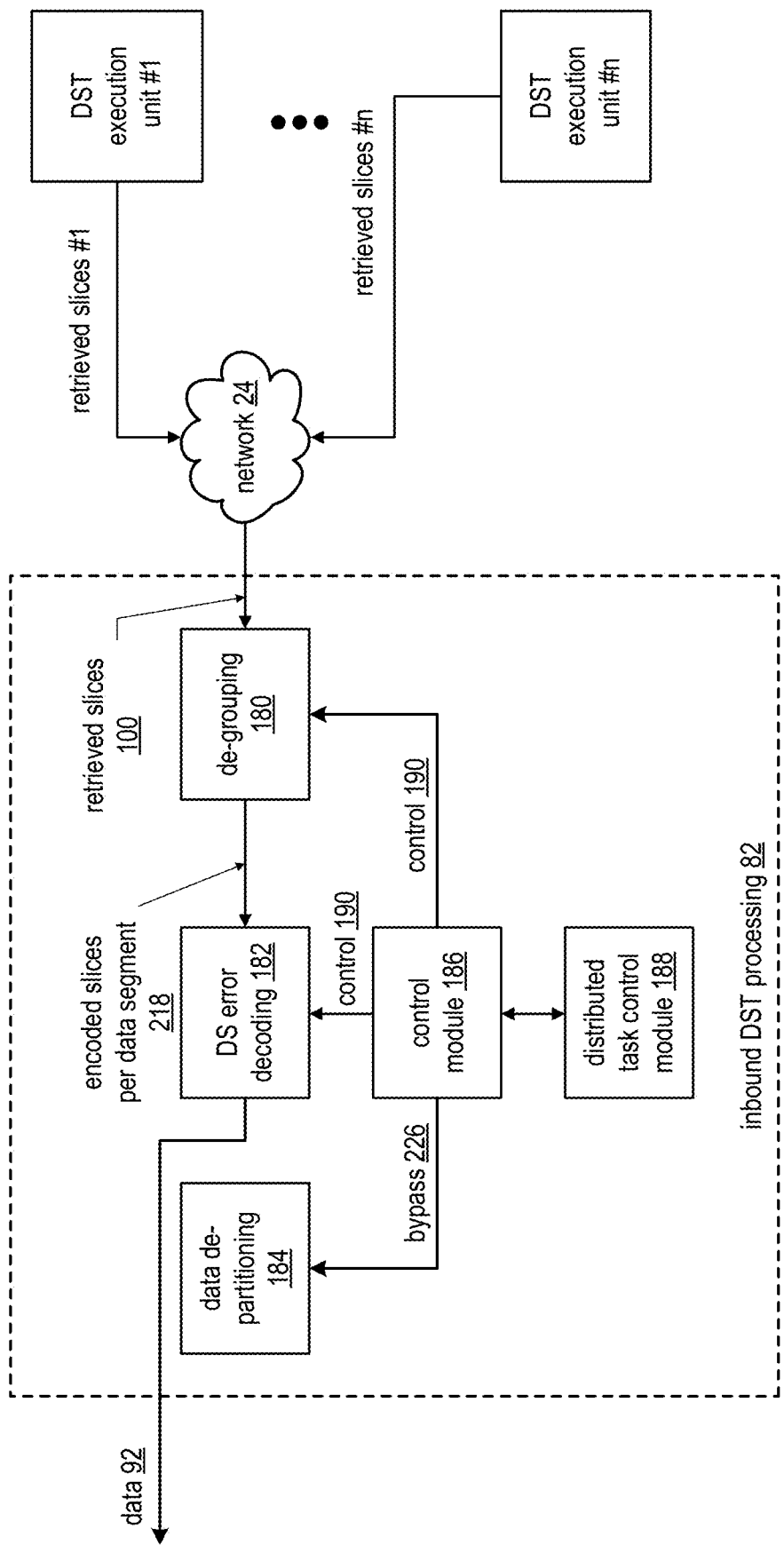
FIG. 25 is a schematic block diagram of an example of operation of inbound distributed storage and/or task (DST) processing for retrieving dispersed error encoded data in accordance with the present disclosure.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
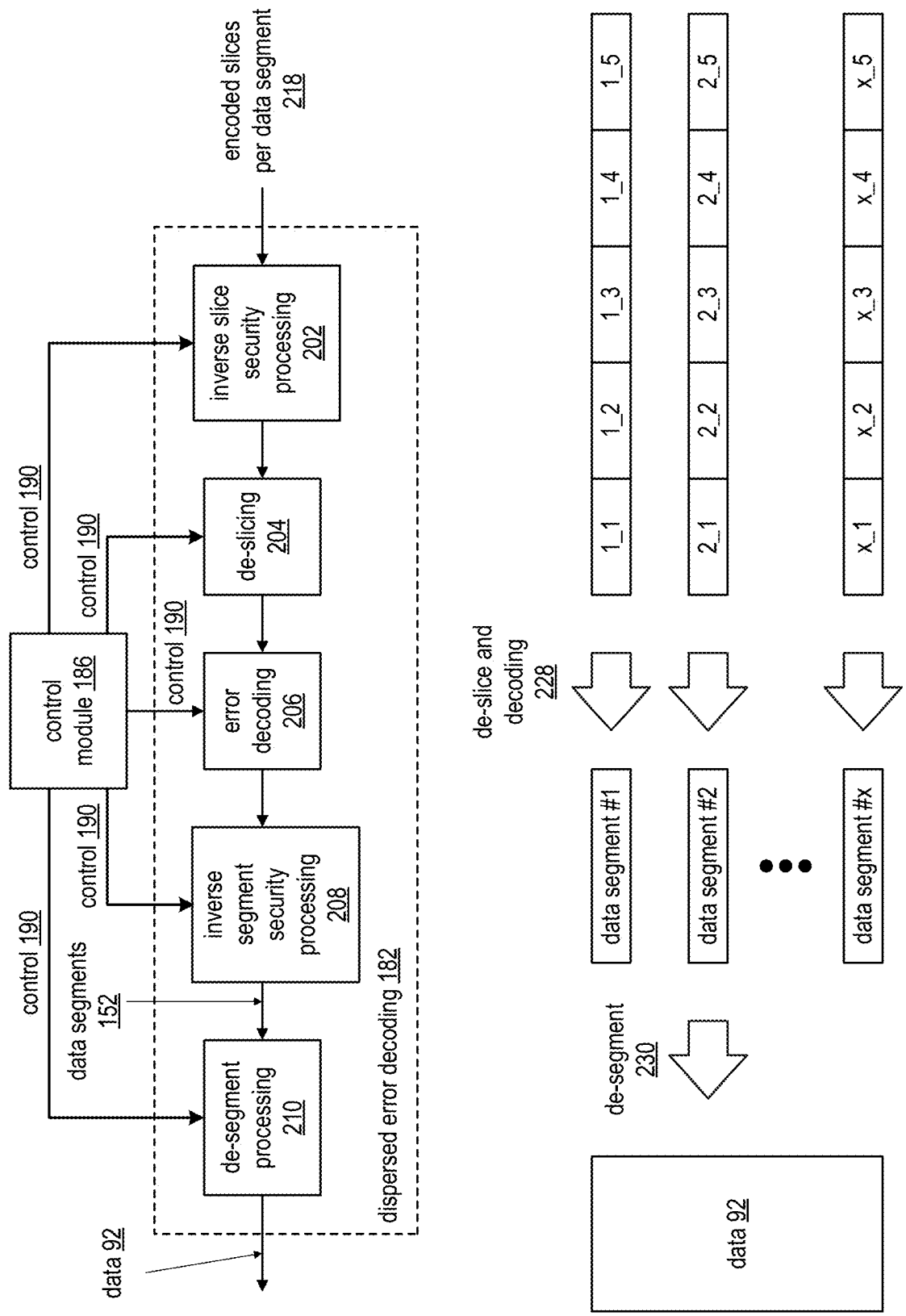
FIG. 26 is a schematic block diagram of an example of a dispersed error decoding for the example of FIG. 25 in accordance with the present disclosure.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, un-secures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, un-secures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
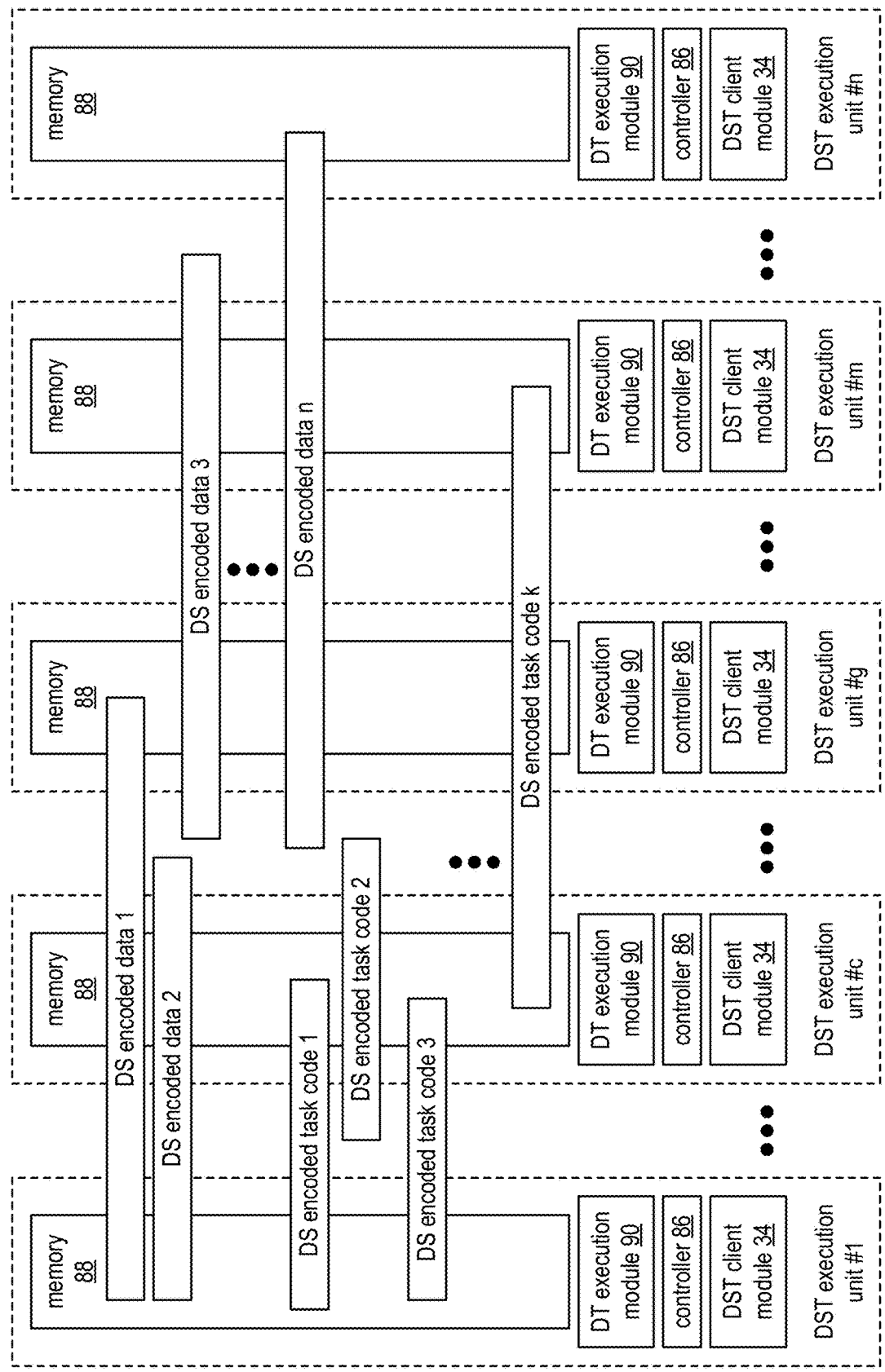
FIG. 27 is a schematic block diagram of an example of a distributed storage and task processing network (DSTN) module storing a plurality of data and a plurality of task codes in accordance with the present disclosure.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a computing device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
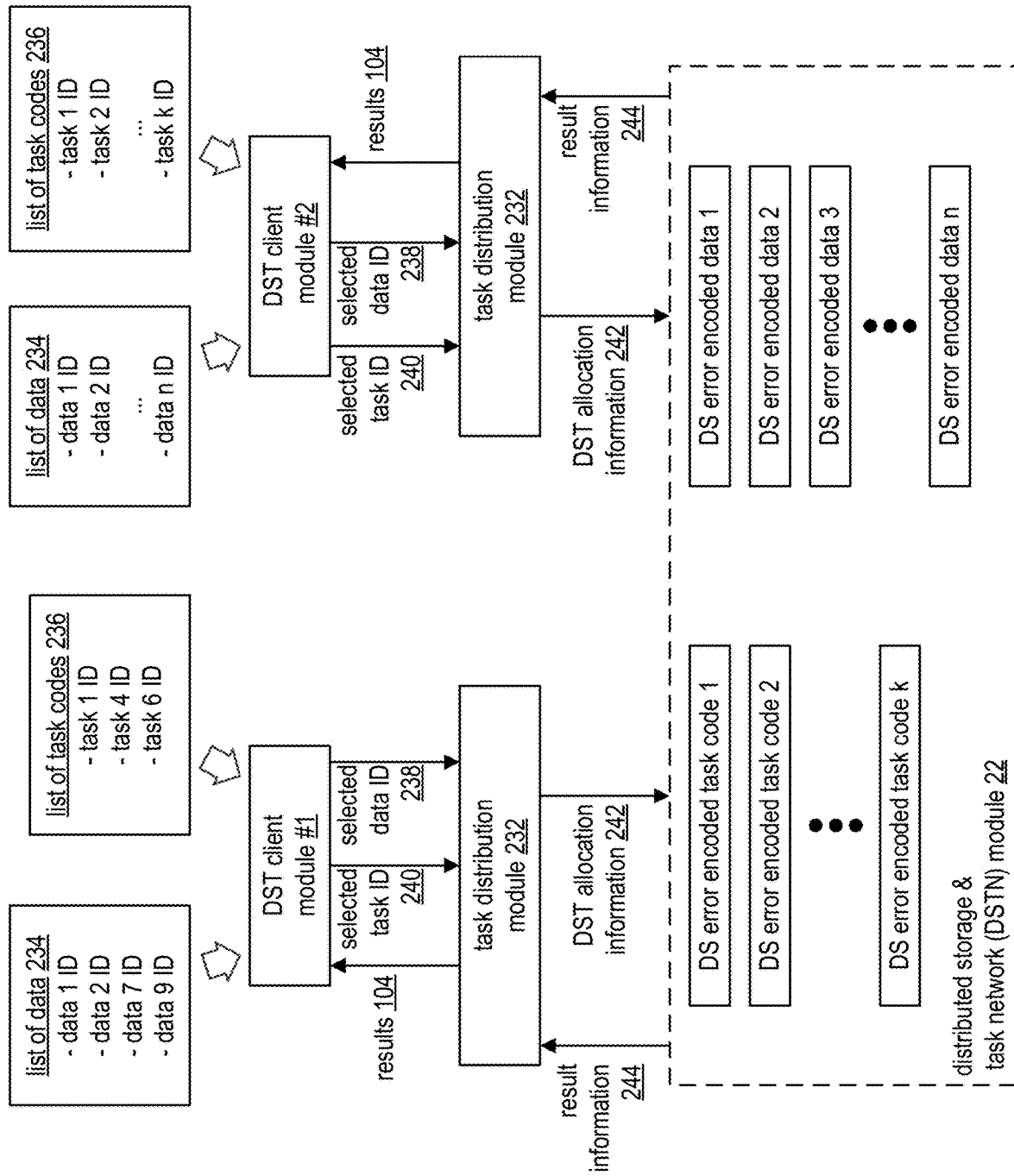
FIG. 28 is a schematic block diagram of an example of the distributed computing system performing tasks on stored data in accordance with the present disclosure.

FIG. 28 is a schematic block diagram of an example of a distributed computing system performing tasks on stored data. In this example, two distributed storage and task (DST) client modules 1-2 are shown: the first may be associated with a computing device and the second may be associated with a DST processing unit or a high priority computing device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the computing device associated with the first DST client module has fewer privileges in the distributed computing system than the device associated with the second DST client module. Alternatively, this may occur because the computing device associated with the first DST client module serves fewer users than the device associated with the second DST client module and is restricted by the distributed computing system accordingly. As yet another alternative, this may occur through no restraints by the distributed computing system, it just occurred because the operator of the computing device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the computing device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
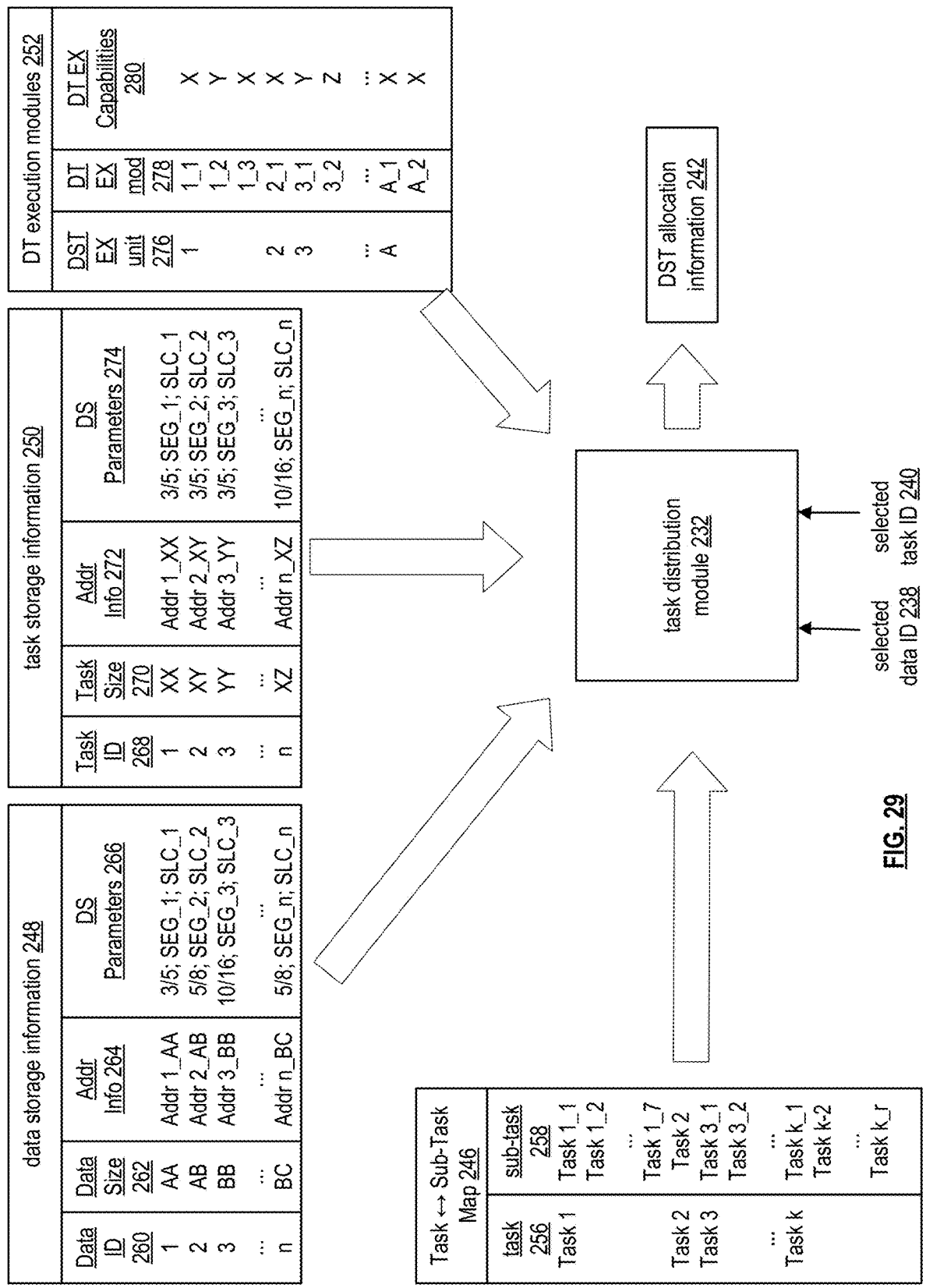
FIG. 29 is a schematic block diagram of an embodiment of a task distribution module facilitating the example of FIG. 28 in accordance with the present disclosure.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
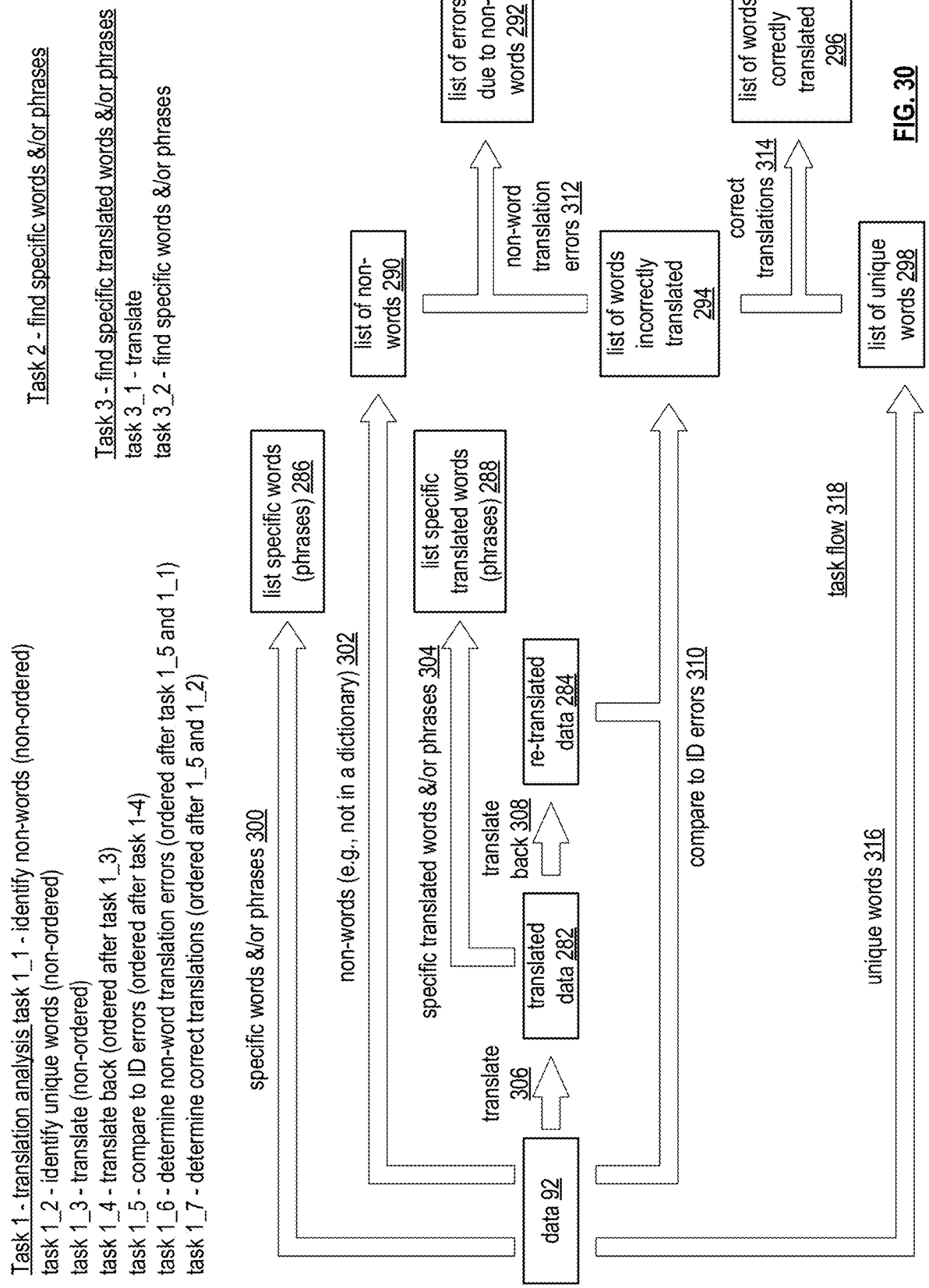
FIG. 30 is a diagram of a specific example of the distributed computing system performing tasks on stored data in accordance with the present disclosure.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
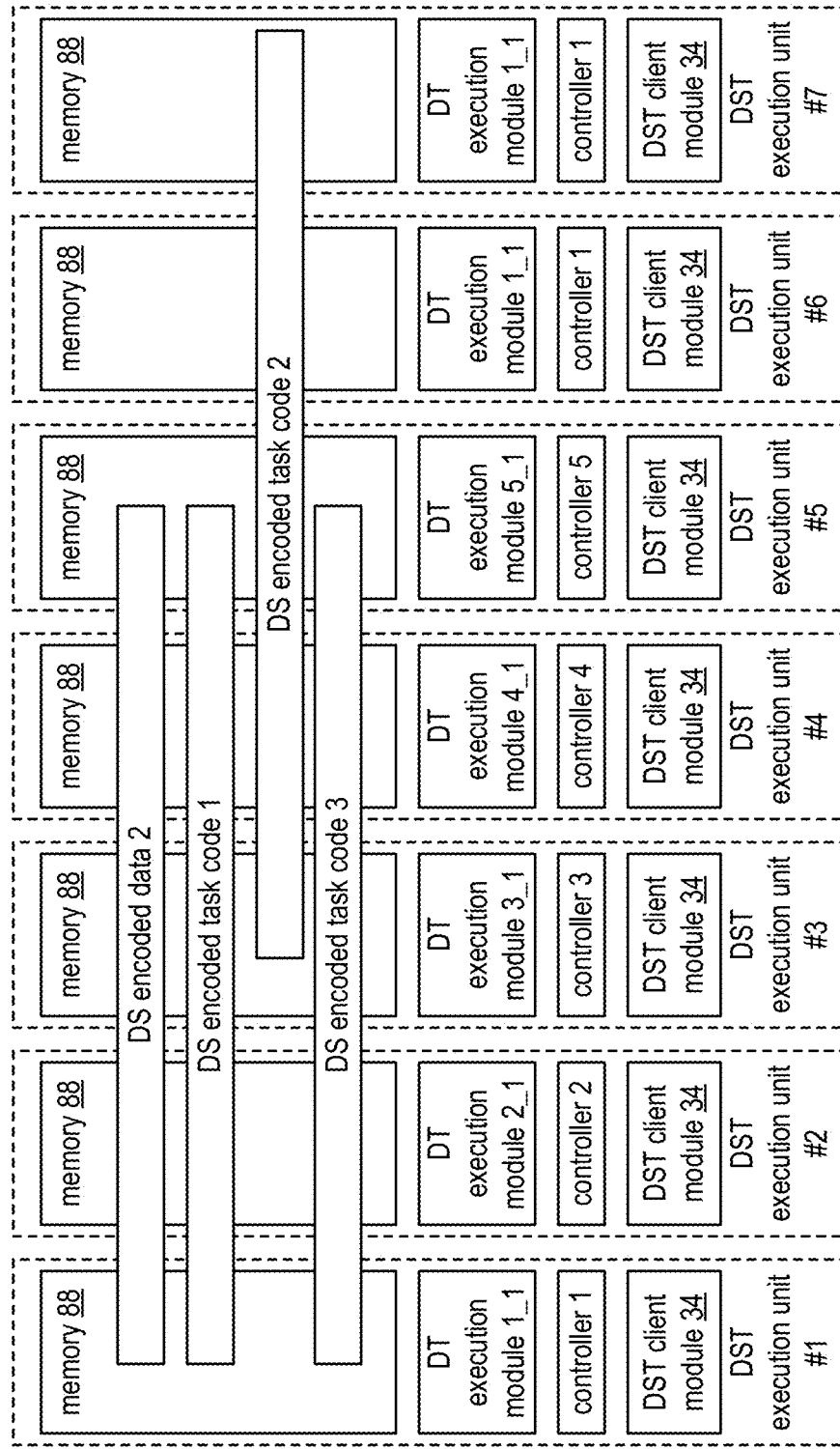
FIG. 31 is a schematic block diagram of an example of a distributed storage and task processing network (DSTN) module storing data and task codes for the example of FIG. 30 in accordance with the present disclosure.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
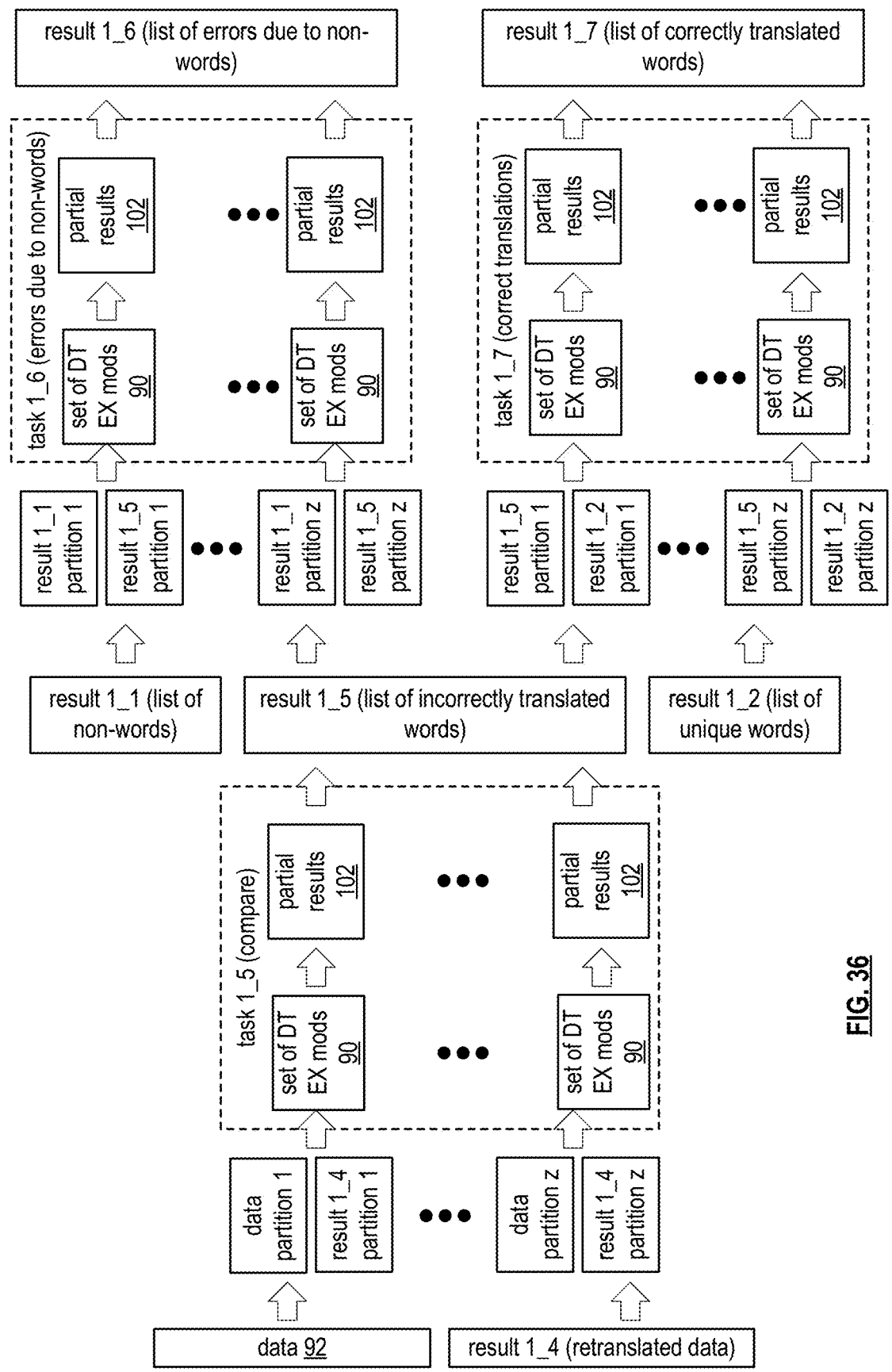

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
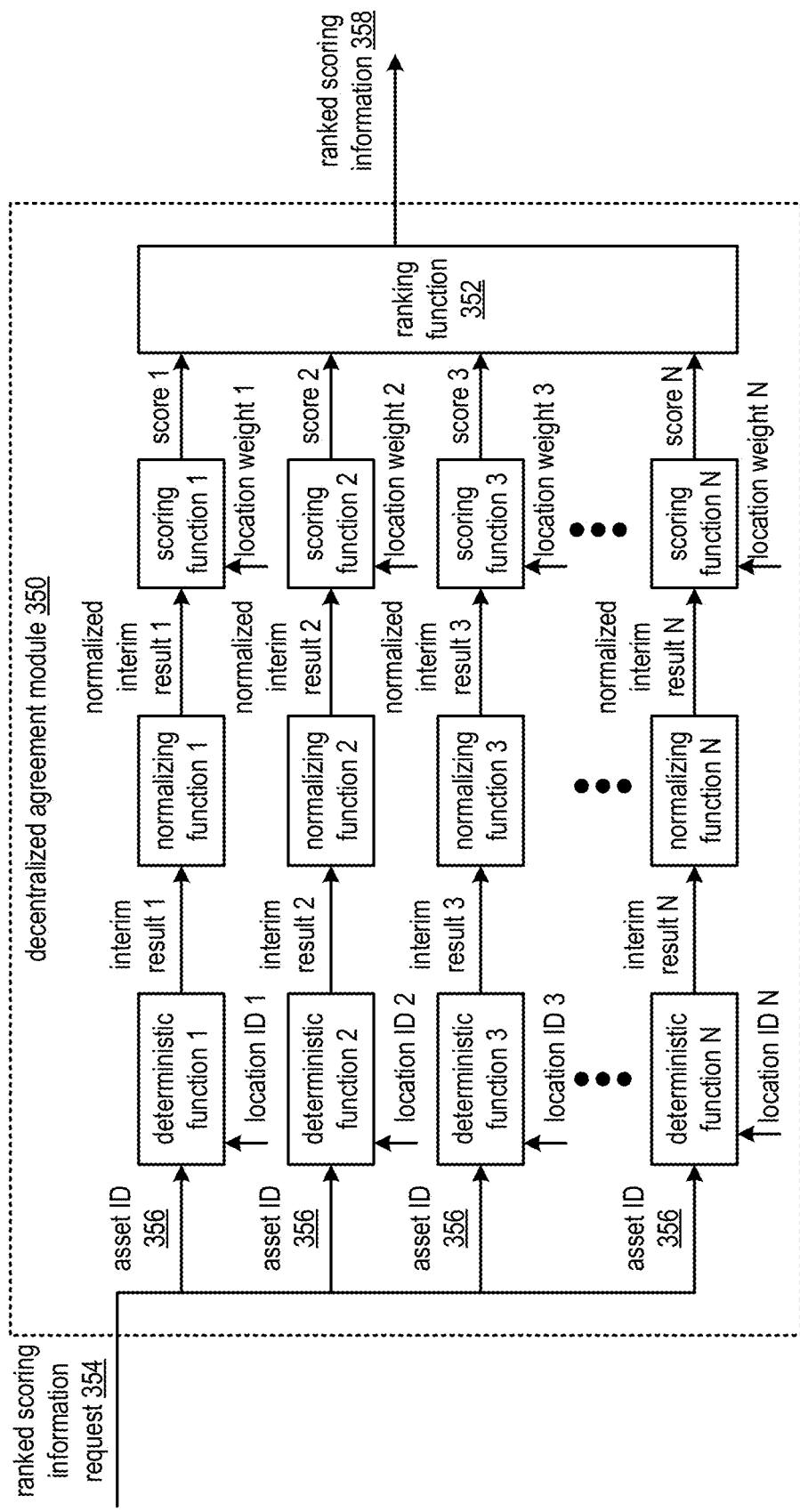
FIG. 40A is a schematic block diagram of an embodiment of a decentralized agreement module in accordance with the present disclosure.

FIG. 40A is a schematic block diagram of an embodiment of a decentralized agreement module 350 that includes a set of deterministic functions 1-N, a set of normalizing functions 1-N, a set of scoring functions 1-N, and a ranking function 352. Each of the deterministic function, the normalizing function, the scoring function, and the ranking function 352, may be implemented utilizing the processing module 84 of FIG. 3. The decentralized agreement module 350 may be implemented utilizing any module and/or unit of a dispersed storage network (DSN). For example, the decentralized agreement module is implemented utilizing the distributed storage and task (DST) client module 34 of FIG. 1.

The decentralized agreement module 350 functions to receive a ranked scoring information request 354 and to generate ranked scoring information 358 based on the ranked scoring information request 354 and other information. The ranked scoring information request 354 includes one or more of an asset identifier (ID) 356 of an asset associated with the request, an asset type indicator, one or more location identifiers of locations associated with the DSN, one or more corresponding location weights, and a requesting entity ID. The asset includes any portion of data associated with the DSN including one or more asset types including a data object, a data record, an encoded data slice, a data segment, a set of encoded data slices, and a plurality of sets of encoded data slices. As such, the asset ID 356 of the asset includes one or more of a data name, a data record identifier, a source name, a slice name, and a plurality of sets of slice names.

Each location of the DSN includes an aspect of a DSN resource. Examples of locations includes one or more of a storage unit, a memory device of the storage unit, a site, a storage pool of storage units, a pillar index associated with each encoded data slice of a set of encoded data slices generated by an information dispersal algorithm (IDA), a DST client module 34 of FIG. 1, a DST processing unit 16 of FIG. 1, a DST integrity processing unit 20 of FIG. 1, a DSTN managing unit 18 of FIG. 1, a computing device 12 of FIG. 1, and a computing device 14 of FIG. 1.

Each location is associated with a location weight based on one or more of a resource prioritization of utilization scheme and physical configuration of the DSN. In some embodiments, the location weight includes an arbitrary bias which adjusts a proportion of selections to an associated location such that a probability that an asset will be mapped to that location is equal to the location weight divided by a sum of all location weights for all locations of comparison. For example, each storage pool of a plurality of storage pools is associated with a location weight based on storage capacity. For instance, storage pools with more storage capacity are associated with higher location weights than others. The other information may include a set of location identifiers and a set of location weights associated with the set of location identifiers. For example, the other information includes location identifiers and location weights associated with a set of memory devices of a storage unit when the requesting entity utilizes the decentralized agreement module 350 to produce ranked scoring information 358 with regards to selection of a memory device of the set of memory devices for accessing a particular encoded data slice (e.g., where the asset ID includes a slice name of the particular encoded data slice).

The decentralized agreement module 350 outputs substantially identical ranked scoring information for each ranked scoring information request that includes substantially identical content of the ranked scoring information request. For example, a first requesting entity issues a first ranked scoring information request to the decentralized agreement module 350 and receives first ranked scoring information. A second requesting entity issues a second ranked scoring information request to the decentralized agreement module and receives second ranked scoring information. The second ranked scoring information is substantially the same as the first ranked scoring information when the second ranked scoring information request is substantially the same as the first ranked scoring information request.

As such, two or more requesting entities may utilize the decentralized agreement module 350 to determine substantially identical ranked scoring information. As a specific example, the first requesting entity selects a first storage pool of a plurality of storage pools for storing a set of encoded data slices utilizing the decentralized agreement module 350 and the second requesting entity identifies the first storage pool of the plurality of storage pools for retrieving the set of encoded data slices utilizing the decentralized agreement module 350.

In an example of operation, the decentralized agreement module 350 receives the ranked scoring information request 354. Each deterministic function performs a deterministic function on a combination and/or concatenation (e.g., add, append, interleave) of the asset ID 356 of the ranked scoring information request 354 and an associated location ID of the set of location IDs to produce an interim result. The deterministic function includes at least one of a hashing function, a hash-based message authentication code function, a mask generating function, a cyclic redundancy code function, hashing module of a number of locations, consistent hashing, rendezvous hashing, and a sponge function. As a specific example, deterministic function 2 appends a location ID 2 of a storage pool 2 to a source name as the asset ID to produce a combined value and performs the mask generating function on the combined value to produce interim result 2.

With a set of interim results 1-N, each normalizing function performs a normalizing function on a corresponding interim result to produce a corresponding normalized interim result. The performing of the normalizing function includes dividing the interim result by a number of possible permutations of the output of the deterministic function to produce the normalized interim result. For example, normalizing function 2 performs the normalizing function on the interim result 2 to produce a normalized interim result 2.

With a set of normalized interim results 1-N, each scoring function performs a scoring function on a corresponding normalized interim result to produce a corresponding score. The performing of the scoring function includes dividing an associated location weight by a negative log of the normalized interim result. For example, scoring function 2 divides location weight 2 of the storage pool 2 (e.g., associated with location ID 2) by a negative log of the normalized interim result 2 to produce a score 2.

With a set of scores 1-N, the ranking function 352 performs a ranking function on the set of scores 1-N to generate the ranked scoring information 358. The ranking function includes rank ordering each score with other scores of the set of scores 1-N, where a highest score is ranked first. As such, a location associated with the highest score may be considered a highest priority location for resource utilization (e.g., accessing, storing, retrieving, etc., the given asset of the request). Having generated the ranked scoring information 358, the decentralized agreement module 350 outputs the ranked scoring information 358 to the requesting entity.

Figure 40B:
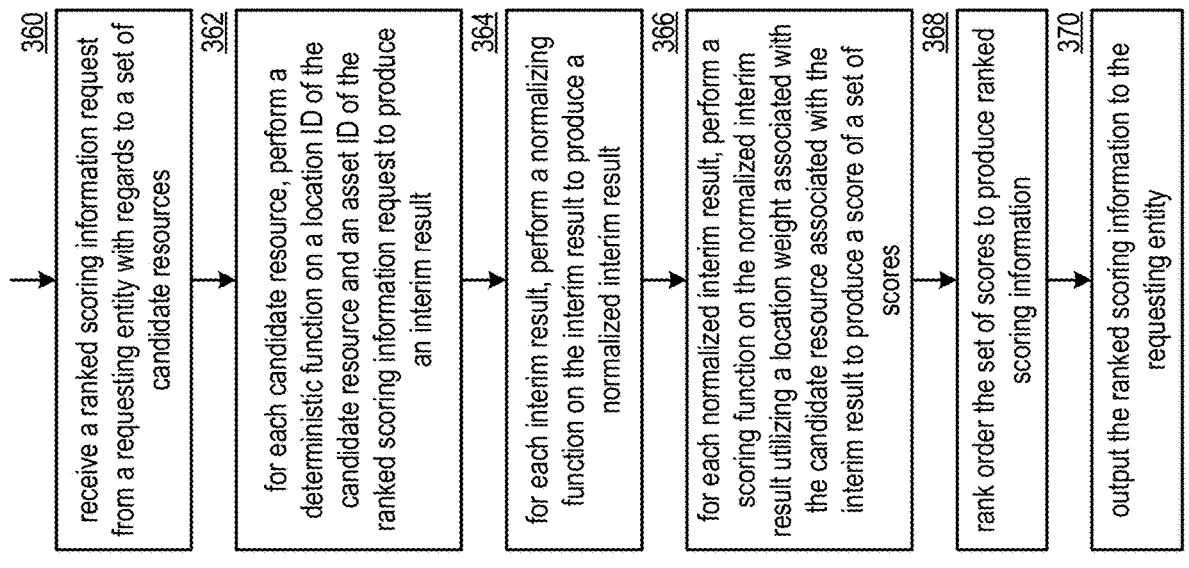
FIG. 40B is a flowchart illustrating an example of selecting the resource in accordance with the present disclosure.

FIG. 40B is a flowchart illustrating an example of selecting a resource. The method begins or continues at step 360 where a processing module (e.g., of a decentralized agreement module) receives a ranked scoring information request from a requesting entity with regards to a set of candidate resources. For each candidate resource, the method continues at step 362 where the processing module performs a deterministic function on a location identifier (ID) of the candidate resource and an asset ID of the ranked scoring information request to produce an interim result. As a specific example, the processing module combines the asset ID and the location ID of the candidate resource to produce a combined value and performs a hashing function on the combined value to produce the interim result.

For each interim result, the method continues at step 364 where the processing module performs a normalizing function on the interim result to produce a normalized interim result. As a specific example, the processing module obtains a permutation value associated with the deterministic function (e.g., maximum number of permutations of output of the deterministic function) and divides the interim result by the permutation value to produce the normalized interim result (e.g., with a value between 0 and 1).

For each normalized interim result, the method continues at step 366 where the processing module performs a scoring function on the normalized interim result utilizing a location weight associated with the candidate resource associated with the interim result to produce a score of a set of scores. As a specific example, the processing module divides the location weight by a negative log of the normalized interim result to produce the score.

The method continues at step 368 where the processing module rank orders the set of scores to produce ranked scoring information (e.g., ranking a highest value first). The method continues at step 370 where the processing module outputs the ranked scoring information to the requesting entity. The requesting entity may utilize the ranked scoring information to select one location of a plurality of locations.

Figure 40C:
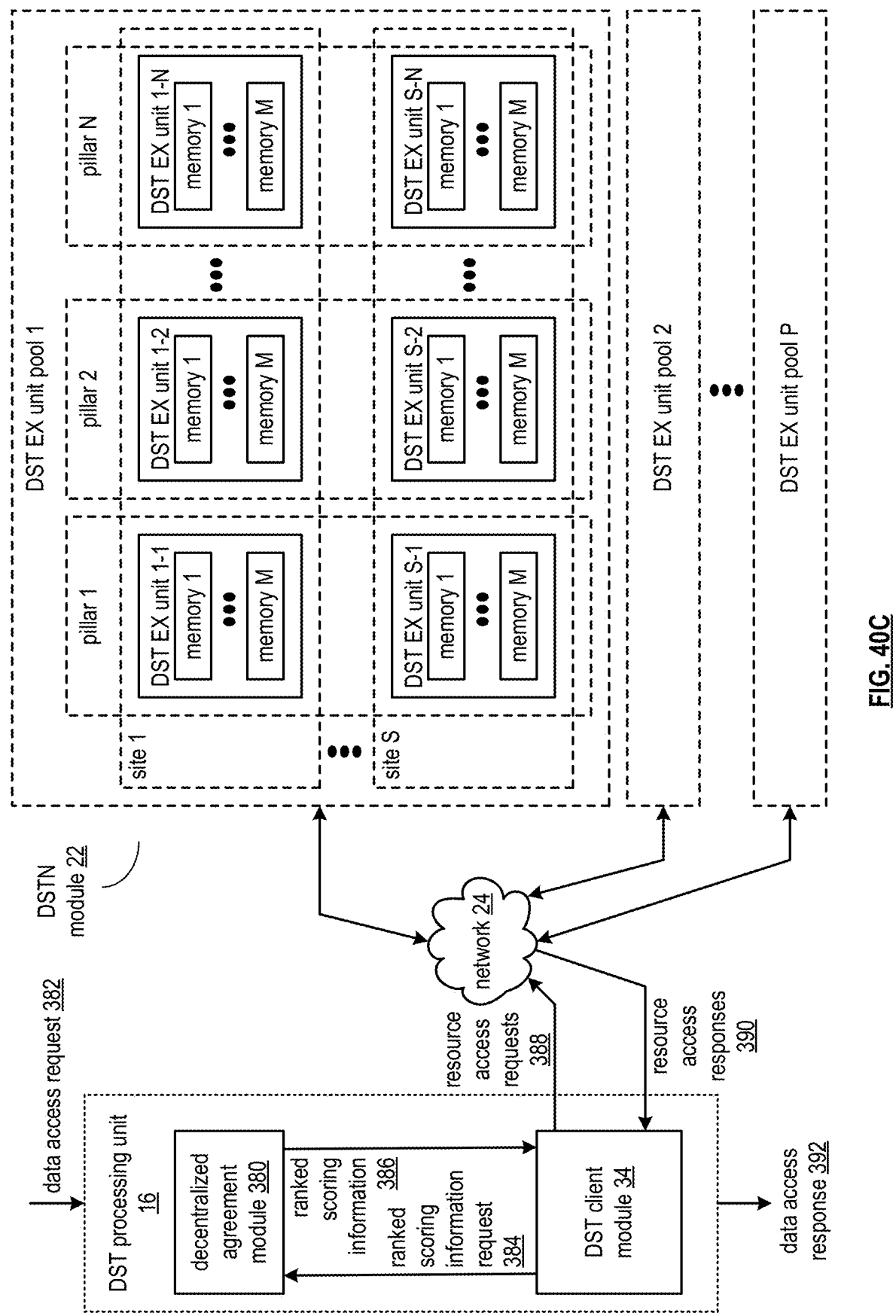
FIG. 40C is a schematic block diagram of an embodiment of a dispersed storage network (DSN) in accordance with the present disclosure.

FIG. 40C is a schematic block diagram of an embodiment of a dispersed storage network (DSN) that includes the distributed storage and task (DST) processing unit 16 of FIG. 1, the network 24 of FIG. 1, and the distributed storage and task network (DSTN) module 22 of FIG. 1. Hereafter, the DSTN module 22 may be interchangeably referred to as a DSN memory. The DST processing unit 16 includes a decentralized agreement module 380 and the DST client module 34 of FIG. 1. The decentralized agreement module 380 be implemented utilizing the decentralized agreement module 350 of FIG. 40A. The DSTN module 22 includes a plurality of DST execution (EX) unit pools 1-P. Each DST execution unit pool includes a one or more sites 1-S. Each site includes one or more DST execution units 1-N. Each DST execution unit may be associated with at least one pillar of N pillars associated with an information dispersal algorithm (IDA), where a data segment is dispersed storage error encoded using the IDA to produce one or more sets of encoded data slices, and where each set includes N encoded data slices and like encoded data slices (e.g., slice 3's) of two or more sets of encoded data slices are included in a common pillar (e.g., pillar 3). Each site may not include every pillar and a given pillar may be implemented at more than one site. Each DST execution unit includes a plurality of memories 1-M. Each DST execution unit may be implemented utilizing the DST execution unit 36 of FIG. 1. Hereafter, a DST execution unit may be referred to interchangeably as a storage unit and a set of DST execution units may be interchangeably referred to as a set of storage units and/or as a storage unit set.

The DSN functions to receive data access requests 382, select resources of at least one DST execution unit pool for data access, utilize the selected DST execution unit pool for the data access, and issue a data access response 392 based on the data access. The selecting of the resources includes utilizing a decentralized agreement function of the decentralized agreement module 380, where a plurality of locations are ranked against each other. The selecting may include selecting one storage pool of the plurality of storage pools, selecting DST execution units at various sites of the plurality of sites, selecting a memory of the plurality of memories for each DST execution unit, and selecting combinations of memories, DST execution units, sites, pillars, and storage pools.

In an example of operation, the DST client module 34 receives the data access request 382 from a requesting entity, where the data access request 382 includes at least one of a store data request, a retrieve data request, a delete data request, a data name, and a requesting entity identifier (ID). Having received the data access request 382, the DST client module 34 determines a DSN address associated with the data access request. The DSN address includes at least one of a source name (e.g., including a vault ID and an object number associated with the data name), a data segment ID, a set of slice names, a plurality of sets of slice names. The determining includes at least one of generating (e.g., for the store data request) and retrieving (e.g., from a DSN directory, from a dispersed hierarchical index) based on the data name (e.g., for the retrieve data request).

Having determined the DSN address, the DST client module 34 selects a plurality of resource levels (e.g., DST EX unit pool, site, DST execution unit, pillar, memory) associated with the DSTN module 22. The determining may be based on one or more of the data name, the requesting entity ID, a predetermination, a lookup, a DSN performance indicator, and interpreting an error message. For example, the DST client module 34 selects the DST execution unit pool as a first resource level and a set of memory devices of a plurality of memory devices as a second resource level based on a system registry lookup for a vault associated with the requesting entity.

Having selected the plurality resource levels, the DST client module 34, for each resource level, issues a ranked scoring information request 384 to the decentralized agreement module 380 utilizing the DSN address as an asset ID. The decentralized agreement module 380 performs the decentralized agreement function based on the asset ID (e.g., the DSN address), identifiers of locations of the selected resource levels, and location weights of the locations to generate ranked scoring information 386.

For each resource level, the DST client module 34 receives corresponding ranked scoring information 386. Having received the ranked scoring information 386, the DST client module 34 identifies one or more resources associated with the resource level based on the rank scoring information 386. For example, the DST client module 34 identifies a DST execution unit pool associated with a highest score and identifies a set of memory devices within DST execution units of the identified DST execution unit pool with a highest score.

Having identified the one or more resources, the DST client module 34 accesses the DSTN module 22 based on the identified one or more resources associated with each resource level. For example, the DST client module 34 issues resource access requests 388 (e.g., write slice requests when storing data, read slice requests when recovering data) to the identified DST execution unit pool, where the resource access requests 388 further identify the identified set of memory devices. Having accessed the DSTN module 22, the DST client module 34 receives resource access responses 390 (e.g., write slice responses, read slice responses). The DST client module 34 issues the data access response 392 based on the received resource access responses 390. For example, the DST client module 34 decodes received encoded data slices to reproduce data and generates the data access response 392 to include the reproduced data.

FIG. 40D is a flowchart illustrating an example of accessing a dispersed storage network (DSN) memory. The method begins or continues at step 394 where a processing module (e.g., of a distributed storage and task (DST) client module) receives a data access request from a requesting entity. The data access request includes one or more of a storage request, a retrieval request, a requesting entity identifier, and a data identifier (ID). The method continues at step 396 where the processing module determines a DSN address associated with the data access request. For example, the processing module generates the DSN address for the storage request. As another example, the processing module performs a lookup for the retrieval request based on the data identifier.

The method continues at step 398 where the processing module selects a plurality resource levels associated with the DSN memory. The selecting may be based on one or more of a predetermination, a range of weights associated with available resources, a resource performance level, and a resource performance requirement level. For each resource level, the method continues at step 400 where the processing module determines ranked scoring information. For example, the processing module issues a ranked scoring information request to a decentralized agreement module based on the DSN address and receives corresponding ranked scoring information for the resource level, where the decentralized agreement module performs a decentralized agreement protocol function on the DSN address using the associated resource identifiers and resource weights for the resource level to produce the ranked scoring information for the resource level.

For each resource level, the method continues at step 402 where the processing module selects one or more resources associated with the resource level based on the ranked scoring information. For example, the processing module selects a resource associated with a highest score when one resource is required. As another example, the processing module selects a plurality of resources associated with highest scores when a plurality of resources are required.

The method continues at step 404 where the processing module accesses the DSN memory utilizing the selected one or more resources for each of the plurality of resource levels. For example, the processing module identifies network addressing information based on the selected resources including one or more of a storage unit Internet protocol address and a memory device identifier, generates a set of encoded data slice access requests based on the data access request and the DSN address, and sends the set of encoded data slice access requests to the DSN memory utilizing the identified network addressing information.

The method continues at step 406 where the processing module issues a data access response to the requesting entity based on one or more resource access responses from the DSN memory. For example, the processing module issues a data storage status indicator when storing data. As another example, the processing module generates the data access response to include recovered data when retrieving data.

Figure 41A:
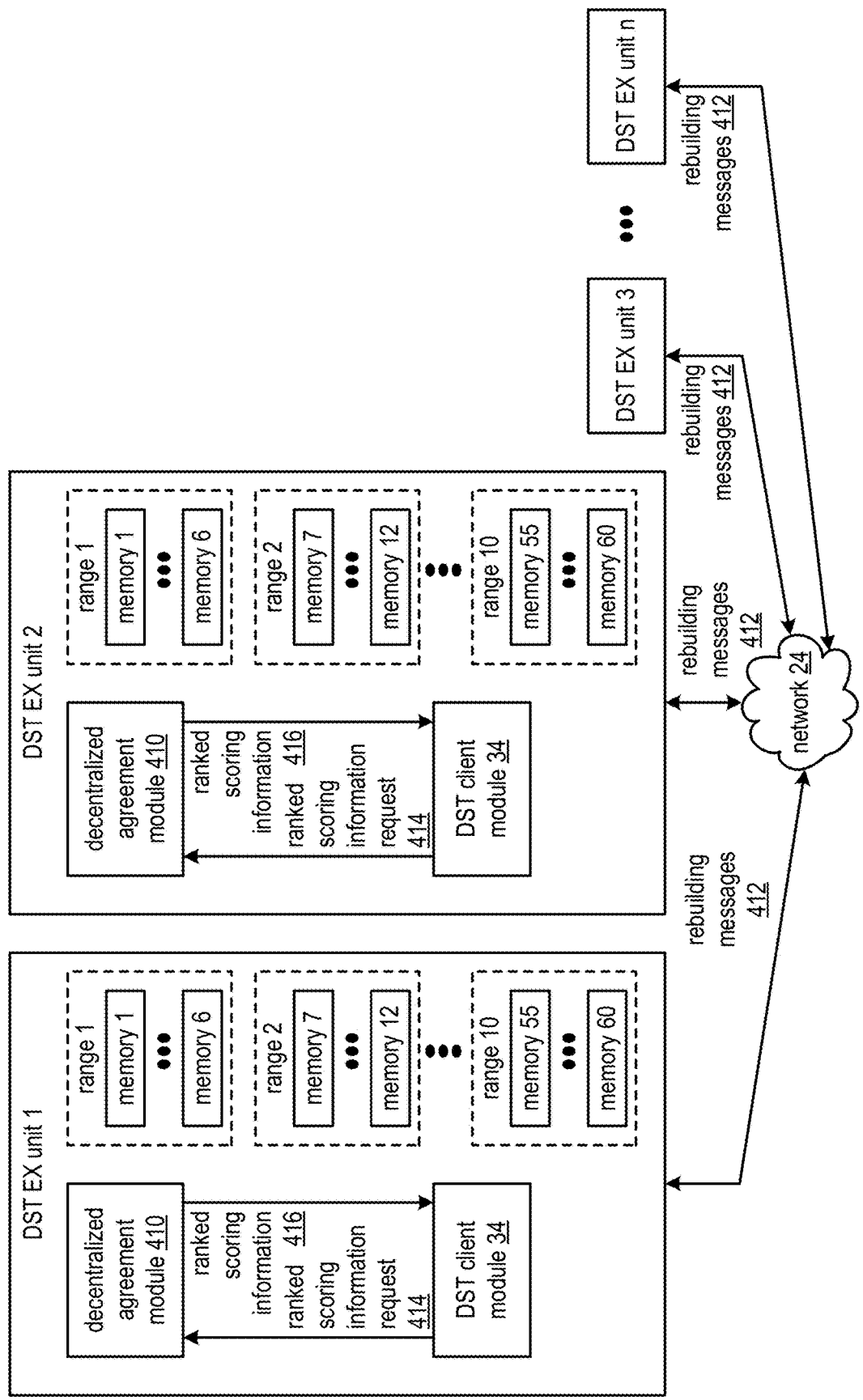
FIG. 41A is a schematic block diagram of another embodiment of a dispersed storage network (DSN) in accordance with the present disclosure.

FIG. 41A is a schematic block diagram of another embodiment of a dispersed storage network (DSN) that includes a set of distributed storage and task (DST) execution units 1-n and the network 24 of FIG. 1. Each DST execution unit includes a decentralized agreement module 410, the DST client module 34 of FIG. 1, and a plurality of memories 1-60. Each decentralized agreement module 410 may be implemented utilizing the decentralized agreement module 350 of FIG. 40A. Each memory may be implemented utilizing the memory 88 of FIG. 3.

The DSN functions to provide access to data stored as a plurality of sets of encoded data slices in the set of DST execution units and to rebuild encoded data slices associated with storage errors. In an example of operation of accessing the data, a DST client module 34 of a DST execution unit receives a slice access request that includes a slice name of an encoded data slice. Having received the slice name, the DST client module 34 identifies a range of DSN addresses of a plurality of ranges of DSN addresses associated with the DST execution unit (e.g., received, look up), where the range of DSN addresses includes a slice name. For example, each DST execution unit is associated with 10 DSN ranges, where each DSN address range is mapped to a subset of the plurality of memories. For instance, a second DSN address range is mapped to memories 7-12.

Having identified the range of DSN addresses, the DST client module 34 identifies a memory device of a corresponding subset of the plurality of memories using a decentralized agreement function based on the slice name and current location weights of each memory device of the subset of memory devices. For example, the DST client module 34 issues a ranked scoring information request 414 to the decentralized agreement module 410, receives the ranked scoring information 416, and identifies a memory device associated with a highest score.

Having identified the memory device, the DST client module 34 facilitates the slice access request with the identified memory device. For example, the DST client module 34 retrieves the encoded data slice from the identified memory device and sends the retrieved encoded data slice to a requesting entity when the slice access request includes a retrieve slice request. As another example, the DST client module 34 stores an encoded data slice of the slice access request into the identified memory device when the slice access request includes a store slice request.

In an example of operation of the rebuilding, the DST client module 34 detects a failed memory device within an associated subset of memory devices. The detecting includes at least one of interpreting an error message, performing a memory test, and interpreting a memory test result. Having detected the failed memory device, the DST client module 34 identifies the DSN address range associated with the subset of memory devices (e.g., a lookup). Having identified the DSN address range, the DST client module 34 facilitates rebuilding for the identified DSN address range by accessing the subset of memory devices, issuing rebuilding messages 412 to other DST execution units of the set of DST execution units, receiving further rebuilding messages 412 from the other DST execution units, identifying a missing encoded data slices of the subset of memory devices, and generating rebuilt encoded data slices.

Having facilitated the rebuilding, the DST client module 34 updates location weights of the subset of memory devices based on the failure. For example, the DST client module 34 zeros out location weight of the failed memory device and raises location weights of remaining memory devices of the subset of memory devices that includes the failed memory device. Having updated the location weights, the DST client module 34 facilitates storage of the rebuilt encoded data slices utilizing the decentralized agreement function based on corresponding slice names and the updated location weights of the memory devices of the subset of memory devices.

Figure 41B:
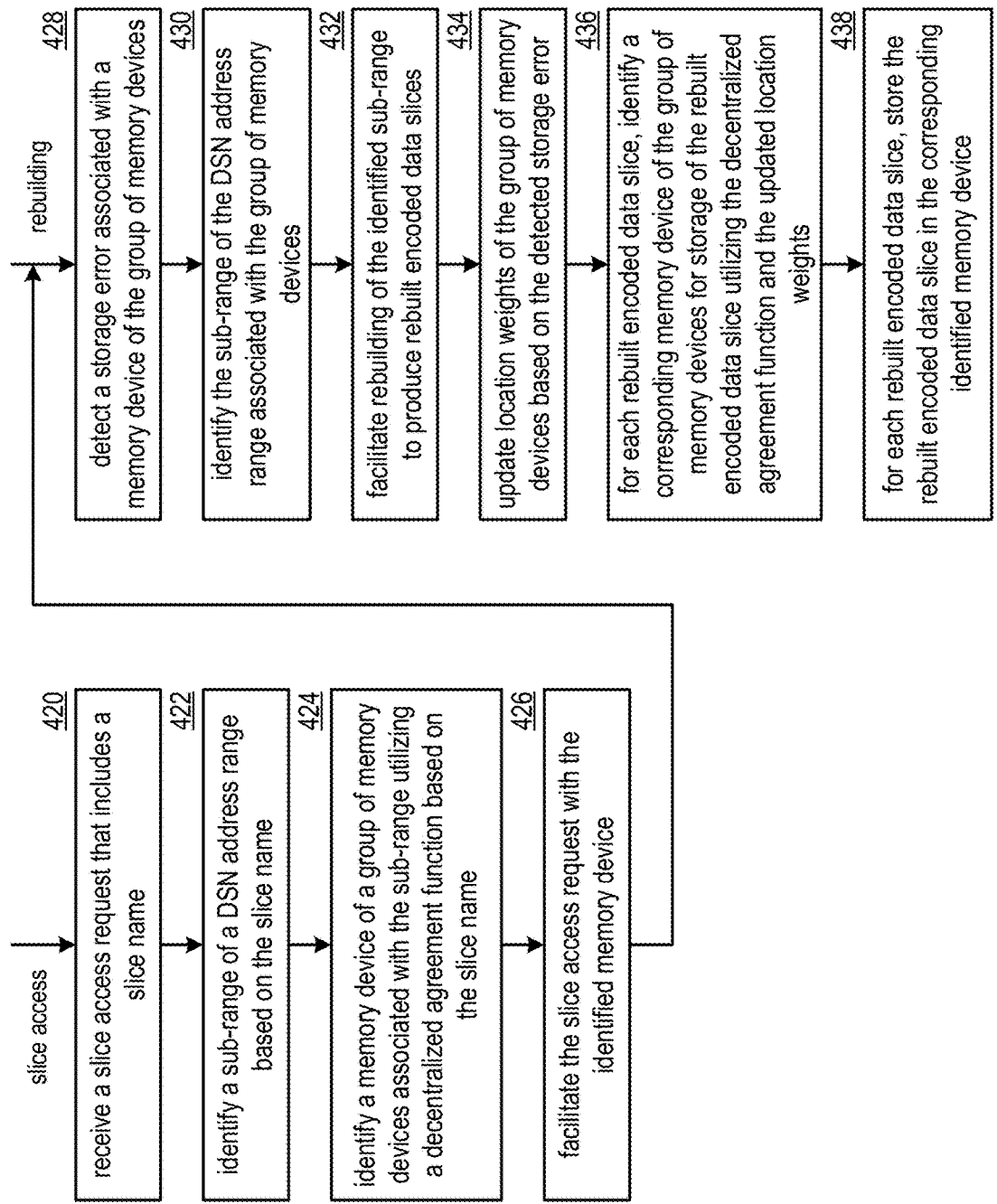
FIG. 41B is a flowchart illustrating an example of accessing and rebuilding encoded data slices in accordance with the present disclosure.

FIG. 41B is a flowchart illustrating an example of accessing and rebuilding encoded data slices. The method begins or continues, when accessing an encoded data slice, at step 420 where a processing module (e.g., of a distributed storage and task (DST) client module of a storage unit) receives a slice access request that includes a slice name. The method continues at step 422 where the processing module identifies a sub-range of a DSN address range associated with the storage unit. For example, the processing module accesses a slice name to sub-range table. As another example, the processing module performs a deterministic function on the slice name to produce the sub-range.

The method continues at step 424 where the processing module identifies a memory device of a group of memory devices associated with the sub-range utilizing a decentralized agreement function based on the slice name. For example, the processing module performs the decentralized agreement function to produce scores for each of the memory devices of a group of memory devices using one or more of location weights of each memory device, the slice name, and a memory group identifier. The method continues at step 426 where the processing module facilitates a slice access request with the identified memory device (e.g., store, retrieve, delete, list).

The method begins or continues, when rebuilding, at step 428 where the processing module detects a storage error associated with a memory device of the group of memory devices. The detecting includes one or more of receiving an error message, performing a memory device test, interpreting a memory device test result, detecting a corrupted slice, detecting a failed memory, and detecting a missing slice. The method continues at step 430 where the processing module identifies the sub-range of the DSN address range associated with a group of memory devices. For example, the processing module accesses the slice name to sub-range table using an identifier of the memory device.

The method continues at step 432 where the processing module facilitates rebuilding of the identified sub-range to produce rebuilt encoded data slices. The facilitating includes one or more of scanning for missing slices across the sub-range, acquiring a decode threshold number of slices for each missing slice, and generating rebuilt slices from the acquired slices. The method continues at step 434 where the processing module updates location weights of the group of memory devices based on the detected storage error. For example, the processing module updates a location weight for the failed memory device to zero and raises location weights for remaining memory devices of a group of memory devices in a total amount equivalent to a previous location weight for the failed memory device.

For each rebuilt encoded data slice, the method continues at step 436 where the processing module identifies a corresponding memory device of the group of memory devices for storage of the rebuilt encoded data slice utilizing the decentralized agreement function and the updated location weights. For example, the processing module performs the decentralized agreement function for each of the memory devices using updated location weights, a slice name of the rebuilt encoded data slice, and the memory group identifier to produce ranked scoring information. The processing module identifies the corresponding memory device associated with a highest score of the ranked scoring information.

For each rebuilt encoded data slice, the method continues at step 438 where the processing module stores the rebuilt encoded data slice in the corresponding identified memory device. For example, the processing module sends the encoded data slice to the identified corresponding memory device for each rebuilt encoded data slice.

Figure 42A:
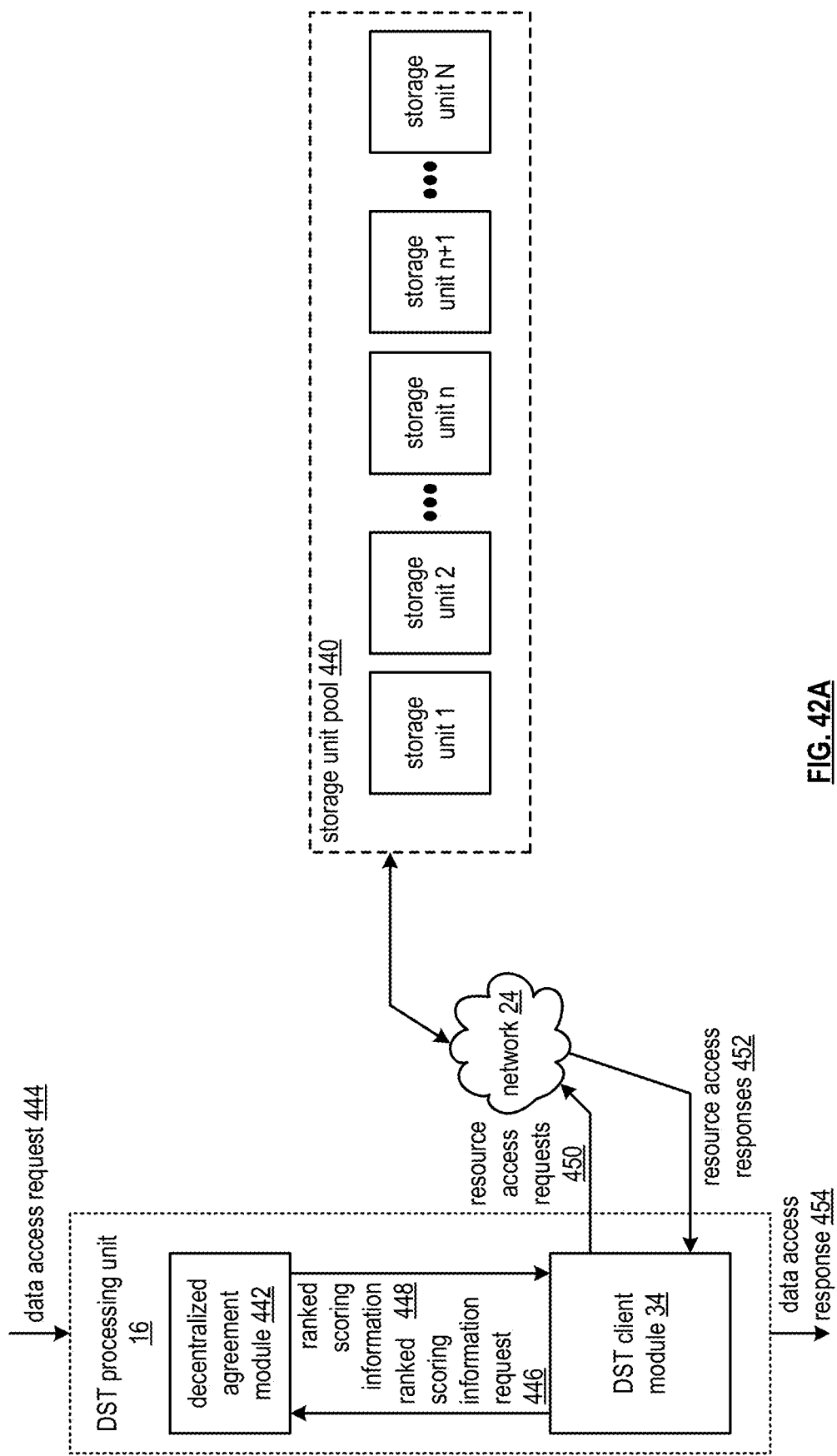
FIG. 42A is a schematic block diagram of another embodiment of a dispersed storage network (DSN) in accordance with the present disclosure.

FIG. 42A is a schematic block diagram of another embodiment of a dispersed storage network (DSN) that includes the distributed storage and task (DST) processing unit 16 of FIG. 1, the network 24 of FIG. 1, and a storage unit pool 440. The DST processing unit 16 includes a decentralized agreement module 442 and the DST client module 34 of FIG. 1. The decentralized agreement module 442 may be implemented utilizing the decentralized agreement module 350 of FIG. 40A. The storage unit pool 440 includes a plurality of storage units 1-N, where the plurality includes a subset of storage units 1-n such that n<N. For example, the subset of storage units includes an information dispersal algorithm (IDA) width number n of storage units (e.g., 16) of a total number of N storage units (e.g., N=20), where a decode threshold number of the IDA is 10, and where the decode threshold number of encoded data slices is required to recover data.

The DSN functions to access data stored as a plurality of sets of encoded data slices in the storage unit pool, where a decentralized agreement function is utilized to select storage units of the storage unit pool to facilitate the access. The data access includes storing the data and retrieving the data. Hereafter, each storage unit may be interchangeably referred to as a DST execution unit, and the storage unit pool 440/458 may be interchangeably referred to as a DSN memory.

In an example of operation of the storing of the data utilizing the decentralized agreement function, the DST client module 34 receives a data access request 444 that includes data for storage. Having received the data access request 444, the DST client module 34 determines a DSN address associated with the data access request. Having determined the DSN address, the DST client module 34 identifies a storage unit pool of storage units for storage of the data. The identifying includes at least one of utilizing a decentralized agreement function based on the DSN address, performing a lookup based on the DSN address, and receiving the identity of the storage unit pool.

Having identified the storage unit pool, the DST client module 34 determines a resource level selection approach. The approach may include at least one of storage units of the storage unit pool and storage units by site. The determining may be based on one or more of performing a lookup, receiving the resource level selection via the data access request, and interpreting a storage unit availability indicator. For example, the DST client module 34 selects storage units from the storage unit pool.

Having determined the resource level selection approach, the DST client module 34 obtains ranked scoring information 448 for storage units of the storage unit pool in accordance with the resource level approach. For example, the DST client module 34 issues a rank scoring information request 446 to the decentralized agreement module 442 for each storage unit of the storage unit pool using location weights of each storage unit, a storage unit pool identifier, and the DSN address. The DST client module 34 receives the ranked scoring information 448 in response.

Having received the ranked scoring information 448, the DST client module 34 selects an IDA width number of storage units of the storage unit pool based on the ranked scoring information 448 and the resource level selection approach. For example, the DST client module 34 selects an IDA width number of storage units associated with a 16 highest ranked scores when the IDA width is 16 and the approach is selection by storage unit pool. As another example, the DST client module 34 selects a write threshold number of storage units associated with highest scores.

Having selected the IDA width number of storage units, the DST client module 34 issues resource access requests 450 that includes write slice requests to the selected IDA width number of storage units. For example, the DST client module 34 dispersed storage error encodes the data to produce a plurality of sets of encoded data slices, generates a set of 16 write slice requests that includes the plurality of sets of encoded data slices, and sends, via the network 24, the set of 16 write slice requests to the selected storage units of the storage unit pool.

The DST client module 34 receives resource access responses 452 with regards to storage of the plurality of sets of encoded data slices. For example, the resource access responses 452 includes one or more write slice responses indicating status of writing encoded data slices. When receiving an indication of a write failure, the DST client module 34 selects another storage unit based on the ranked scoring information. For example, the DST client module 34 selects a next highest ranked storage unit of the storage unit pool. When selecting another storage unit, the DST client module 34 sends, via the network 24, a corresponding write slice request to the selected other storage unit. The DST client module 34 issues a data access response 454 to a requesting entity based on received resource access responses 452 (e.g., success or failure of the writing).

In an example of operation of the retrieving of the data utilizing the decentralized agreement function, the DST client module 34 receives a data access request 444 that includes a retrieval request for the data. The DST client module 34 determines the DSN address associated with the data access request and identifies the storage unit pool of the storage units used for storage of the data. The DST client module 34 determines the resource level selection approach and obtains the rank scoring information 448 for the storage units of the storage unit pool in accordance with the resource level selection approach.

Having obtained the rank scoring information 448, the DST client module 34 selects a decode threshold number plus m number of storage units of the storage unit pool based on the ranked scoring information 448 and the resource level selection approach (e.g., select 10+2 more storage units with highest ranked scores when the decode threshold is 10 and the approach is selection by storage unit pool). Having selected the storage units, the DST client module 34 issues resource access requests 450 to the selected storage units, where the resource access requests 450 includes read slice requests. For example, the DST client module 34 generates a set of read slice requests, sends, via the network 24, the read slice requests to the selected storage units, and receives resource access responses 452 that includes received encoded data slices.

Having received encoded data slices, the DST client module 34 outputs another data access response 454 to the requesting entity based on the received encoded data slices of the resource access responses 452. For example, the DST client module 34 decodes the received encoded data slices to produce recovered data and issues the data access response 454 to include the recovered data.

Figure 42B:
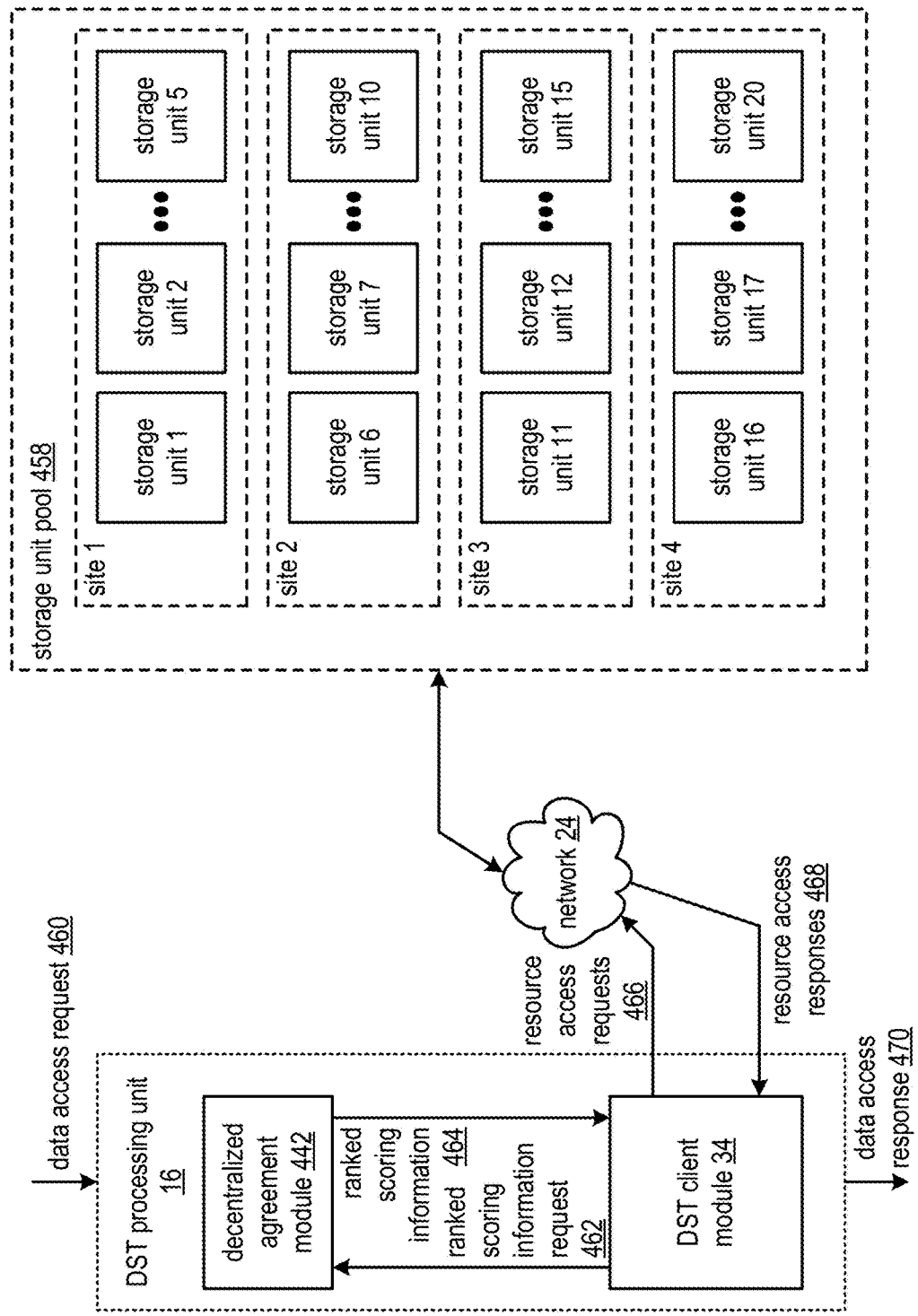
FIG. 42B is a schematic block diagram of another embodiment of a dispersed storage network (DSN) in accordance with the present disclosure.

FIG. 42B is a schematic block diagram of another embodiment of a dispersed storage network (DSN) that includes the distribute storage and task (DST) processing unit 16 of FIG. 42A, the network 24 of FIG. 1, and a storage unit pool 458. The storage unit pool 458 includes a plurality of storage units 1-20, where at least one storage unit is implemented at each of at least two sites. For example, five storage units are implemented at each of four sites when the number of storage units is 20. Each storage unit may be implemented utilizing the storage unit 36 of FIG. 1.

The DSN functions to access data stored as a plurality of sets of encoded data slices in the storage unit pool 458, where a decentralized agreement function is utilized to select storage units of the storage unit pool 458 to facilitate the access. The data access includes storing the data and retrieving the data. In an example of operation, the DST processing unit 16 receives a data access request 460, selects storage units of the storage unit pool 458, issues resource access requests 466, via the network 24, to the selected storage units, receives resource access responses 468, generates a data access response 470 based on the received resource access responses 468, and outputs the data access response 470 to a requesting entity. The selecting of the storage units further includes selecting storage units based on storage unit-to-site implementation.

In another example of operation, when storing the data, the DST processing unit 16 utilizes the decentralized agreement function to select an information dispersal algorithm (IDA) width number of storage units in total. Alternatively, the DST processing unit 16 selects a write threshold number of storage units. The selecting includes determining a number of storage units for each site based on a number of sites and the IDA width number. For example, the DST client module 34 divides the IDA width number of 16 by 4 sites to indicate that four storage units per site shall be selected. Having determined the number of storage units for selection by site, the DST client module 34 utilizes the decentralized agreement function (e.g., issues a ranked scoring information request 462 to the decentralized agreement module 442) to produce ranked scoring information 464 for each subset of storage units at each site to identify a highest ranked four of five storage units as the selected storage units. The DST client module 34 utilizes the selected storage units for storage of the data.

When retrieving the data, the DST processing unit 16 utilizes the decentralized agreement function to select a read threshold number of storage units in total (e.g., decode threshold plus two). The read threshold number is greater than or equal to a decode threshold number and less than or equal to the IDA width number. The selecting includes determining the number of storage units for each site based on the number of sites and the IDA width number. For example, the DST client module 34 divides the IDA width number of 16 by 4 sites to indicate that four storage units per site shall be considered for final selection. Having determined the number of storage units for consideration by site, the DST client module 34 utilizes the decentralized agreement function to produce ranked scoring information 464 for each subset of storage units at each site to identify a highest ranked four of five storage units as candidates for retrieval storage units.

Having identified candidate storage units, the DST client module 34 determines a number of storage units for each site to be selected based on the read threshold number and the number of sites. For example, the DST client module 34 divides the read threshold number of 12 by 4 sites to indicate that three storage units per site shall be selected in the final selection. The DST client module 34 selects three storage units associated with highest ranked scoring information of the previously identified highest ranked four of five storage units per site. The DST client module 34 utilizes the selected storage units for the retrieval of the data.

Figure 42C:
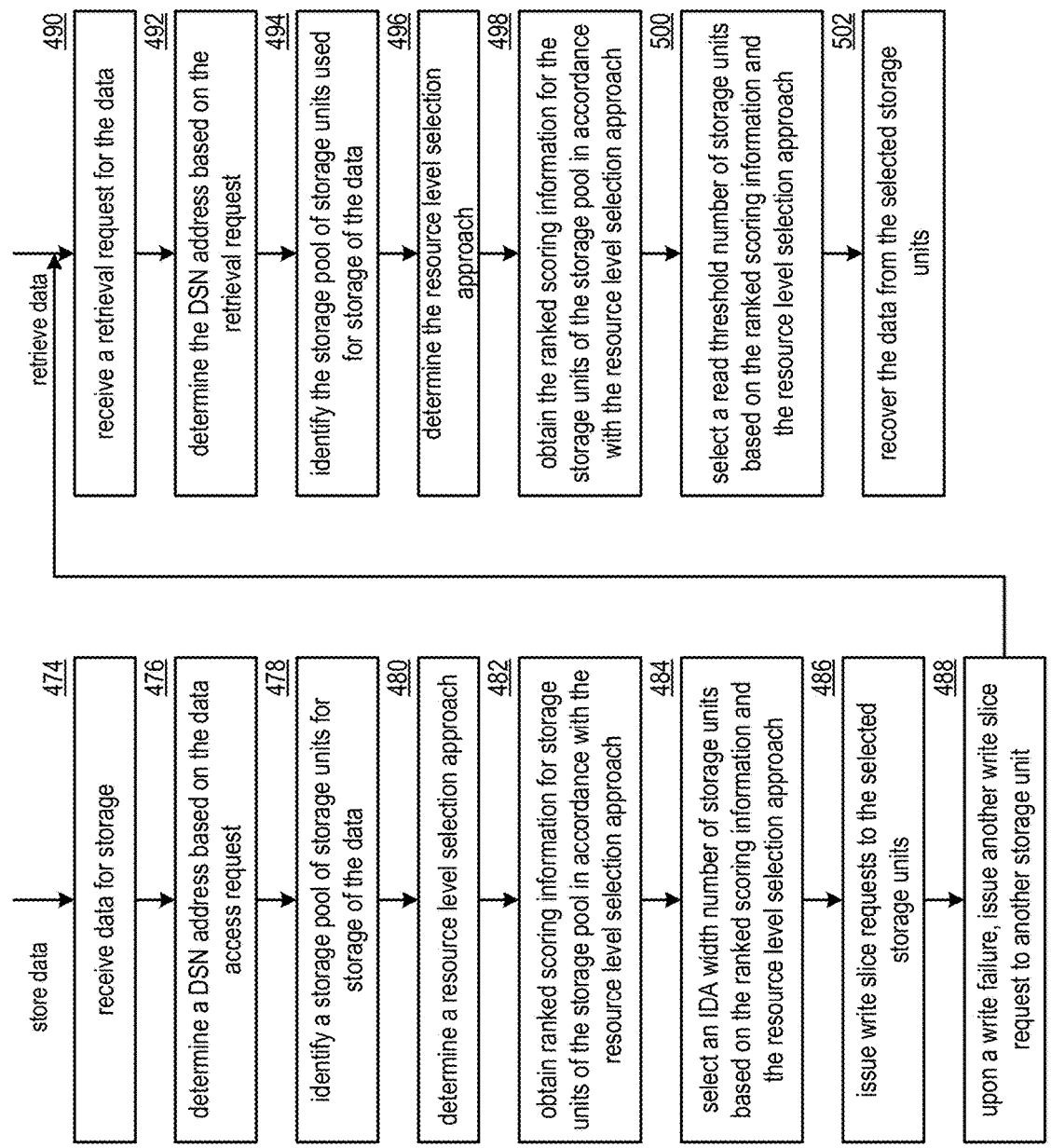
FIG. 42C is a flowchart illustrating an example of selecting storage resources in accordance with the present disclosure.

FIG. 42C is a flowchart illustrating an example of selecting storage resources. The method begins or continues, when storing data, at step 474 where a processing module (e.g., of a distributed storage and task (DST) client module) receives data for storage. The receiving may further include generating a source name and updating a directory to associate the source name with a data identifier of the data. The method continues at step 476 where the processing module determines a dispersed storage network (DSN) address based on the data access request. For example, the processing module performs a lookup based on the DSN addresses.

The method continues at step 478 where the processing module identifies a storage unit pool of storage units for storage of the data. For example, the processing module performs a decentralized agreement function based on the DSN address to select the storage unit pool from a plurality of storage unit pools. The method continues at step 480 where the processing module determines a resource level selection approach. The determining may be based on one or more of a predetermination, a request, and interpreting storage unit availability.

The method continues at step 482 where the processing module obtains ranked scoring information for storage units of the storage unit pool in accordance with the resource level selection approach. For example, the processing module calculates a score for each storage unit using the decentralized agreement function based on a location weight of the storage unit, a storage unit pool identifier, and the DSN address.

The method continues at step 484 where the processing module selects an information dispersal algorithm (IDA) width number of storage units based on the ranked scoring information and the resource level selection approach. For example, for a storage unit pool approach, the processing module selects storage units associated with a highest score on a per-site basis, where substantially identical number of storage units are selected for each site associated with storage unit pool.

The method continues at step 486 where the processing module issues write slice requests to the selected storage units. For example, the processing module dispersed storage error encodes the data, generates read slice requests, and sends the write slice requests to the selected storage units. Upon a write failure, the processing module issues another write slice request to another storage unit (e.g., associated with a next highest score).

The method begins or continues, when retrieving the data, at step 490 where the processing module receives a retrieve request for the data. The method continues at step 492 where the processing module determines the DSN address based on the retrieval request. The method continues at step 494 where the processing module identifies a storage unit pool of storage units for retrieval of the data. The method continues at step 496 where the processing module determines the resource level selection approach. The method continues at step 498 where the processing module obtains the ranked scoring information for the storage units of the storage unit pool in accordance with the resource level selection approach.

The method continues at step 500 where the processing module selects a read threshold number of storage units based on the ranked scoring information and the resource level selection approach. For example, the processing module selects a read threshold number associated with highest scores, where a number of selected storage units per site is substantially the same. The method continues at step 502 of the processing module recovers the data from the selected storage units. For example, the processing module generates a set of read slice requests, sends the set of read slice requests to the selected storage units, receives encoded data slices, dispersed storage error decodes the received encoded data slices to produce recovered data, and outputs the data access response to a requesting entity that includes the recovered data.

In certain DSN implementations, various generations of storage units may be deployed at given point in time, including legacy generations of storage units and newer, non-legacy storage units. In an example, it may be desirable to retire legacy storage units that have been previously configured to utilize a generation-based storage paradigm for processing data access requests. However, the non-legacy storage resources may utilize a decentralized agreement protocol function/paradigm such as described above in conjunction with FIGS. 40A-42C. In this scenario, one approach to retiring legacy storage units is to implement an immediate migration of legacy assets (e.g., encoded data) to a preferred location in accordance with the decentralized agreement protocol. Such an approach can be time-consuming, and it may be difficult to locate assets for which there is no prior fallback system configuration that can be utilized by decentralized entities.

In various novel methodologies and apparatus described below, all generations of existing legacy storage units may be considered as one large legacy storage unit pool, for which the determination of the location of data objects/assets reverts to previous access methods (e.g., utilizing a generation identifier, namespace mapping, meta-data lookups, etc.). When newer, non-legacy storage units are added to the DSN, a portion of the data assets of the legacy storage unit pool are migrated in accordance with the distributed agreement protocol and associated location weights. Over time, a location weight associated with the legacy storage unit pool (consisting of all legacy generations) can be reduced, in gradual amounts, resulting in eventual migration of legacy data assets to non-legacy storage. For example, the location weight of a legacy storage unit pool may be configured to reach zero at a specified retirement date, at which point the corresponding legacy hardware can be retired.

Figure 43A:
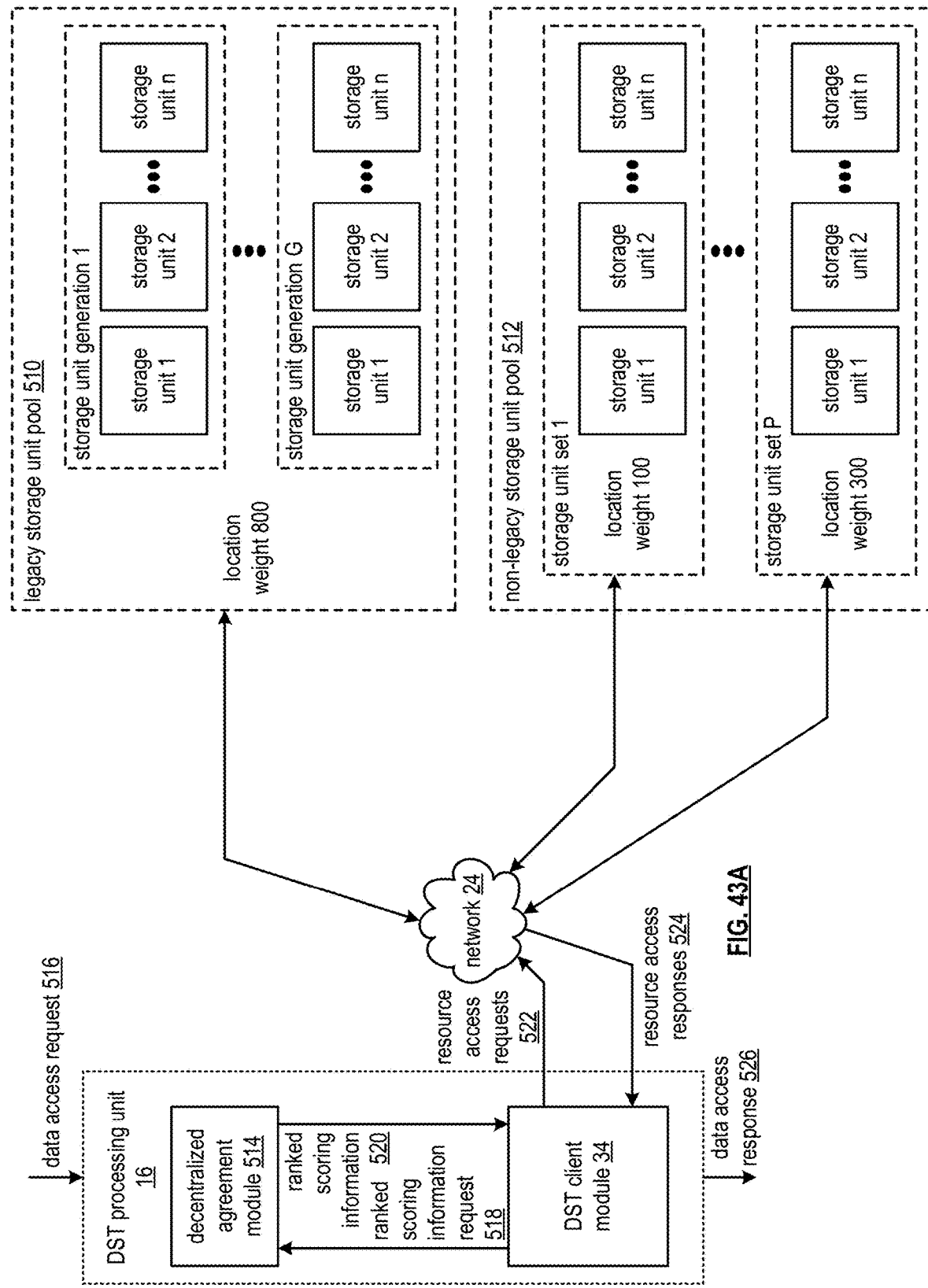
FIG. 43A is a schematic block diagram of another embodiment of a dispersed storage network (DSN) in accordance with the present disclosure.

Referring now to FIG. 43A, a schematic block diagram is shown for an embodiment of a dispersed storage network (DSN) that includes the distributed storage and task (DST) processing unit 16 of FIG. 1, the network 24 of FIG. 1, a legacy storage unit pool 510, and a non-legacy storage unit pool 512. The DST processing unit 16 includes a decentralized agreement module 514 and the DST client module 34 of FIG. 1. The decentralized agreement module 514 can be implemented, for example, utilizing the decentralized agreement module 350 of FIG. 40A. The legacy storage unit pool 510 includes a plurality of sets of legacy storage unit generations 1-G. In the illustrated example, each storage unit generation includes a set of storage units 1-n. The non-legacy storage unit pool 512 includes a plurality of non-legacy storage unit sets 1-P, each of which includes a set of storage units 1-n and has an associated (e.g., distinct) location weight for use by the distributed agreement protocol. Each storage unit may be implemented utilizing the DST execution unit 36 of FIG. 1. Each storage unit may be interchangeably referred to herein as a DST execution unit, and the storage unit pool 510/512 may be interchangeably referred to as a DSN memory.

The DSN functions to access data stored as a plurality of sets of encoded data slices in at least one set of storage units. In an embodiment, the data access includes selecting the set of storage units using one or more of a decentralized agreement protocol function and a DSN addressing mapping. As a specific example, the DST processing unit 16 receives a data access request 516; selects one of the legacy storage unit pool 510 and a particular set of storage units of non-legacy storage unit pool 512 using the decentralized agreement function, where the DST processing unit utilizes the DSN addressing mapping to further select a set of legacy storage units when selecting the legacy storage unit pool; accesses (e.g., by issuing resource access requests 522 and receiving resource access responses 524) at least one of the particular set of storage units of the non-legacy storage unit pool and the further selected set of legacy storage units; and issues a data access response 526 based on the received resource access responses 524.

In an example of operation of the accessing of the data, the DST client module 34 obtains a DSN address associated with the data access request 516 and obtains ranked scoring information 520 for the legacy storage unit pool 510 and one or more sets of non-legacy storage units of the non-legacy storage unit pool 512. For example, the DST client module 34 issues a ranked scoring information request 518 to the decentralized agreement module 514 utilizing location weights associated with each of the legacy storage unit pool 510 and the non-legacy storage unit pool 512, a storage pool identifier, and the DSN address; and receives the ranked scoring information 520. In the illustrated embodiment, a location weight of 800 is associated with the legacy storage unit pool, a location weight of 100 is associated with storage unit set 1, etc., and a location weight of 300 is associated with storage unit set P.

Having obtained the ranked scoring information 520, the DST client module 34 selects one of the legacy storage unit pool or the non-legacy storage unit pool (e.g., one or more storage unit sets thereof) based on the ranked scoring information 520. For example, the DST client module 34 performs the selection by identifying a pool/storage unit set associated with a highest ranking in the ranked scoring information 520.

When selecting the legacy storage unit pool, the DST client module 34 accesses, in accordance with the data access request, a set of legacy storage units (e.g., a generation of storage units) that corresponds to the DSN address (e.g., by identifying the set of legacy storage units based on a generation identifier in a generation field of the DSN address). Accessing the set of legacy storage units includes issuing resource access requests 522 (e.g., write slice requests, read slice requests, delete slice requests, list slice requests, data migration-related requests, etc.). The accessing further includes receiving corresponding resource access responses 524 (e.g., write slice responses, read slice responses, delete slice responses, list slice responses, data-migration related responses, etc.).

When selecting the non-legacy storage unit pool, the DST client module 34 accesses, in accordance with the data access request, the non-legacy storage unit pool (e.g., one or more storage unit sets of the plurality of non-legacy storage unit sets). Accessing the non-legacy storage unit pool includes issuing the resource access requests 522 and receiving the resource access responses 524. Having received the resource access responses 524, the DST client module 34 issues the data access response 526 to a requesting entity based on the received resource access responses 524.

FIG. 43B and FIG. 43C are flowcharts illustrating another example of selecting storage resources slices. The method of FIG. 43B begins or continues at step 530 where a processing module (e.g., of a distributed storage and task (DST) client module) obtains a dispersed storage network (DSN) address associated with a data access request from a requesting entity. Obtaining the DSN address can include at least one of generating the address, performing a lookup, or receiving the DSN address. The method continues at step 532 where the processing module obtains ranked scoring information for a legacy storage unit pool and (one or more non-legacy storage unit sets) a non-legacy storage unit pool based on the DSN address.

As a specific example, the processing module utilizes a decentralized agreement protocol to generate a score of the ranked scoring information for each storage unit pool using the location weight(s) of the storage unit pool, a storage unit pool identifier, and the DSN address. In an embodiment, generating the ranked scoring information includes performing a first series of functions on the DSN address based on a first storage pool identifier and a first location weight to produce a first storage value; performing a second series of functions on the DSN address based on a second storage pool identifier and a second location weight to produce a second storage value; and performing a ranking function of the first storage value and the second storage value to produce the ranked scoring information. Each of the first and second series of functions can include, for example, a deterministic function of the DSN address and a storage pool identifier to produce an interim result; a normalizing function of the interim result to produce a normalized interim result; and a scoring function of the normalized interim result and a location weight to produce a storage value.

The method continues at step 534 where the processing module selects one of the legacy storage unit pool and the non-legacy storage unit pool (e.g., one or more non-legacy storage unit sets thereof) based on the ranked scoring information to produce a selected storage unit pool for processing the data access request. For example, the processing module identifies a pool (or storage unit set) associated with a highest ranking in the ranked scoring information and selects the pool associated with the highest ranking as the selected storage unit pool.

When the selected storage unit pool includes the legacy storage unit pool, the method continues at step 535 where the processing module accesses resources of the legacy storage unit pool in accordance with the data access request and based on the DSN address. For example, when the legacy storage unit pool includes a plurality of sets of legacy storage units, the processing module selects (step 536) a set of legacy storage units based on a generation identifier in a generation field of the DSN address and issues write slice requests to the selected set of legacy storage units for a store data access request or issues read slice requests to the selected set of legacy storage units for a retrieve data access request, and receives corresponding responses.

When the selected storage unit pool includes the non-legacy storage unit pool, the method continues at step 537 where the processing module accesses resources of the non-legacy storage unit pool (e.g., one or more storage unit sets of the plurality of non-legacy storage unit sets) in accordance with the data access request. For example, the processing module issues write slice requests to storage units of the selected storage unit pool for a store data request or issues read slice requests to the storage units of the selected storage unit pool for a retrieve data access request, and receives the corresponding responses. When receiving corresponding responses, the processing module generates a data access response based on the received access responses and outputs the data access response to the requesting entity.

FIG. 43C is a flowchart illustrating an example method for determining a legacy storage unit pool location weight. The method begins or continues at step 538 where a retirement date is determined for the legacy storage unit pool (or sets of legacy storage units of the legacy storage unit pool). The method continues at step 540 where a location weight associated with the legacy storage unit pool is decreased over time such that scoring information generated by the distributed access protocol function for the legacy storage unit pool decreases (e.g., gradually) in rank as the retirement date approaches. In an example, the location weight of the legacy storage unit pool may be configured to reach zero at a specified retirement date, at which point the corresponding legacy hardware can be retired.

The methods described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 44A:
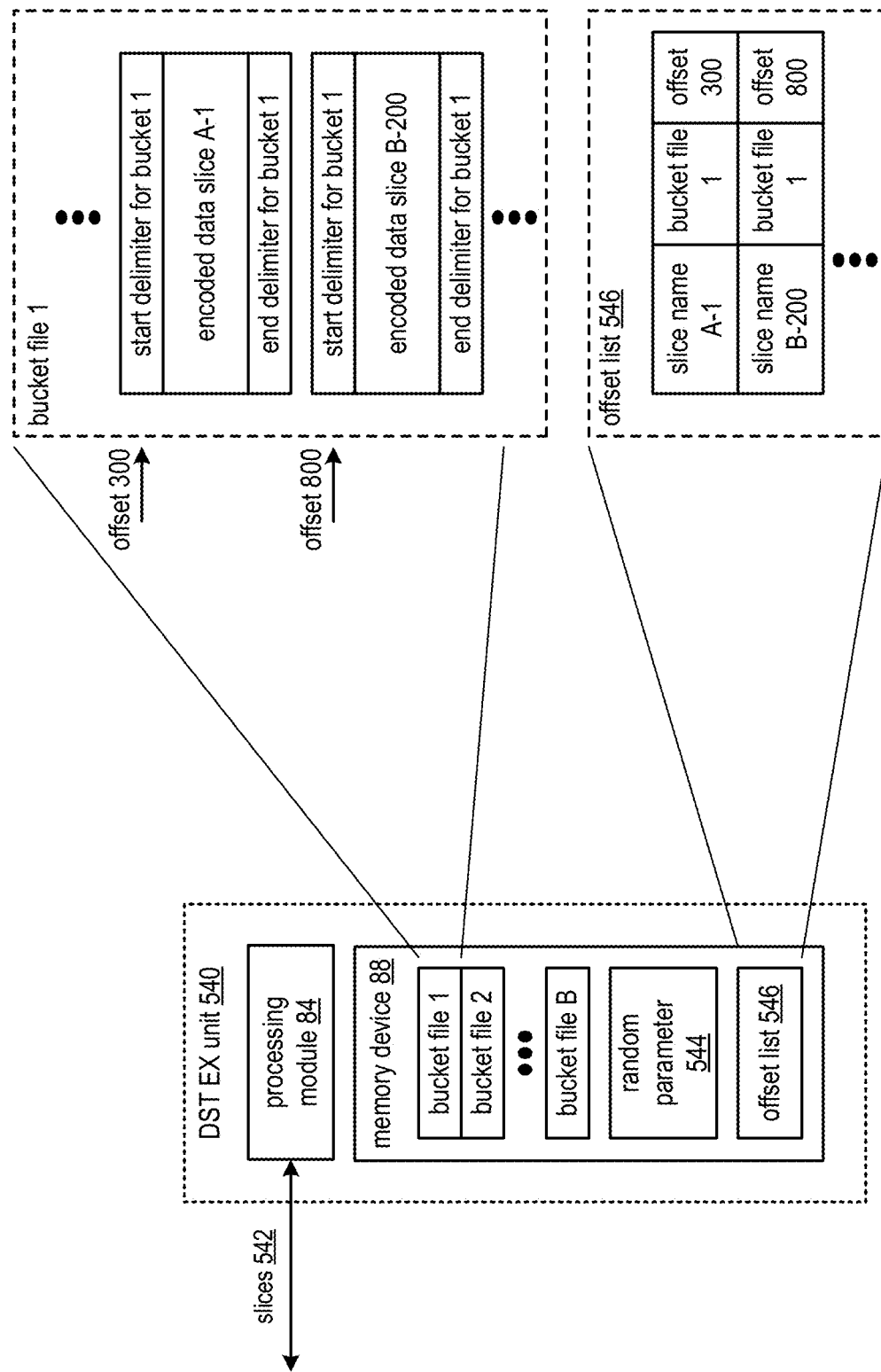
FIG. 44A is a schematic block diagram of another embodiment of a distributed storage and task (DST) execution (EX) unit in accordance with the present disclosure.

FIG. 44A is a schematic block diagram of another embodiment of a distributed storage and task (DST) execution (EX) unit 540 that includes the processing module 84 of FIG. 3 and the memory device 88 of FIG. 3. The DST execution unit 540 functions to provide access to slices 542 stored in the memory device 88. The accessing includes storing and retrieving.

An example of operation of the storing, the processing module 84 receives a write slice requests that includes an encoded data slice for storage and a slice name of the encoded data slice. For example, the processing module 84 receives an encoded data slice with a slice name of A-1. The processing module 84 obtains a bucket file for storage of the encoded data slice. The processing module 84 organizes a portion of the memory device 88 to provide a plurality of bucket files 1-B, where each bucket file may be utilized to store one or more encoded data slices. Each bucket file may be fixed or variable in size. Each bucket file may be unique in size or substantially the same. The obtaining of the bucket file includes selecting an existing bucket file, where the existing bucket file includes available space and generating a new bucket file when a size of the received encoded data slices greater than available space of the existing bucket file. For example, the processing module 84 selects bucket file 1 for storage of the encoded data slice A-1.

Having obtained the bucket file, the processing module 84 selects an offset within the selected bucket file, where sufficient space exists within the bucket file starting at the offset for the encoded data slice, a start delimiter, and an end delimiter. Alternatively, the offset may further include a memory device identifier when a plurality of memory devices 88 are utilized. The selecting may include accessing an offset list 546 from the memory device 88, where the offset list includes associations of slice names, bucket file identifiers, and offsets. For example, the processing module 84 selects an offset of 300 based on available storage space for encoded data slice A-1.

Having selected the offset, the processing module 84 updates the offset list 546 to associate the slice name, the selected bucket file, and the selected offset. For example, the processing module 84 associates slice name A-1 with bucket file 1 at an offset of 300.

Having updated the offset list 546, the processing module 84 generates the start and end delimiters for the encoded data slice. As a specific example, the processing module 84 performs a deterministic function on a combination of a random parameter hundred and 44, the bucket file identifier, and a start or and slice indicator. The deterministic function includes at least one of a hashing function, a hash-based message authentication code function, a mask generating function, and a sponge function. The random parameter 544 may be associated with at least one of DST execution unit and each bucket file. As a specific example, the processing module 84 generates the random parameter 544 when a new bucket file is created using at least one of a cryptographic secure random number generator, a pseudo random number generator, and entropy source generator, a key generator, and a random seed. The processing module 84 stores the random parameter 544 in the memory device 88 and may further store an association indicator indicating whether the rent parameters associated with the DST execution unit or a particular bucket file.

Having generated the start and end delimiters, the processing module 84 issues a write slice rejection response to a requesting entity when detecting either of the start and end delimiters within the encoded data slice. When not detecting either of the start and end delimiters within the encoded data slice, the processing module 84 stores, starting at the offset within the selected bucket list, the start delimiter, the encoded data slice, and the end delimiter.

An example of operation of the retrieving, the processing module 84 receives a read slice requests that includes the slice name. The processing module 84 identifies the bucket file and offset for retrieval of the encoded data slice by accessing the offset list based on a slice name. Having identified the bucket file an offset, the processing module 84 accesses the bucket file within the memory 88 using the offset to identify the start delimiter associated with the encoded data slice. Having identified the start delimiter, the processing module 84 extracts encoded data slice from the bucket file immediately after the start delimiter and ending when identifying the end delimiter. Having extracted the encoded data slice, the processing module 84 sends the encoded data slice to a requesting entity.

Figure 44B:
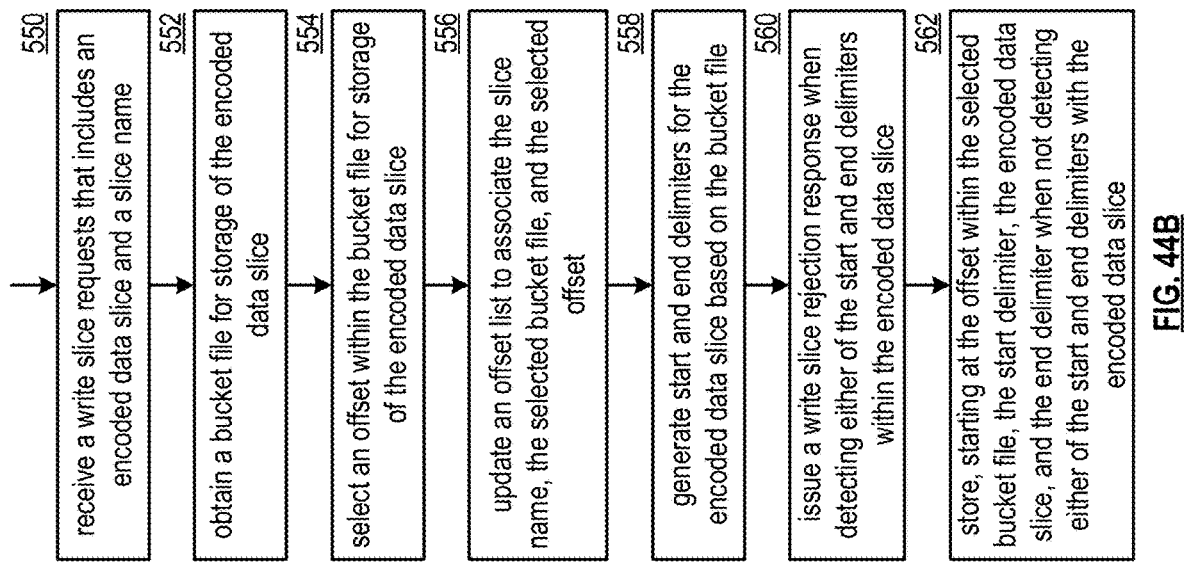
FIG. 44B is a flowchart illustrating an example of de-marking encoded data slices in accordance with the present disclosure.

FIG. 44B is a flowchart illustrating an example of de-marking encoded data slices. The method begins or continues, when storing an encoded data slice, at step 550 where a processing module (e.g., of a distributed storage and task (DST) client module) receives a write slice request that includes the encoded data slice and a slice name. The method continues at step 552 where the processing module obtains a bucket file for storage of the encoded data slice. For example, the processing module selects an existing bucket file associated with sufficient storage space. As another example, the processing module generates a new bucket file when not locating an existing bucket file with sufficient space.

The method continues at step 554 where the processing module selects an offset within the bucket file for storage of the encoded data slice. For example, the processing module identifies a space between two existing offsets associated with sufficient space for storage of the encoded data slice and identifies the offset of the start of the identified space. Alternatively, the offset may further include identification of a memory device of the plurality of memory devices.

The method continues at step 556 where the processing module updates an offset list to associate the slice name, the selected bucket file, and the selected offset. For example, the processing module recovers the offset list, updates the offset list to produce an updated offset list, and stores the updated offset list.

The method continues at step 558 where the processing module generates start and end delimiters for the encoded data slice based on the bucket file. For example, the processing module performs a deterministic function on a combination of one or more of a random parameter, a bucket file identifier, and a start or and slice indicator. The method continues at step 560 where the processing module issues a write slice rejection response to a requesting entity when detecting either of the start and end delimiters within the encoded data slice. The method continues at step 562 where the processing module stores, starting at the offset within the selected bucket file, the start delimiter, the encoded data slice, and the end delimiter when not detecting either of the start and end delimiters within the encoded data slice.

FIGS. 45A-45E are a schematic block diagram of another embodiment of a dispersed storage network (DSN) that includes the distributed storage and task (DST) processing unit 16 of FIG. 1, the distributed storage and task network (DSTN) managing unit 18 of FIG. 1, the network 24 of FIG. 1, and storage sets 1 and 2. The DST processing unit 16 includes a decentralized agreement module 570 and the DST client module 34 of FIG. 1. The decentralized agreement module 570 may be implemented utilizing the decentralized agreement module 350 of FIG. 40A. The DSTN managing unit 18 includes the decentralized agreement module 570 and the DST client module 34 of FIG. 1. Each storage set includes a set of n DST execution (EX) units. Each DST execution unit includes the decentralized agreement module 570, the DST client module 34 of FIG. 1, and the memory 88 of FIG. 3. Each DST execution unit may be implemented utilizing the DST execution unit 36 of FIG. 1. Hereafter, each DST execution unit may be interchangeably referred to as a storage unit, a storage set may be interchangeably referred to as a set of storage units, and the storage sets 1 and 2 may be interchangeably referred to as a DSN memory. The DSN functions to access data while migrating storage of the data, where the DST processing unit 16 dispersed storage error encodes the data to produce a plurality of sets of encoded data slices 574 and stores the plurality of sets of encoded data slices 574 in at least one storage set to store the data.

Figure 45A:
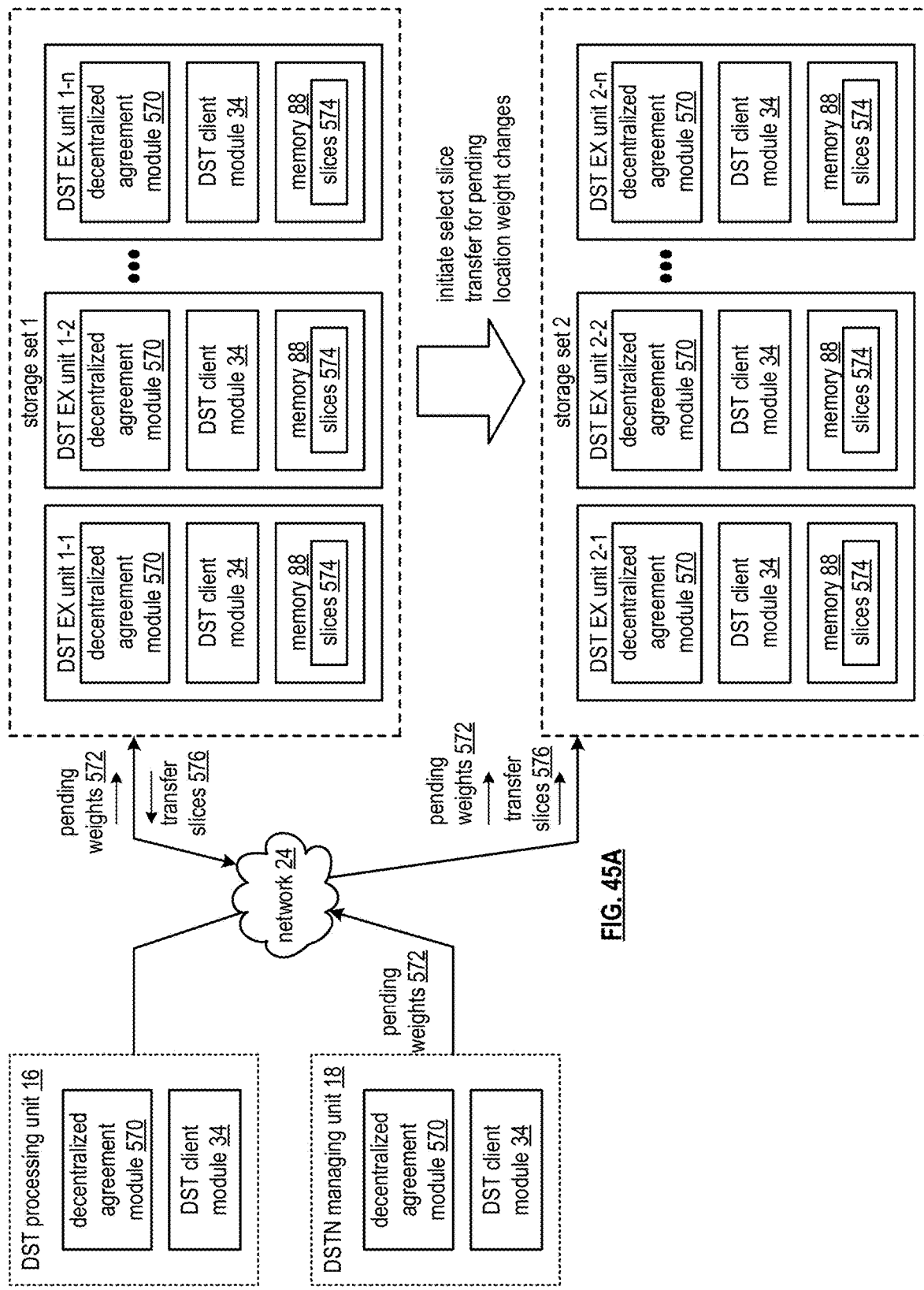
FIGS. 45A-45E are a schematic block diagram of another embodiment of a dispersed storage network (DSN) in accordance with the present disclosure.

FIG. 45A illustrates steps of an example of operation of the accessing of the data while migrating the storage of the data where the DSTN managing unit 18 issues, via the network 24, pending weights 572 to the storage units 1-n of the storage sets 1 and 2. The pending weights 572 include future weighting factors for one or more storage resources of the DSN memory. Examples of future weighting factors includes a future weighting factor for a memory to be decommissioned, a future weighting factor for a memory to be commissioned, a future weighting factor for a storage unit to be decommissioned, the future weighting factor for a storage unit to be commissioned, a future weighting factor for a storage set to be decommissioned, and a future weighting factor for a storage set to be commissioned.

The issuing of the pending weights 572 includes one or more of detecting weighting factor changes, generating the pending weights 572 based on the detected weighting factor changes, identifying effected storage units of the storage sets, and sending, via the network 24, the pending weights 572 to the effected storage units of the storage sets. The identifying of the effected storage units includes identifying at least one DSN address range associated with the effected storage units, where performing a distributed agreement protocol function on the DSN address range utilizing either of the pending weights 572 and current weights (e.g., before upcoming changes when the pending weights are made current) produces ranked scoring information that identifies highest-ranking storage resources to produce the effected storage units. For instance, the DST client module 34 of the DSTN managing unit 18 utilizes the decentralized agreement module 570 to identify storage units of the storage set 1 and storage units of the storage set 2 as effected by the pending weights 572.

The plurality of storage units of the DSN receives the pending weights 572 as updated properties of the DSN memory, where the updated properties of the DSN memory requires storage migration within the DSN memory. For example, the storage migration is required to select and migrate slices 574 as transfer slices 576 from storage units of the storage set 1 to the storage units of the storage set 2 when the future weighting factors of the storage units of the storage set 1 are lowered and the future weighting factors of the storage units of the storage set 2 are raised.

Having received the updated properties of the DSN memory (e.g., including pending weights 572), a first storage unit and a second storage unit of the plurality of storage units establish a migration pairing based on the updated properties of the DSN memory. Alternatively, the DST client module 34 of the DSTN managing unit 18 establishes the migration pairing. The establishing of the migration pairing may include performing, by the first storage unit, a scoring function (e.g., the distributed agreement protocol function by the decentralized agreement module 570) using one or more properties of DSN access information (e.g., a DSN address range associated with a given storage set) and one or more properties of non-updated properties of the DSN memory (e.g., current weighting factors of DSN memory resources) to identify a range of DSN addresses affiliated with the first storage unit, performing, by the second storage unit, the scoring function using the one or more properties of DSN access information and the one or more properties of non-updated properties of the DSN memory to identify the range of DSN addresses affiliated with the first storage unit, performing, by the first storage unit, an updated scoring function using the one or more properties of DSN access information and one or more properties of the updated properties of the DSN memory (e.g., the pending weights 572) to identify a range of DSN addresses affiliated with the second storage unit (e.g., where changes), performing, by the second storage unit, the updated scoring function using the one or more properties of DSN access information and the one or more properties of the updated properties of the DSN memory to identify the range of DSN addresses affiliated with the second storage unit, and establishing, by the first and second storage units, the migration pairing based on the range of DSN addresses being affiliated with the first storage unit based on the non-updated properties of the DSN memory and the range of DSN addresses being affiliated with the second storage unit based on the updated properties of the DSN memory.

As a specific example of the establishing of the migration pairing, the DST execution unit 1-2 and the DST execution unit 2-2 identify a DSN address range affiliated with the DST execution unit 1-2 (e.g., associated with slices 574 currently stored within the memory 88 of the DST execution unit 1-2) effected by the pending weights 572, where encoded data slices associated with the identified DSN address range are to be migrated as the transfer slices 576 from the DST execution unit 1-2 to the DST execution unit 2-2. With the migration pairing established, the first and second storage units establish, between the first and second storage units, a storage migration mechanism for migrating storage of data between the first and second storage units based on the updated properties of the DSN memory. Alternatively, the DSTN managing unit 18 establishes the storage migration mechanism.

The establishing of the storage migration mechanism may include one or more of identifying an address range to migrate, identifying stored data having an address within the address range to migrate, establishing a data migration list that includes the identified stored data, establishing a data migration pattern for migrating the identified stored data between the first and second storage units, and updating the data migration list as the identified stored data is migrated between the first and second storage units. For example, the DST execution unit 1-2 identifies the DSN address range associated with stored encoded data slices 574, where the stored encoded data slices 574 are associated with the DST execution unit 1-2 when utilizing the non-updated properties of the DSN memory (e.g., current weighting factors), establishes the data migration list to include slice names of the stored encoded data slices 574 associated with the DSN address range, establishes the data migration pattern that includes sending, via the network 24, the identified stored encoded data slices 574 as transfer slices 576 to the DST execution unit 2-2, and facilitates the migration of the transfer slices 576, and updates the data migration list as the transfer slices 576 are confirmed to be received and stored in the memory 88 of the DST execution unit 2-2.

The establishing of the storage migration mechanism may further include determining, based on the non-updated properties of the DSN memory (e.g., current weighting factors), a source storage unit of the first and second storage units, determining, based on the updated properties of the DSN memory, a destination storage unit of the first and second storage units, and sending the identified stored data from the source storage unit to the destination storage unit. For example, the pairing of the DST execution units 1-2 and 2-2 determines that the DST execution unit 1-2 is the source storage unit, determines that the DST execution unit 2-2 is the destination storage unit, and DST execution unit 1-2 sends the identified encoded data slices of the identified stored data as transfer slices 576 to the DST execution unit 2-2 for storage.

Figure 45B:
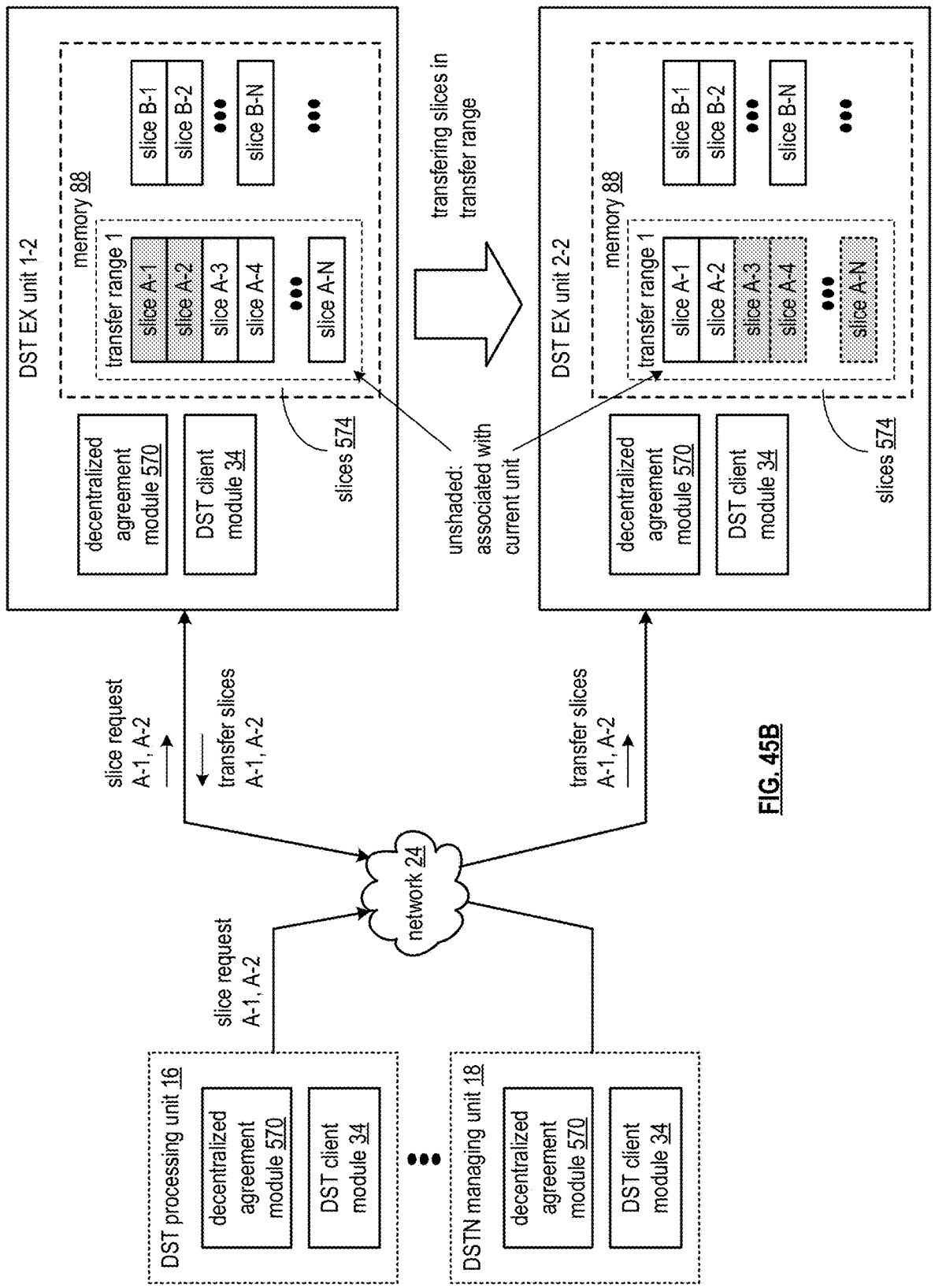

FIG. 45B illustrates further steps of the example of operation of the accessing of the data while migrating the storage of the data, where encoded data slices associated with the identified DSN address range are migrated from the DST execution unit 1-2 to the DST execution unit 2-2. For example, the DST execution unit 1-2 identifies encoded data slices A-1 through A-N of a transfer range 1 of the DSN address range and excludes encoded data slices B-1 through B-N from the store data migration (e.g., not associated with the identified DSN address range), where the memory 88 of the DST execution unit 1-2 stores the stored encoded data slices 574.

While migrating the storage of the data between the first and second storage units in accordance with the storage migration mechanism, the first or second storage unit receives a data access request (e.g., new data object write request, new revision data object write request, read request) regarding the data effected by the migrating the storage of data between the first and second storage units. The receiving the data access request may include receiving the data access request by the first storage unit when the data access request was created in accordance with the updated properties of DSN memory and receiving the data access request by the second storage unit when the data access request was created in accordance with non-updated properties of DSN memory.

For example, with the migrating of the storage of the data initiated, where at a given point in time a portion of the encoded data slices associated with the identified DSN address range have been successfully migrated and a remaining portion of the encoded data slices associated with the identified DSN address range have not yet been successfully migrated (e.g., encoded data slices A-1 and A-2 have been transferred from the DST execution unit 1-2 to the DST execution unit 2-2), a requesting entity (e.g., the DST processing unit 16) attempts to access the DSN memory to access one or more of the encoded data slices associated with the identified DSN address range. As a specific example, the DST client module 34 of the DST processing unit 16 utilizes the decentralized agreement module 570 to perform the distributed agreement protocol function on a DSN address associated with a desired data object of access using the non-updated DSN properties (e.g., current weighting factors of the storage units) to identify the DST execution unit 1-2 as affiliated with the encoded data slices A-1 through A-N and sends, via the network 24, slice requests to the DST execution unit 1-2 with regards to accessing at least some of the encoded data slices A-1 through N-N. For instance, the DST processing unit 16 sends slice requests A-1 and A-2 to the DST execution unit 1-2 based on non-updated DSN properties (e.g., current weighting factors). The example of operation is continued as discussed with reference to FIG. 45C.

Figure 45C:
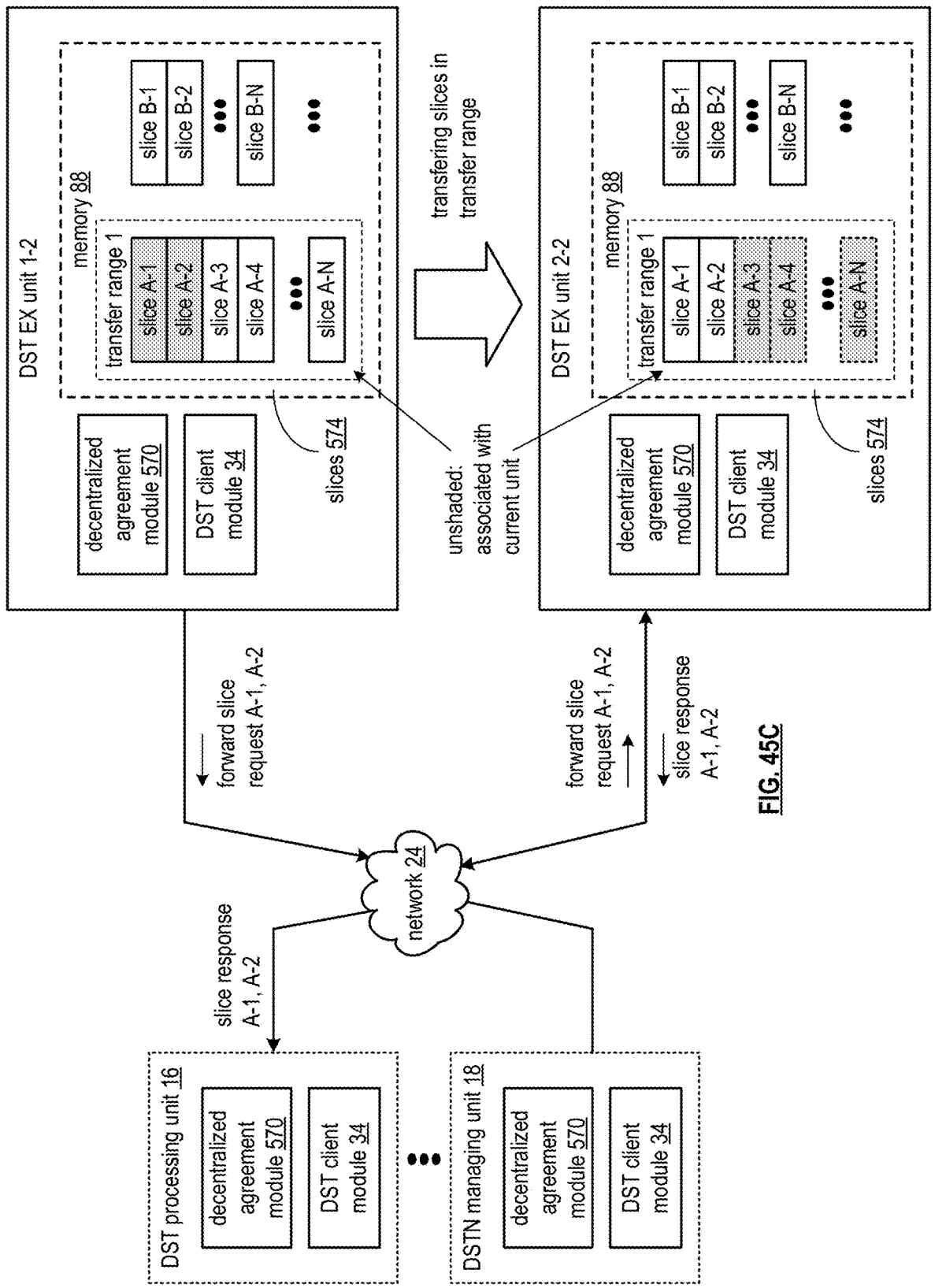

FIG. 45C illustrates further steps of the example of operation of the accessing of the data while migrating the storage of the data where the first storage unit or the second storage unit determines status of the migrating storage of data between the first and second storage units. For example, the DST execution units 1-2 and 2-2 determine that the status of the migrating storage of the data indicates that the encoded data slices A-1 and A-2 have been successfully transferred and encoded data slices A-3 through A-N are pending transfer. The determining of the status may be facilitated in accordance with a status determining approach based on a type of the data access request (e.g., read request, new write request, revision write request). When the type of the data access request is the read request, the determining the status of the migrating storage of the data includes accessing the migration list of data being migrated between the first and second storage units, determining whether a data object of the read request has been migrated based on the migration list, when the data object has been migrated, indicating the status as migrated to destination, and when the data object has not been migrated, indicating the status as not migrated to destination.

When the type of the data access request is the new write request, determining the status of the migrating storage of the data includes, when the first and second storage units possess the updated properties of the DSN memory, setting the status for the new write request as write to destination (e.g., indicate that the DST execution unit 2-2 is to execute the new write request). When the type of the data access request is the revision write request for a revised data object, the determining the status of the migrating storage of the data includes accessing the migration list of data being migrated between the first and second storage units, determining whether a predetermined number (e.g., all or almost all) of data objects on the migration list have been migrated to a destination, when the predetermined number of data objects have been migrated, indicating the status as migrated to destination, and when the predetermined number of data objects have not been migrated, indicating the status as not migrated to destination.

Having determined the status, the first storage unit or the second storage unit determines which of the first and second storage units is to process the data access request based on the status to produce a determined storage unit. The determining may be based on the type of the data access request. When the type of the data access request is the read request, the determining the determined storage unit includes determining that the first storage unit is the determined storage unit when the read request was created based on non-updated properties of the DSN memory and the status is not migrated to destination, determining that the second storage unit is the determined storage unit when the read request was created based on the non-updated properties of the DSN memory and the status is migrated to destination (e.g., the DST execution unit 2-2 is identified to process the data access request when the data access request as the read request and the encoded data slices A-1 and A-2 has been successfully migrated to the DST execution unit 2-2), determining that the first storage unit is the determined storage unit when the read request was created based on updated properties of the DSN memory and the status is not migrated to destination, and determining that the second storage unit is the determined storage unit when the read request was created based on the updated properties of the DSN memory and the status is migrated to destination.

When the type of the data access request is the new write request, the determining the determined storage unit includes when the status indicates write to destination, performing an updated scoring function using one or more properties of the new write request and one or more properties of the updated properties of the DSN memory to identify the second storage unit as the determined storage unit. When the type of the data access request is the revision write request for the revised data object, the determining the determined storage unit includes when the status indicates migrated to destination, identifying the second storage unit as the destination and as the determined storage unit, and when the status indicates not migrated to destination, identifying the first storage unit as a source and as the determined storage unit.

Having determined the determined storage unit, the determined storage unit processes the data access request. The processing may be based on the type of the data access request. When the type of the data access request is the read request, the processing the data access request includes the determined storage unit processes the read request. The processing may include forwarding, by another storage unit, the read request to the determined storage unit. For example, the DST execution unit 1-2 forwards, via the network 24, the slice request A-1, A-2 as a forward slice request A-1, A-2 to the DST execution unit 2-2 when the DST execution unit 2-2 is the determined storage unit for the read request and the DST execution unit 2-2 issues, via the network 24, a slice response A-1, A-2 that includes the encoded data slices A-1 and A-2 to the DST processing unit 16.

When the type of the data access request is the new write request, the processing the data access includes storing the data object by the second storage unit and updating the migration list to include that the data object has been migrated to the destination. The processing may include forwarding the new write request to the determined storage unit. For example, the DST execution unit 1-2 forwards the write request (e.g., write slice request) to the DST execution unit 2-2, the DST execution unit 2-2 stores new encoded data slices of the new data object in the memory 88, and issues a write slice response A-1, A-2 to the DST processing unit 16 indicating status of the new write request.

When the type of the data access request is the revision write request for the revised data object, the processing the data access includes, when the status indicates migrated to destination, storing the revised data object by the second storage unit, and updating the migration list to include that the revised data object has been migrated to the destination, and, when the status indicates not migrated to the destination, storing the revised data object by the first storage unit, and updating the migration list to include that the revised data object has not been migrated to the destination. For example, when the status indicates migrated to destination, the DST execution unit 1-2 forwards the revision write request to the DST execution unit 2-2. As another example, when the status indicates that migrated to the destination, the DST execution unit 1-2 stores the revision encoded data slices in the memory 88 of the DST execution unit 1-2 and updates the migration list to include that the device data object has not been migrated to the destination (e.g., default).

Figure 45D:
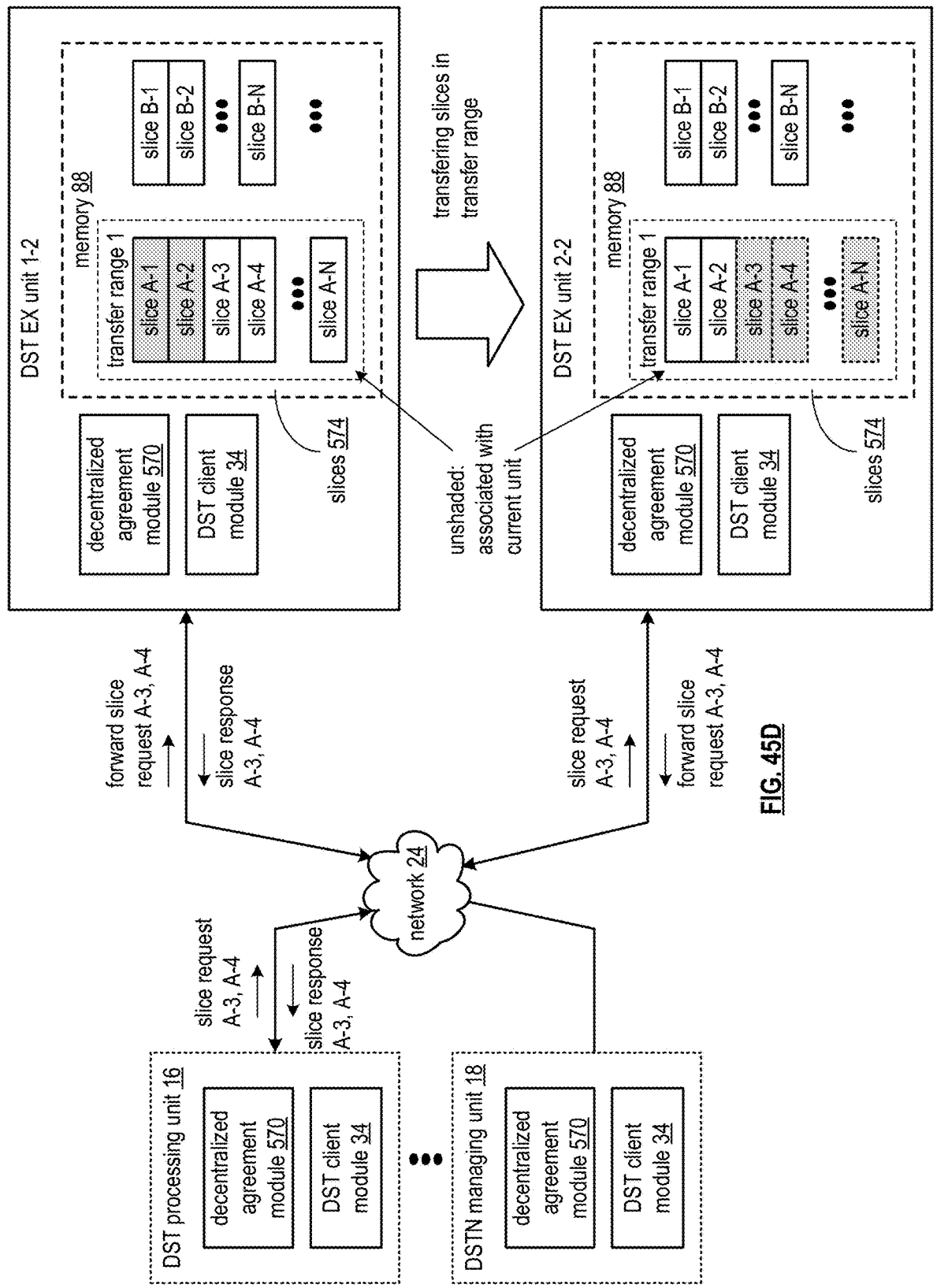

FIG. 45D illustrates further steps of the example of operation of the accessing of the data while migrating the storage of the data where the requesting entity of the data access utilizes the updated DSN properties (e.g., the pending weights) to identify the DST execution unit for the data access request and sends a corresponding slice access request to the identified DST execution unit. For example, the DST processing unit 16 issues, via the network 24, a slice request A-3, A-4 to the DST execution unit 2-2 when the corresponding encoded data slices A-3, A-4 have not yet been migrated from the DST execution unit 1-2 to the DST execution unit 2-2.

Having received the data access request, the first storage unit or the second storage unit determines the status of the migrating the storage of the data between the first and second storage units. For instance, the first and second storage units determined that the status indicates that only encoded data slices A-1 and A-2 have been successfully transferred to the DST execution unit 2-2. Having determined the status, the first or second storage units determine which of the first and second storage units is to process the data access request based on the status to produce the determined storage unit. For example, the DST execution units 1-2 and 2-2 determine that the DST execution unit 1-2 shall process the data access request as the determined storage unit when the encoded data slices A-3 and A-4 of the data access request have not yet been transferred.

Having identified the determined storage unit, the determined storage unit processes the data access request. For example, the DST execution unit 2-2 forwards, via the network 24, the slice request A-3, A-4 to the DST execution unit 1-2, the DST execution unit 1-2 processes the data access request to produce a slice response A-3, A-4, and sends, via the network 24, the slice response A-3, A-4 to the DST processing unit 16.

Figure 45E:
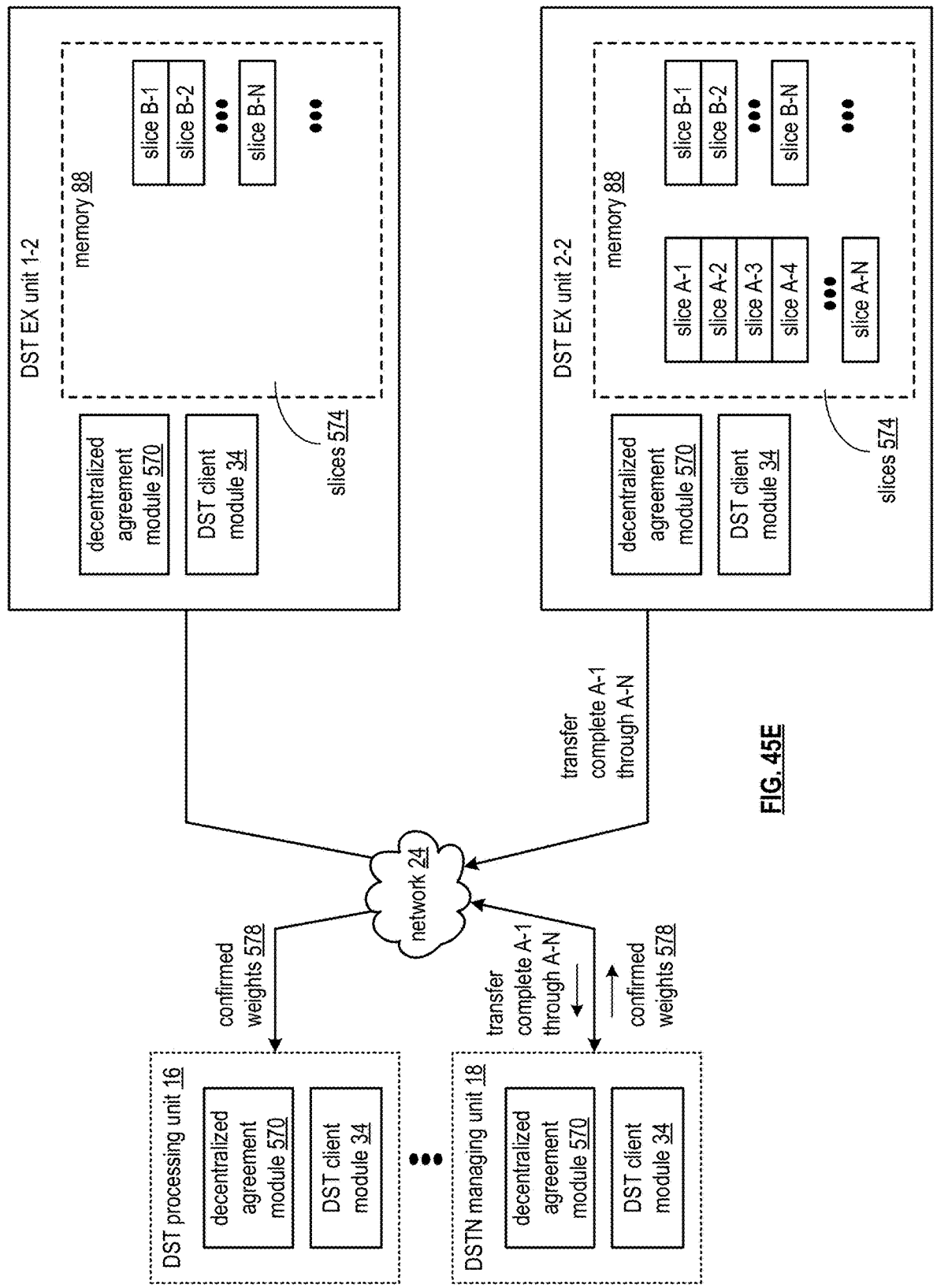

FIG. 45E illustrates further steps of the example of operation of the accessing of the data while migrating the storage of the data where the determined storage unit (e.g., DST execution unit 2-2) issues, via the network 24, a transfer complete message (e.g., transfer complete A-1 through A-N) to the DSTN managing unit 18 indicating that the identified encoded data slices of the identified DSN address range for migration have been successfully transferred from the DST execution unit 1-2 to the DST execution unit 2-2. Having received the transfer complete message, the DSTN managing unit 18 issues, via the network 24, confirmed weights 578 to one or more entities of the DSN. The confirmed weights 578 include the updated DSN parameters (e.g., updated weighting factors associated with the affected storage units of the migration of the stored data). For example, the DSTN managing unit 18, sends, the confirmed weights 578 to the DST processing unit 16 for utilization in accessing the DSN memory.

Figure 45F:
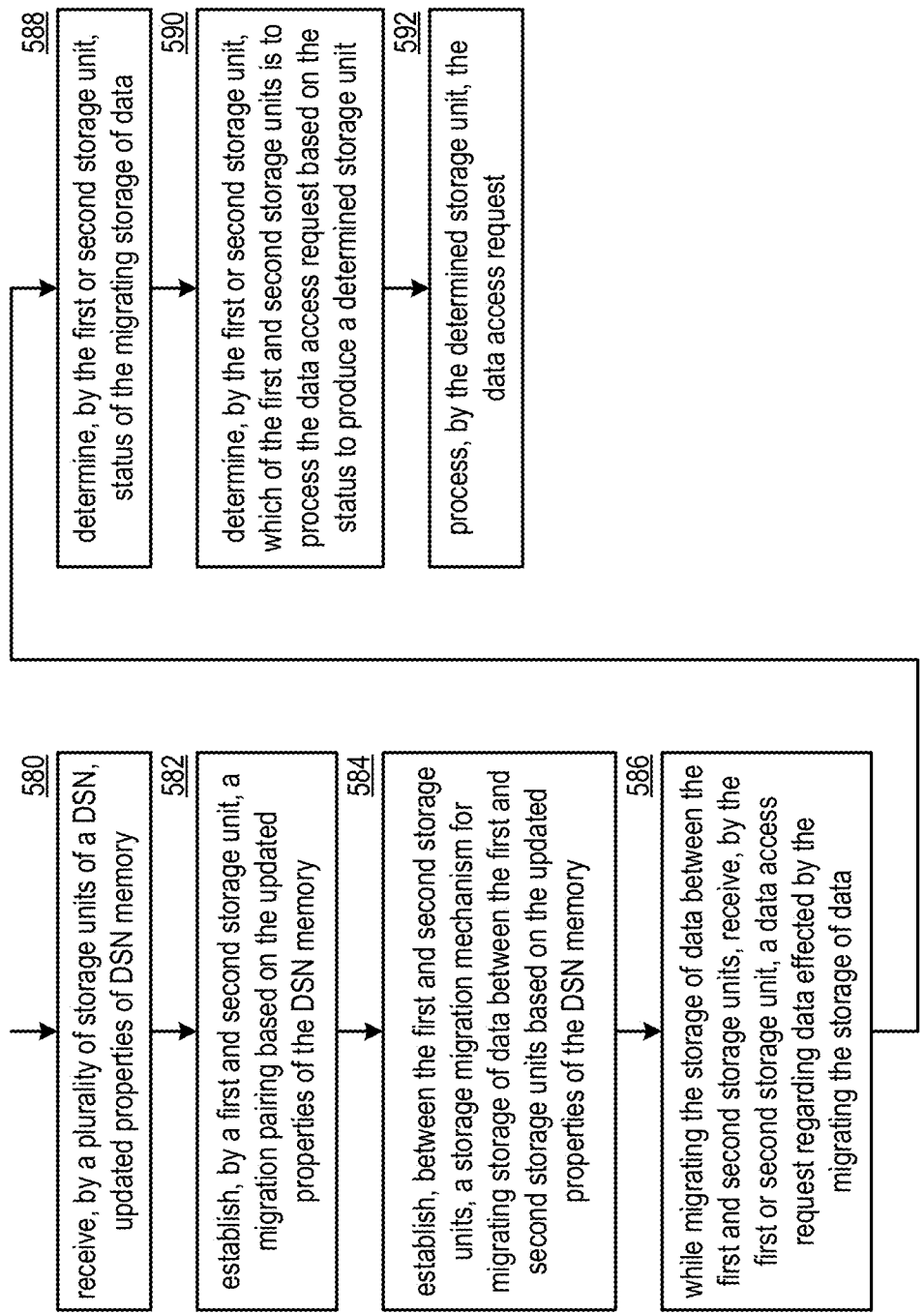
FIG. 45F is a flowchart illustrating an example of accessing data while migrating storage of the data in accordance with the present disclosure.

FIG. 45F is a flowchart illustrating an example of accessing data while migrating storage of the data. In particular, a method is presented for use in conjunction with one or more functions and features described in conjunction with FIGS. 1-39, 45A-E, and also FIG. 45F. The method begins or continues at step 580 where a plurality of storage units, that includes one or more processing module of one or more computing devices of one or more computing devices of a dispersed storage network (DSN), receives updated properties of DSN memory, where the DSN memory includes the plurality of storage units and where the updated properties of the DSN memory requires storage migration within the DSN memory.

The method continues at step 582 where a first storage unit and a second storage unit of the plurality of storage units establish a migration pairing based on the updated properties of the DSN memory. The establishing the migration pairing may include performing, by the first storage unit, a scoring function using one or more properties of DSN access information and one or more properties of non-updated properties of the DSN memory to identify a range of DSN addresses affiliated with the first storage unit, performing, by the second storage unit, the scoring function using the one or more properties of DSN access information and the one or more properties of non-updated properties of the DSN memory to identify the range of DSN addresses affiliated with the first storage unit, performing, by the first storage unit, an updated scoring function using the one or more properties of DSN access information and one or more properties of the updated properties of the DSN memory to identify a range of DSN addresses affiliated with the second storage unit, performing, by the second storage unit, the updated scoring function using the one or more properties of DSN access information and the one or more properties of the updated properties of the DSN memory to identify the range of DSN addresses affiliated with the second storage unit, and establishing, by the first and second storage units, the migration pairing based on the range of DSN addresses being affiliated with the first storage unit based on the non-updated properties of the DSN memory and the range of DSN addresses being affiliated with the second storage unit based on the updated properties of the DSN memory.

The method continues at step 584 where the first and second storage units establish, between the first and second storage units a storage migration mechanism for migrating storage of data between the first and second storage units based on the updated properties of the DSN memory. The establishing of the storage migration mechanism may include identifying an address range to migrate, identifying stored data having an address within the address range to migrate, establishing a data migration list that includes the identified stored data, establishing a data migration pattern for migrating the identified stored data between the first and second storage units, and updating the data migration list as the identified stored data is migrated between the first and second storage units. The establishing of the storage migration mechanism may further include the first or second storage units determining, based on non-updated properties of the DSN memory, a source storage unit of the first and second storage units, determining, based on the updated properties of the DSN memory, a destination storage unit of the first and second storage units, and sending the identified stored data from the source storage unit to the destination storage unit.

While migrating the storage of data between the first and second storage units in accordance with the storage migration mechanism, the method continues at step 586 where the first storage unit or the second storage unit receives a data access request (e.g., new data object write request, new revision data object write request, read request) regarding data effected by the migrating the storage of data between the first and second storage units. The receiving the data access request may include receiving the data access request by the first storage unit when the data access request was created in accordance with the updated properties of DSN memory and receiving the data access request by the second storage unit when the data access request was created in accordance with non-updated properties of DSN memory.

The method continues at step 588 where the first or second storage unit determines status of the migrating storage of data between the first and second storage units. The determining of the status may be facilitated in accordance with a status determining approach based on a type of the data access request (e.g., read request, new write request, revision write request). When the type of the data access request is the read request, the determining the status of the migrating storage of the data includes accessing the migration list of data being migrated between the first and second storage units, determining whether a data object of the read request has been migrated based on the migration list, when the data object has been migrated, indicating the status as migrated to destination, and when the data object has not been migrated, indicating the status as not migrated to destination.

When the type of the data access request is the new write request, the determining the status of the migrating storage of the data includes, when the first and second storage units possess the updated properties of the DSN memory, setting the status for the new write request as write to destination. When the type of the data access request is the revision write request for a revised data object, the determining the status of the migrating storage of the data includes accessing the migration list of data being migrated between the first and second storage units, determining whether a predetermined number (e.g., all or almost all) of data objects on the migration list have been migrated to a destination, when the predetermined number of data objects have been migrated, indicating the status as migrated to destination, and when the predetermined number of data objects have not been migrated, indicating the status as not migrated to destination.

The method continues at step 590 where the first storage unit or the second storage unit determines which of the first and second storage units is to process the data access request based on the status to produce a determined storage unit. The determining may be based on the type of the data access request. When the type of the data access request is the read request, the determining the determined storage unit includes determining that the first storage unit is the determined storage unit when the read request was created based on non-updated properties of the DSN memory and the status is not migrated to destination, determining that the second storage unit is the determined storage unit when the read request was created based on the non-updated properties of the DSN memory and the status is migrated to destination, determining that the first storage unit is the determined storage unit when the read request was created based on updated properties of the DSN memory and the status is not migrated to destination, and determining that the second storage unit is the determined storage unit when the read request was created based on the updated properties of the DSN memory and the status is migrated to destination.

When the type of the data access request is the new write request, the determining the determined storage unit includes when the status indicates write to destination, performing an updated scoring function using one or more properties of the new write request and one or more properties of the updated properties of the DSN memory to identify the second storage unit as the determined storage unit. When the type of the data access request is the revision write request for the revised data object, the determining the determined storage unit includes when the status indicates migrated to destination, identifying the second storage unit as the destination and as the determined storage unit, and when the status indicates not migrated to destination, identifying the first storage unit as a source and as the determined storage unit.

The method continues at step 592 where the determined storage unit processes the data access request. The processing may be based on the type of the data access request. When the type of the data access request is the read request, the processing the data access request includes the determined storage unit processes the read request. The processing may include forwarding, by another storage unit, the read request to the determined storage unit. When the type of the data access request is the new write request, the processing the data access includes storing the data object by the second storage unit and updating the migration list to include that the data object has been migrated to the destination. The processing may include forwarding the new write request to the determined storage unit. When the type of the data access request is the revision write request for the revised data object, the processing the data access includes, when the status indicates migrated to destination, storing the revised data object by the second storage unit, and updating the migration list to include that the revised data object has been migrated to the destination, and, when the status indicates not migrated to the destination, storing the revised data object by the first storage unit, and updating the migration list to include that the revised data object has not been migrated to the destination.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 46A:
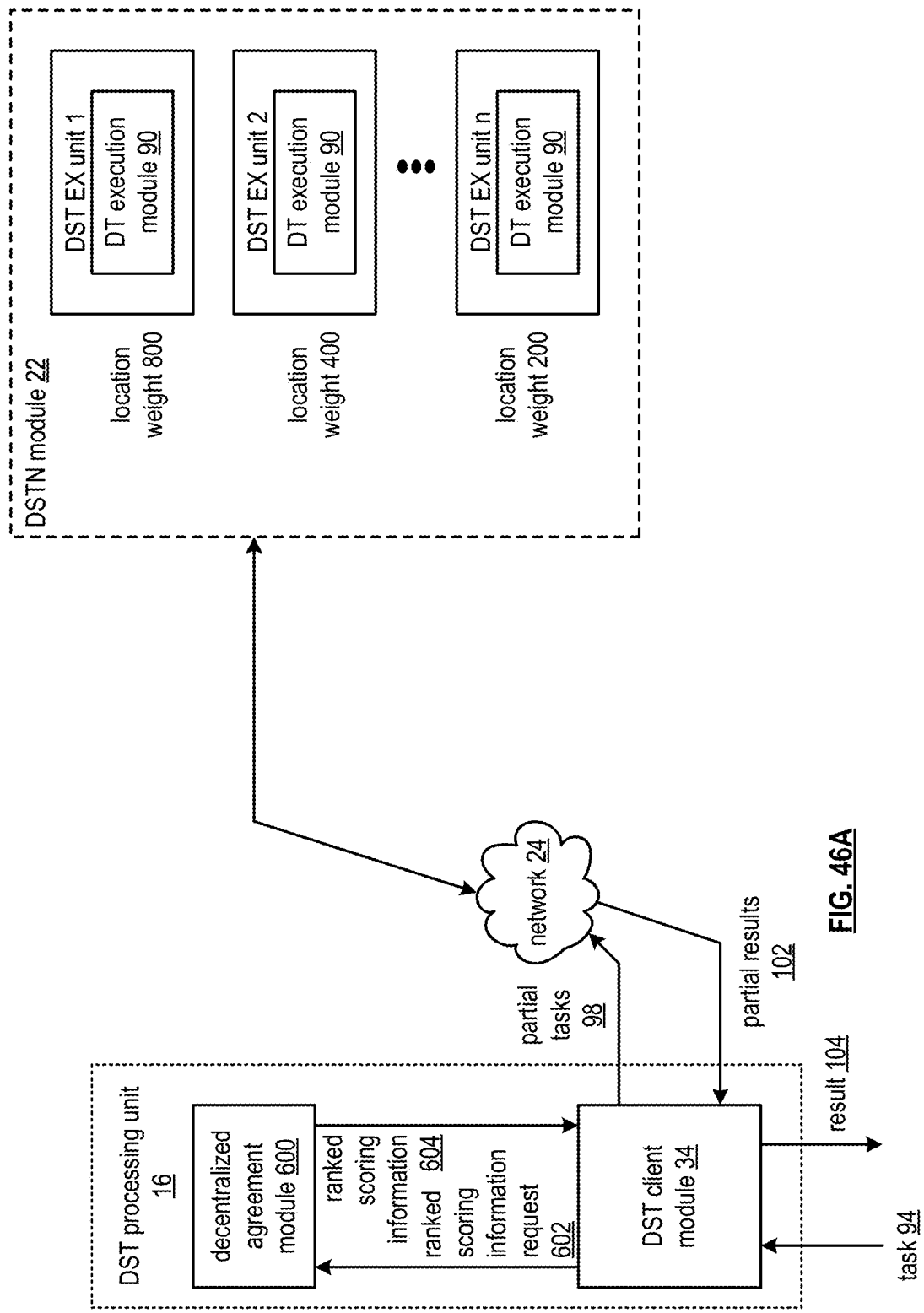
FIG. 46A is a schematic block diagram of another embodiment of a distributed storage and task network (DSTN) in accordance with the present disclosure.

FIG. 46A is a schematic block diagram of another embodiment of a distributed storage and task network (DSTN) that includes the distributed storage and task (DST) processing unit 16 of FIG. 1, the network 24 of FIG. 1, and the DSTN module 22 of FIG. 1. The DST processing unit 16 includes the DST client module 34 of FIG. 1 and a decentralized agreement module 600. The decentralized agreement module 600 may be implemented utilizing the decentralized agreement module 350 of FIG. 40A. The DSTN module 22 includes at least one set of DST execution (EX) units 1-n. Each DST execution unit may be implemented utilizing the DST execution unit 36 of FIG. 1. Each DST execution unit includes the distributed task (DT) execution module 90 of FIG. 3.

The DSTN functions to execute a task 94 to generate a result 104. For example, the DST client module 34 generates partial tasks 98 from a received task 94, selects one or more DST execution units for execution of the partial tasks 98 using a decentralized agreement function, sends, via the network 24, the partial tasks 98 to the one or more selected DST execution units, receives partial results 102, generates a result 104 based on the partial results 102, and outputs the results 104 to a requesting entity. The selecting utilizing the decentralized agreement function includes utilizing location weights associated with each DT execution module 90, where the location weight is associated with a partial task execution capability level. For example, the location weight of 800 is associated with the DT execution module 90 of DST execution unit 1, a location weight of 400 associated with the DT execution module 90 of DST execution unit 2, etc.

In a further example of operation, the DST client module 34 receives the task 94 for execution. The DST client module 34 obtains the location weights for each DT execution module 90 of the set of DST execution units 1-n. The obtaining includes at least one of performing a lookup, receiving, and issuing a query to at least some of the DST execution units. Having obtained the location weights, the DST client module 34 obtains ranked scoring information 604 for the plurality of DT execution modules 90 based on the location weights. For example, the DST client module 34 issues a ranked scoring information request 602 to the decentralized agreement module 600, where the request 602 includes the location weights of each DT execution module 90, a DT execution module identifier, a DT execution module group identifier, and a task identifier of the task 94; and receives the ranked scoring information.

Having obtained the ranked scoring information 604, the DST client module 34 determines a number of DT execution modules 90 for assignment to the task 94. The determining may be based on one or more of a capability level of the DT execution modules 90 and scores associated with each DT execution module of the ranked scoring information 604. For example, the DST client module 34 selects five DT execution modules 90 associated with a highest five scores of the ranked scoring information 604, where the five DT execution modules 90 are associated with sufficient task execution capability levels to execute five partial tasks 98 in accordance with a required time frame.

Having determined the number of DT execution modules 90, the DST client module 34 generates the number of partial tasks 98 based on the task 94. For example, the DST client module 34 generates one partial task 98 for each DT execution module 90 of the selected five DT execution modules 90. As another example, the DST client module 34 generates two partial tasks for a DT execution module 90 associated with a highest score and generates one partial task for each remaining DT execution module 90 of the selected five DT execution modules 90.

The DST client module 34 issues the generated partial tasks 98, via the network 24, to the selected DT execution modules 90. The DST client module 34 receives partial results 102 and issues the result 104 based on the received partial results 102.

Figure 46B:
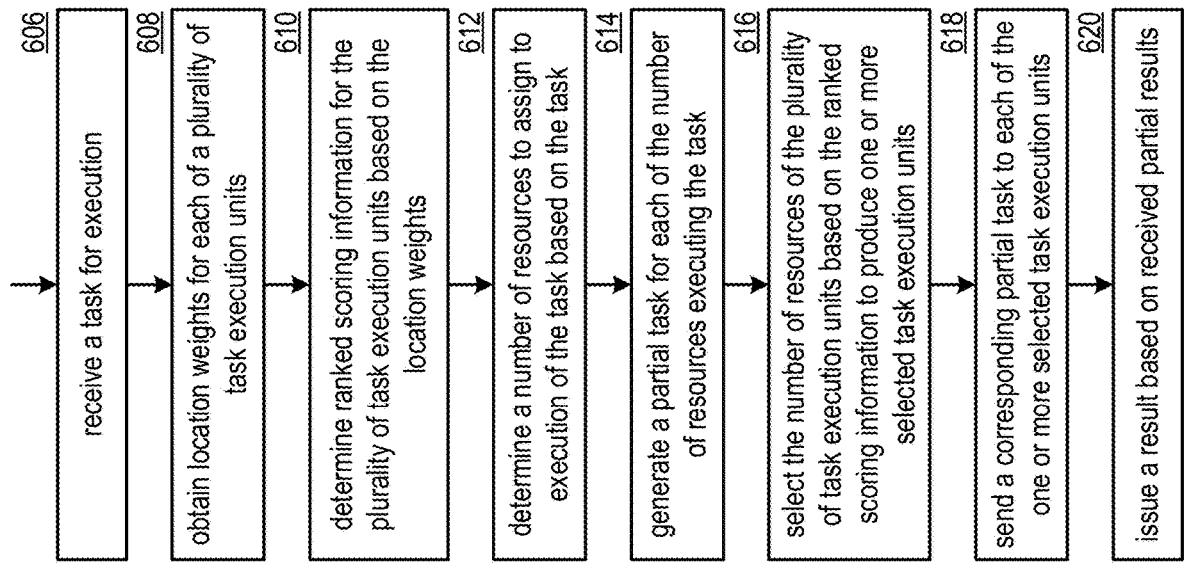
FIG. 46B is a flowchart illustrating an example of selecting task execution resources in accordance with the present disclosure.

FIG. 46B is a flowchart illustrating an example of selecting task execution resources. The method begins or continues at step 606 where a processing module (e.g., of a distributed storage and task (DST) client module) receives a task for execution, where the task is associated with a task identifier (ID). The method continues at step 608 where the processing module obtains location weights for each of the plurality of task execution units. The obtaining includes at least one of receiving the location weights with the task, performing a lookup, initiating a query, and receiving a query response.

The method continues at step 610 where the processing module determines ranked scoring information for the plurality of task execution units based on the location weights. For example, the processing module performs a decentralized agreement protocol function using the location weights of each task execution unit, a task execution unit identifier, a task execution unit group identifier, and the task ID to produce the ranked scoring information.

The method continues at step 612 where the processing module determines a number of resources to assign to execution of the task based on the task. The determining may be based on one or more of a desired task execution completion time frame, resource availability, and a number of task execution units associated with a score above a score threshold level. The method continues at step 614 where the processing module generates at least one partial task for each of the number of resources executing the task. For example, the processing module divides up the task into partial tasks. As another example, the processing module replicates partial tasks. As yet another example, the processing module replicates the task as the partial tasks.

The method continues at step 616 where the processing module selects the number of resources of the plurality of task execution units based on the ranked scoring information to produce one or more selected task execution units. For example, the processing module selects task execution units associated with highest scores of the ranked scoring information in accordance with the determined number of resources executing the task.

The method continues at step 618 where the processing module sends a corresponding partial task to each of the one or more selected task execution units. The method continues at step 620 where the processing module issues a result based on received partial results.

Figure 47A:
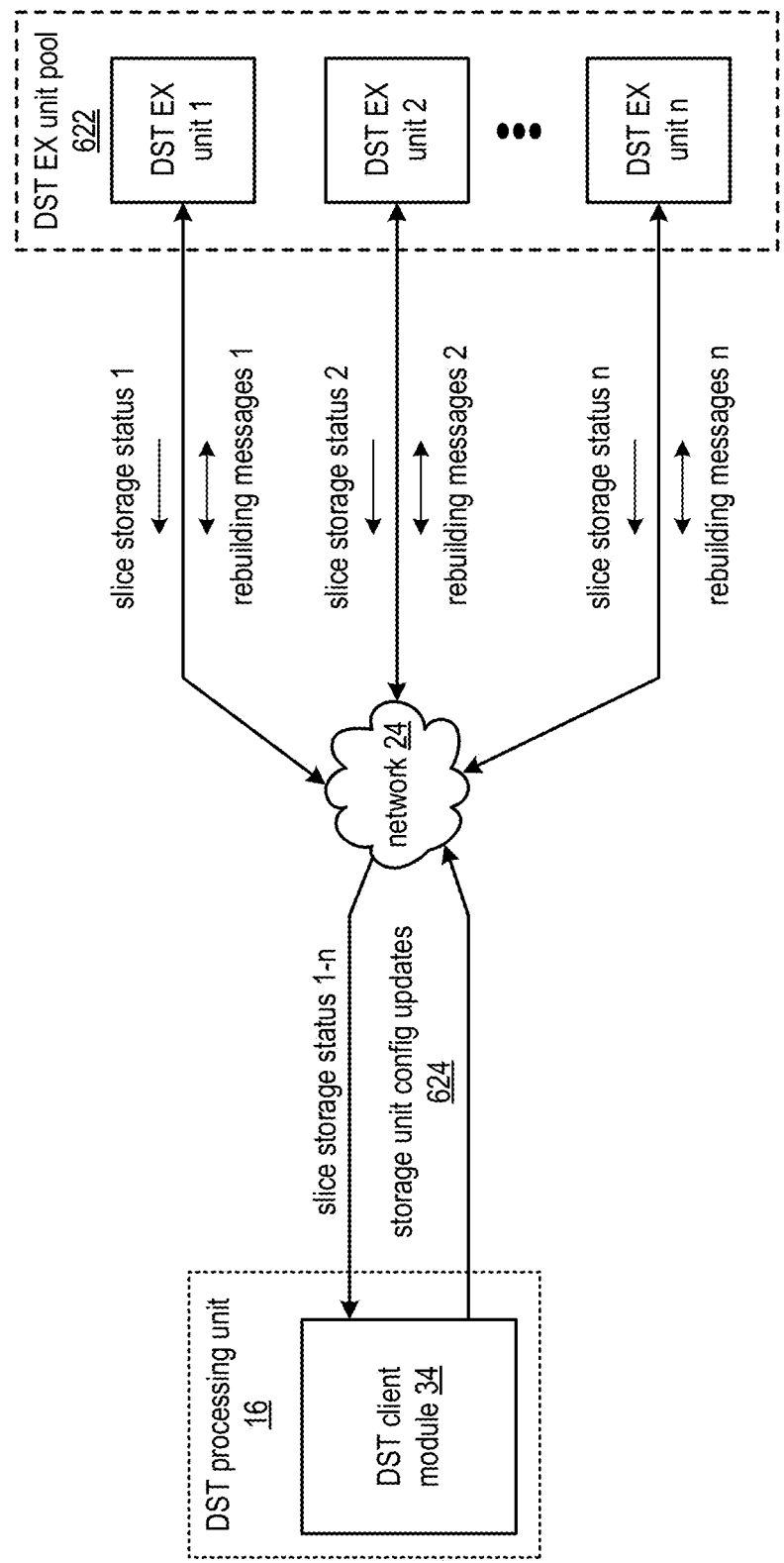
FIG. 47A is a schematic block diagram of another embodiment of a dispersed storage network (DSN) in accordance with the present disclosure.

FIG. 47A is a schematic block diagram of another embodiment of a dispersed storage network (DSN) that includes the distributed storage and task (DST) processing unit 16 of FIG. 1, the network 24 of FIG. 1, and a DST execution (EX) unit pool 622. The DST processing unit 16 includes the DST client module 34 of FIG. 1. The DST execution unit pool 622 includes at least one set of DST execution units 1-n. Each DST execution unit may be implemented utilizing the DST execution unit 36 of FIG. 1.

The DSN functions to update storage unit configuration of the DST execution unit pool 622, where the DST execution unit pool 622 stores pluralities of sets of encoded data slices. The updating of the storage unit configuration includes one or more of activating a storage unit, deactivating a storage unit, upgrading storage unit software, upgrading storage unit hardware, and performing a maintenance test.

In an example of operation, each DST execution unit determines a slice storage status for a DSN address range based on monitoring rebuilding messages. The slice storage status includes one or more of the DSN address range, a number of storage errors, a status rating, an overall slice storage status, and a number of favorably stored encoded data slices. For example, DST execution unit 1 monitors rebuilding messages 1 and generates storage status 1 based on the monitored rebuilding messages 1. The rebuilding messages include at least one of a list slice requests, a list digest request, and a store rebuilt slice request. As another example, the DST execution unit 1 indicates a favorable slice storage status when rebuilding activity for the DSN address range over a time frame is less than a rebuilding threshold level.

With each DST execution unit having determined associated slice storage status, the DST client module 34 receives, via the network 24, slice storage status 1-n. Having received the slice storage status, the DST client module 34 determines to update the storage unit configuration of one or more storage units of the set of storage units. The determining may be based on one or more of interpreting an error message, receiving a request, detecting software availability, detecting new hardware availability, detecting a software error, initiating a query, and receiving a query response.

Having determined to update the storage unit configuration, the DST client module 34 determines whether to update the storage unit configuration based on the received slices storage status. For example, the DST client module 34 indicates to update the storage unit configuration when at least a threshold number of storage units are associated with favorable slice storage status for the DSN address range. When updating the storage unit configuration, the DST client module 34 issues storage unit configuration updates 624 to one or more of the DST execution units.

FIG. 47B is a flowchart illustrating an example of updating storage unit configuration information. The method begins or continues at step 626 where a processing module of one or more processing modules of a dispersed storage network (e.g., of a distributed storage and task (DST) client module, of a storage unit) determines, for each storage unit of a set of storage units, a slice storage status of a dispersed storage network (DSN) address range. The determining includes one or more of receiving the status, initiating a query, and receiving a query response that includes the status. The determining may include determining, by each storage unit, the storage status. For example, a storage unit indicates favorable slice storage status when a number of rebuilding messages is less than a rebuilding message threshold level.

The method continues at step 628 where the processing module obtains the slice storage status of each storage unit of the set of storage units. The obtaining includes at least one of receiving, initiating a query, and receiving a query response. The method continues at step 630 where the processing module determines to update storage unit configuration of one or more storage units of the set of storage units. The determining includes one or more of interpreting a maintenance schedule, receiving a new software version for uploading to one or more the storage units, detecting new hardware installed in a storage unit, and determining to perform a test.

The method continues at step 632 where the processing module determines whether to update the storage unit configuration based on the storage unit configuration of at least some storage units of the set of storage units. For example, the processing module indicates to update the storage unit configuration when a threshold number of storage units are associated with a favorable slice storage status for the DSN address range.

When updating the storage unit configuration, the method continues at step 634 where the processing module issues a storage unit configuration update to one or more of the storage units of the set of storage units. The issuing includes one or more of initiating a test, indicating utilizing a new software version, issuing configuration information for new hardware, initiating a maintenance cycle, etc.

Figure 48A:
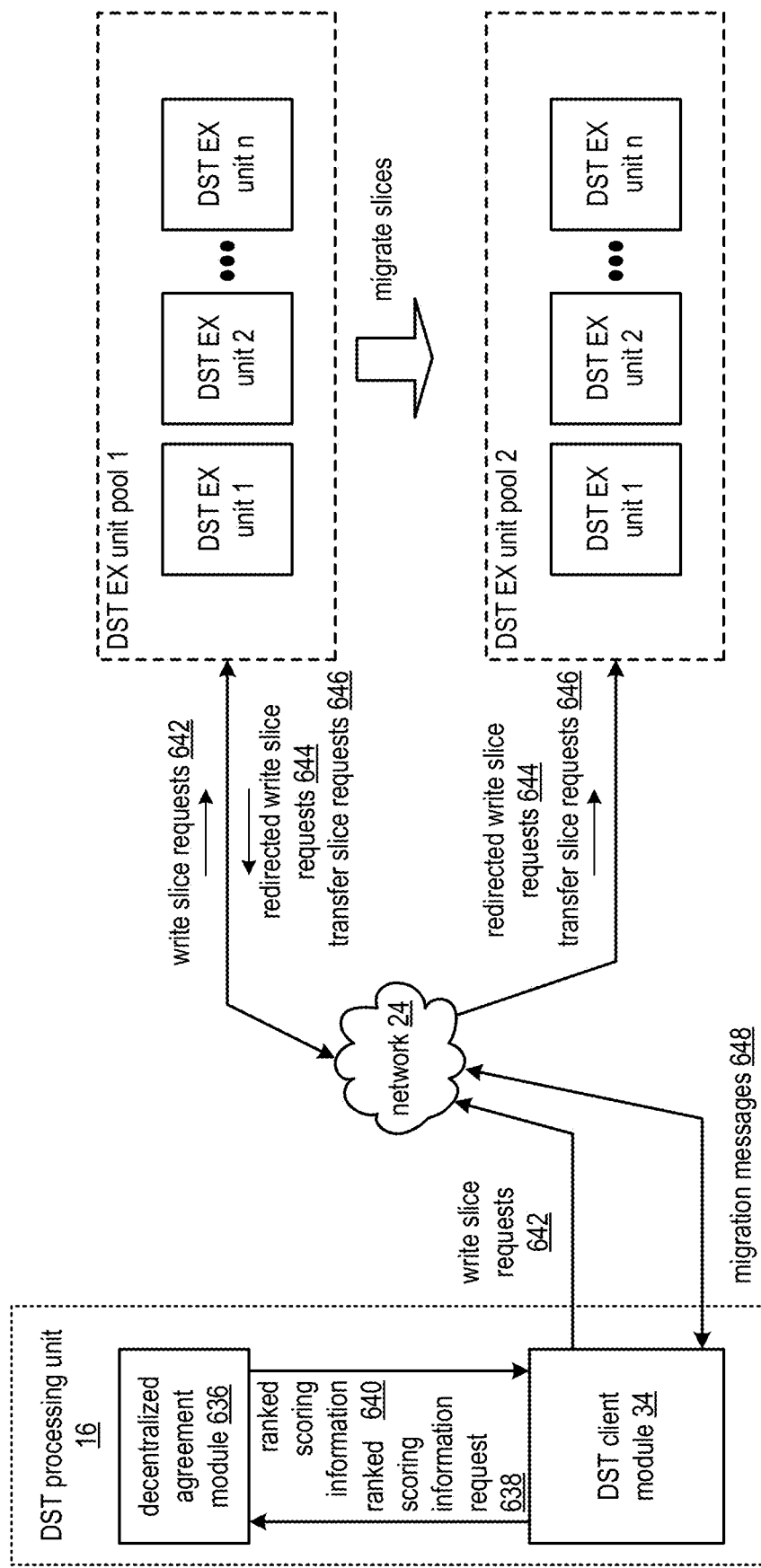
FIG. 48A is a schematic block diagram of another embodiment of a dispersed storage network (DSN) in accordance with the present disclosure.

FIG. 48A is a schematic block diagram of another embodiment of a dispersed storage network (DSN) that includes the distributed storage and task (DST) processing unit 16 of FIG. 1, the network 24 of FIG. 1, and at least two DST execution (EX) unit pools 1-2. Each DST execution unit pool includes a set of DST execution units 1-n. Each DST execution unit may be implemented utilizing the DST execution unit 36 of FIG. 1. The DST processing unit 16 includes a decentralized agreement module 636 and a DST client module 34. The decentralized agreement module 636 may be implemented utilizing the decentralized agreement module 350 of FIG. 40A.

The DSN functions to migrate encoded data slices stored in the DST execution unit pool 1 to the DST execution unit pool 2 and to process writing additional data as further encoded data slices to at least one of the DST execution unit pool 1 and DST execution unit pool 2 subsequent to initiation of the migration and prior to conclusion of the migration. For example, DST execution unit pool 2 is newly commissioned as a replacement to DST execution unit pool 1 which is at an end-of-life.

In an example of operation, the DST client module 34 determines to replace the DST execution unit pool 1, where one or more first DSN address ranges are associated with the DST execution unit pool 1. Hereafter, the DST execution unit pool 1 may be interchangeably referred to as a first storage pool and the DST execution unit pool 2 may be interchangeably referred to as a second storage pool. The determining may be based on one or more of interpreting a replacement schedule, receiving a request, and detecting an error.

Having determined to replace the first storage pool, the DST client module 34 identifies a second storage pool to replace the first storage pool. Alternatively, the DST client module 34 identifies a second and third storage pool to replace the first storage pool. The identifying includes one or more of detecting a new storage pool, receiving a manager input, identifying a storage pool associated with sufficient available capacity, and utilizing a decentralized agreement function to identify a most favorable storage pool as the second storage pool. For example, the DST client module 34 issues a ranked scoring information request 638 to the decentralized agreement module 636, where the request 638 includes one or more of a DSN address of the first DSN address ranges, location weights of alternative storage pools, and identifiers of the alternative storage pools, and receives ranked scoring information 640.

Having identified the second storage pool, the DST client module 34 issues migration messages 648 to the first and second storage pools to initiate migration of encoded data slices from the first storage pool to the second storage pool. The migration messages indicate slice names associated with at least one of all encoded data slices and encoded data slices associated with slice names within a DSN address range. For example, the first storage pool issues, via the network 24, transfer slice requests 646 to the second storage pool, where the transfer slice requests 646 include at least some of the encoded data slices for migration.

When receiving a write slice request 642 issued by the DST client module 34, by the first storage pool, prior to conclusion of the migration of the encoded data slices, one or more of the DST execution units of the first storage pool forwards a write slice request as a redirected write slice request 644 to the corresponding DST execution units of the second storage pool for storage. For example, the DST client module 34 receives data for storage, encodes the data using a dispersed storage error coding function to produce at least one set of encoded data slices, and issues a set of write slice requests 642 to the first storage pool, where the write slice requests 642 includes the at least one set of encoded data slices.

When the migration of the encoded data slices has concluded, the DST client module 34 disassociates the one or more first DSN address ranges from the first storage pool and associates the one or more first DSN address ranges with the second storage pool. Alternatively, or in addition to, the DST client module 34 updates location weights associated with DST execution units of the DST execution unit pool 2, updates a DSN directory, and updates a dispersed hierarchical index.

Figure 48B:
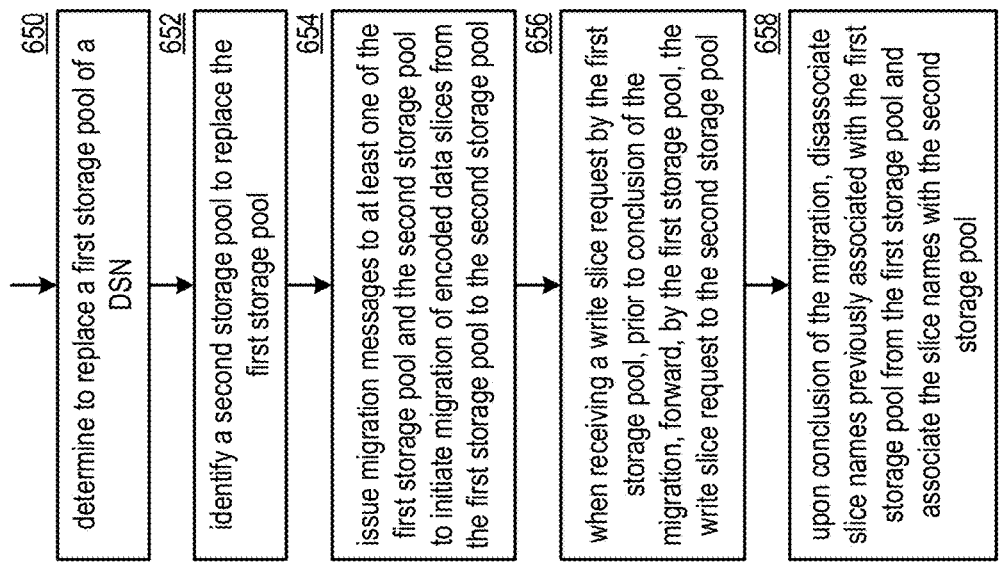
FIG. 48B is a flowchart illustrating another example of migrating slices in accordance with the present disclosure.

FIG. 48B is a flowchart illustrating another example of migrating slices. The method begins or continues at step 650 where a processing module (e.g., of a distributed storage and task (DST) client module) determines to replace a first storage pool of a dispersed storage network (DSN). The determining may include one or more of receiving a request, detecting one or more storage errors, and interpreting a replacement schedule. The method continues at step 652 where the processing module identifies a second storage pool to replace the first storage pool. The identifying includes at least one of detecting a storage pool, receiving a manager input, and identifying a storage pool associated with available capacity greater than or equal to capacity of the first storage pool.

The method continues at step 654 where the processing module issues migration messages to at least one of the first storage pool and the second storage pool to initiate migration of encoded data slices from the first storage pool to the second storage pool. The issuing includes at least one of instructing the first storage pool to issue transfer requests to the second storage pool, instructing the second storage pool to request slices from the first storage pool, and notifying at least one of the first and second storage pools of an open migration status.

When receiving a write request by the first storage pool, prior to conclusion of the migration, the method continues at step 656 where the first storage pool forwards the write slice request to the second storage pool. For example, a storage unit of the second storage pool receives the write slice request, determines status of the migration, interprets the status to indicate that the migration status is open, and sends the write slice request to a corresponding storage unit of the second storage pool.

Upon conclusion of the migration, the method continues at step 658 where the processing module disassociates slice names previously associated with the first storage pool from the first storage pool and associates the slice names with the second storage pool. Alternatively, or in addition to, the processing module zeros out a location weight associated with a decentralized agreement function for the first storage pool, increases a location weight associated with the second storage pool, updates a DSN directory, and updates a DSN address to physical location table.

Figure 49A:
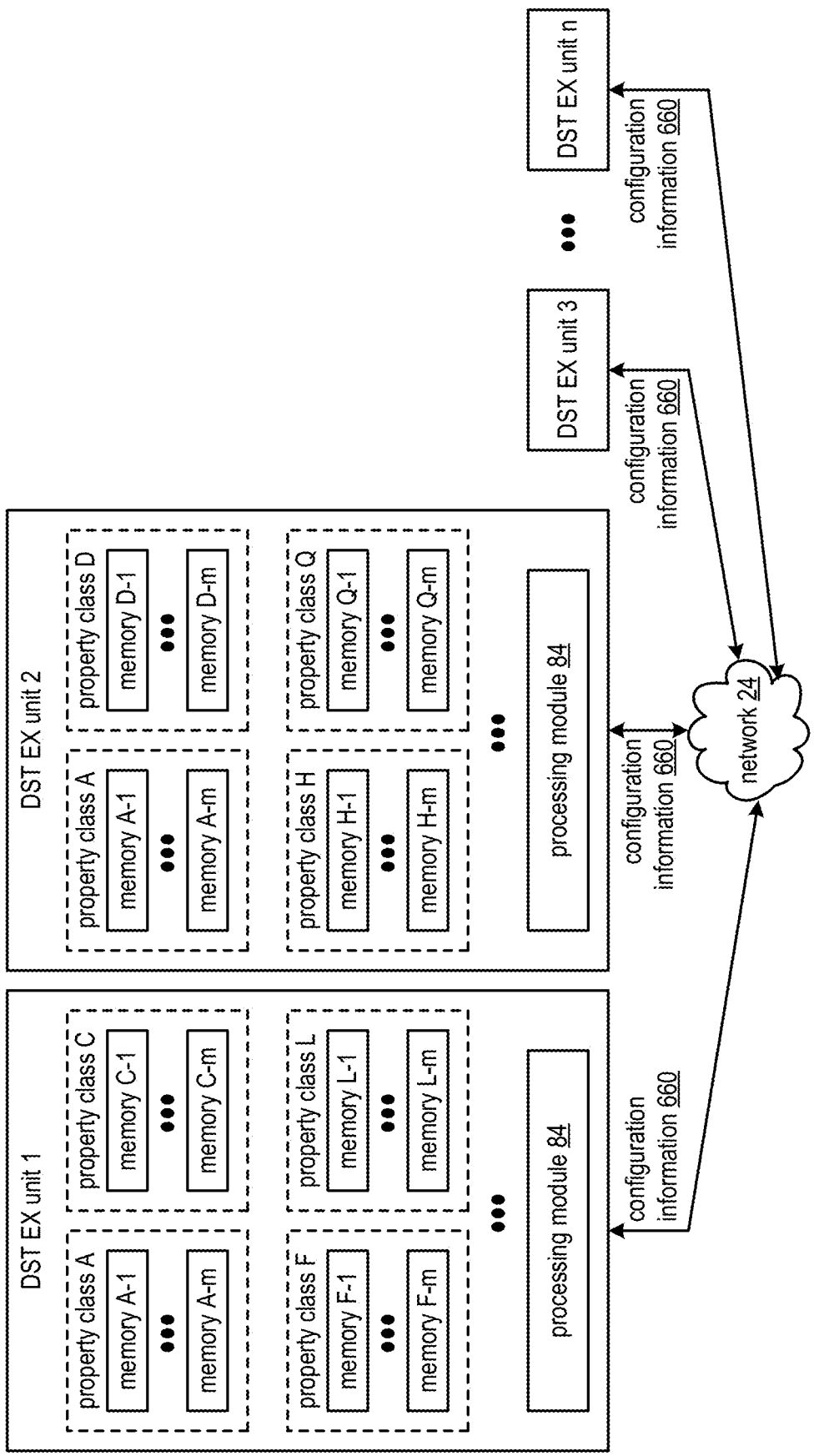
FIG. 49A is a schematic block diagram of another embodiment of a dispersed storage network (DSN) in accordance with the present disclosure.

FIG. 49A is a schematic block diagram of another embodiment of a dispersed storage network (DSN) that includes a set of distributed storage and task (DST) execution (EX) units 1-n and the network 24 of FIG. 1. Each DST execution unit includes the processing module 84 of FIG. 3 and a plurality of memories. Hereafter, a DST execution unit may be interchangeably referred to as a storage unit. Each memory may be associated with one or more properties. The properties may include one or more of a manufacturer, a model number, a serial number range, the manufacturing date, hours of operation, expected service life, expected remaining service life, hardware version, software version, firmware version, and a failure rate.

Each DST execution unit includes one or more subgroups of memories of the plurality of memories, where each subgroup is associated with a property class. Each property class includes one or more similar properties. For example, DST execution unit 1 includes memories A-1 through A-m that are associated with a property class A, memories C-1 through C-m that are associated with a property class C, etc.

The DSN functions to store data as a plurality of sets of encoded data slices and to rebalance storage of the encoded data slices within each DST execution unit based on the property classes. In an example of operation, the processing module 84 of any storage unit identifies one or more property classes of a plurality of memory devices associated with the storage unit. The identifying includes at least one of initiating a test, interpreting a test result, accessing a list, receiving, and interpreting DSN registry information.

Having identified the one or more property classes, the processing module 84 obtains a priority of usage level for each property class. The obtaining includes at least one of determining, receiving, initiating a query, and receiving a query response. For example, the processing module 84 determines a priority of usage level for the property class A as a highest level when memory devices associated with the property class A are associated with a favorable (e.g., lower than average) historical failure rate.

Having obtained the priority of usage level, the processing module 84 identifies associations of encoded data slices of common data objects with one or more property classes. For example, the processing module 84 accesses a slice name to memory device identifier table. Having identified the associations, the processing module 84 obtains configuration information 660 for the set of storage units that includes the storage unit. The configuration information 660 includes one or more of a list of property classes, DSN addresses associated with each property class, a number of memory devices for each property class, known issues with a property class, and a priority of usage level for each property class. For example, the processing module issues, via the network 24, configuration information requests to other storage units and receives configuration information 660 from the other storage units.

Having obtained the configuration information 660, the processing module 84 determines an updated configuration for the plurality of memory devices of the storage unit based on one or more of the property of usage levels, the associations, and the configuration information 660. For example, the processing module 84 determines the updated configuration to result in utilizing a maximum number of memories associated with different manufacturers for encoded data slices associated with a common data object to improve diversity based reliability. As another example, the processing module 84 determines the updated configuration to move encoded data slices of the common data object from memories that are two years old to memories that are one year old to improve retrieval reliability. As yet another example, the processing module 84 determines the updated configuration to move the encoded data slices of the common data object away from memories associated with a known faulty firmware version to other memories. Having determined the updated configuration, the processing module 84 facilitates migration of one or more encoded data slices in accordance with the updated configuration.

Figure 49B:
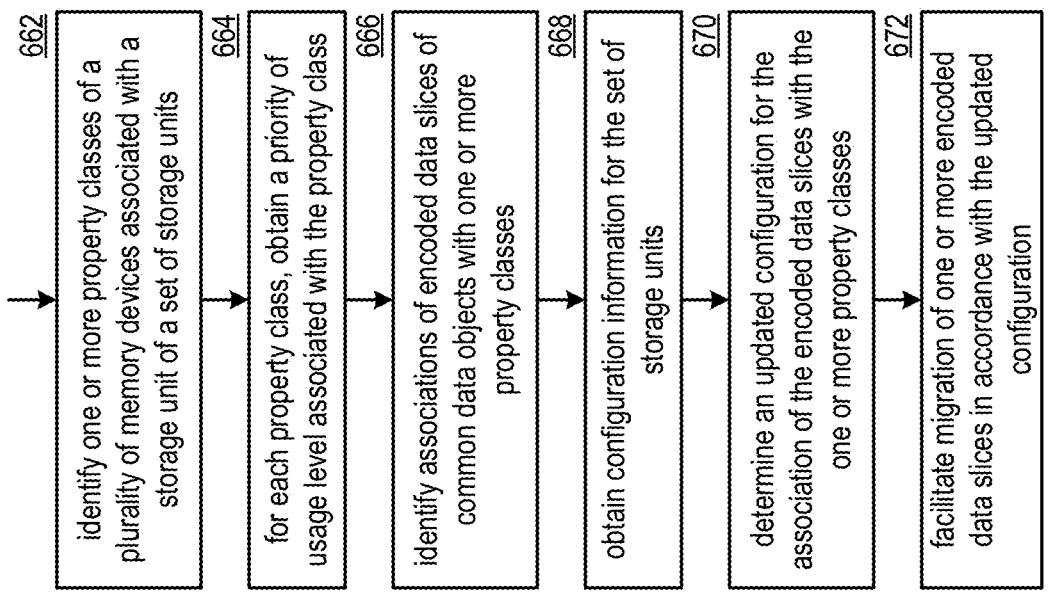
FIG. 49B is a flowchart illustrating another example of migrating slices in accordance with the present disclosure.

FIG. 49B is a flowchart illustrating another example of migrating slices. The method begins or continues at step 662 where a processing module (e.g., of a distributed storage and task (DST) execution unit) identifies one or more property classes of a plurality of memory devices associated with a storage unit of a set of storage units. The identifying includes at least one of initiating a test, interpreting a test result, accessing a list, interpreting dispersed storage network (DSN) registry information, and receiving.

For each property class, the method continues at step 664 where the processing module obtains a priority of usage level associated with the property class. The obtaining includes at least one of determining, receiving, initiating a query, and receiving a query response. The method continues at step 666 where the processing module identifies associations of encoded data slices of common data objects with one or more property classes. The identifying includes at least one of accessing a DSN address to physical location table, accessing a slice list, and utilizing a decentralized agreement function.

The method continues at step 668 where the processing module obtains configuration information for the set of storage units. The obtaining includes at least one of initiating a configuration information request, receiving a configuration information response, and accessing the DSN registry information.

The method continues at step 670 where the processing module determines an updated configuration for the association of the encoded data slices with the one or more property classes. The determining may be based on one or more of the property of usage levels, the associations, and the configuration information. For example, the processing module aligns storage of slices in a common property class with other units of the set of storage units. As another example, the processing module facilitates moving slices from a property class with a known issue to another property class without an issue. As yet another example, the processing module moves slices from a memory of a property class with a least favorable usage level to another memory associated with a property class with a more favorable usage level.

The method continues at step 672 where the processing module facilitates migration of one or more encoded data slices in accordance with the updated configuration. The facilitating includes one or more of issuing a migration request, retrieving slices, stored slices, updating a slice name to physical location table, and updating location weights associated with memory devices of the storage unit in accordance with the decentralized agreement function.

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a storage network, the method comprising:
   determining, by each storage unit of a set of storage units, a data slice storage status for data slices stored in a storage unit;
   obtaining, by a processing module of the storage network, the data slice storage status of the storage units of the set of storage units; and
   determining whether to perform a software update to software of the storage units of the set of storage units, including:
      determining, based on the data slice storage status of the storage units, whether a threshold number of storage units are associated with a favorable data slice storage status;
      in response to determining that a threshold number of storage units are associated with a favorable data slice storage status, indicating to perform the software update; and
      in response to determining that a threshold number of storage units are not associated with a favorable data slice storage status, indicating not to perform the software update.

2. The method of claim 1, wherein determining a data slice storage status for data slices stored in a storage unit includes monitoring rebuilding messages relating to the data slices.

3. The method of claim 2, wherein the storage unit indicates a favorable data slice storage status in response to determining that a number of the rebuilding messages is less than a rebuilding message threshold level.

4. The method of claim 1, wherein the data slices are stored in flash memory of the set of storage units.

5. The method of claim 1, wherein determining a data slice storage status for data slices stored in a storage unit includes determining the storage status of data slices in an address range.

6. The method of claim 1, wherein obtaining the data slice storage status of the storage units of the set of storage units includes initiating a query and receiving a query response.

7. The method of claim 1, wherein determining whether to perform a software update to software of the storage units of the set of storage units further includes determining the availability of new software.

8. The method of claim 1, wherein determining whether to perform a software update to software of the storage units of the set of storage units further includes:
- detecting a software error; and
- indicating to perform the software update in response to detecting the software error.

9. The method of claim 1, wherein determining whether to perform a software update to software of the storage units of the set of storage units further includes detecting the availability of new hardware in the set of storage units.

10. The method of claim 1, wherein indicating to perform the software update includes indicating to perform the software update on all storage units of the set of storage units.

11. The method of claim 1, wherein indicating to perform the software update includes issuing a storage unit configuration update to one or more of the storage units of the set of storage units.

12. A computing device of a group of computing devices of a dispersed storage network (DSN), the computing device comprises:
- a network interface;
- a local memory including operational instructions; and
- a processing module operably coupled to the local memory and the network interface, the processing module configured to execute the operational instructions to:
  - obtain, via the network interface, a data slice storage status for data slices stored in each storage unit of a set of storage units; and
  - determine whether to perform a software update to software of the storage units of the set of storage units, including:
    - determine, based on the data slice storage status of the storage units, whether a threshold number of storage units are associated with a favorable data slice storage status;
    - in response to determining that a threshold number of storage units are associated with a favorable data slice storage status, indicate to perform the software update; and
    - in response to determining that a threshold number of storage units are not associated with a favorable data slice storage status, indicate not to perform the software update.

13. The computing device of claim 12, wherein a data slice storage status for data slices stored in a storage unit is based, at least in part, on monitoring rebuilding messages relating to the data slices.

14. The computing device of claim 13, wherein a favorable data slice storage status indicates that a number of the rebuilding messages is less than a rebuilding message threshold level.

15. The computing device of claim 12, wherein obtaining the data slice storage status of the storage units of the set of storage units includes initiating a query and receiving a query response.

16. The computing device of claim 12, wherein determining whether to perform a software update to software of the storage units of the set of storage units further includes determining the availability of new software.

17. The computing device of claim 12, wherein determining whether to perform a software update to software of the storage units of the set of storage units further includes:
- detecting a software error; and
- indicating to perform the software update in response to detecting the software error.

18. The computing device of claim 12, wherein determining whether to perform a software update to software of the storage units of the set of storage units further includes detecting the availability of new hardware in the set of storage units.

19. A computer readable storage medium comprises:
- at least one memory section that stores operational instructions that, when executed by one or more processing modules of a computing device of a storage network, causes the computing device to:
  - obtain a data slice storage status for data slices stored in each storage unit of a set of storage units of the storage network; and
  - determine whether to perform a software update to software of the storage units of the set of storage units, including:
    - determine, based on the data slice storage status of the storage units, whether a threshold number of storage units are associated with a favorable data slice storage status;
    - in response to determining that a threshold number of storage units are associated with a favorable data slice storage status, indicate to perform the software update; and
    - in response to determining that a threshold number of storage units are not associated with a favorable data slice storage status, indicate not to perform the software update.

20. The computer readable storage medium of claim 19, wherein a favorable data slice storage status indicates that a number of rebuilding messages associated with data slices of a storage unit is less than a rebuilding message threshold level.

* * * * *